(12) United States Patent
Horigome

(10) Patent No.: US 8,687,477 B2
(45) Date of Patent: Apr. 1, 2014

(54) DISK-SHAPED RECORDING MEDIUM, OPTICAL SPOT POSITION CONTROL DEVICE, AND OPTICAL SPOT POSITION CONTROL METHOD

(75) Inventor: Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/255,545

(22) PCT Filed: Mar. 9, 2010

(86) PCT No.: PCT/JP2010/054281
§ 371 (c)(1),
(2), (4) Date: Sep. 9, 2011

(87) PCT Pub. No.: WO2010/106987
PCT Pub. Date: Sep. 23, 2010

(65) Prior Publication Data
US 2012/0002519 A1    Jan. 5, 2012

(30) Foreign Application Priority Data

Mar. 16, 2009  (JP) .............................. P2009-062488
Feb. 18, 2010  (JP) .............................. P2010-033443

(51) Int. Cl.
*G11B 7/24*  (2013.01)
(52) U.S. Cl.
USPC ....................................................... 369/275.4
(58) Field of Classification Search
None
See application file for complete search history.

(56) References Cited

U.S. PATENT DOCUMENTS

| 5,491,678 | A | * | 2/1996 | Maeda et al. | ............... 369/59.26 |
| 6,487,144 | B2 | | 11/2002 | Nagata et al. | |
| 7,307,769 | B2 | * | 12/2007 | Ogasawara | ..................... 359/24 |

(Continued)

FOREIGN PATENT DOCUMENTS

| JP | 61 220135 | 9/1986 |
| JP | 2 62727 | 3/1990 |
| JP | 5 342772 | 12/1993 |

(Continued)

OTHER PUBLICATIONS

International Search Report Issued Apr. 27, 2010 in PCT/JP10/054281 filed Mar. 9, 2010.

*Primary Examiner* — Joseph Feild
*Assistant Examiner* — Parul Gupta
(74) *Attorney, Agent, or Firm* — Oblon, Spivak, McClelland, Maier & Neustadt, L.L.P.

(57) ABSTRACT

In a case of performing recording/playing with an information recording layer with a first light irradiation, and controlling the recording/playing positions on the information recording layer by a second light irradiating as to a position control information recording layer provided separately from the information recording layer, corrections to shifts in recording positions and playing positions that occurs as a result of shifts in the optical axes of the first and second lights. A disc-shaped recording medium has multiple pit row phases wherein, the pit rows having a spacing between one round of pit formable positions that is limited to a predetermined first spacing are formed in a spiral shape or concentrically, and with pit rows arrayed in the radius direction, the spacing in the pit row forming direction of the pit formable positions is set to positions shifted by a predetermined second spacing. Therefore multiple pit rows can be arrayed in within the width of one conventional track, and a tracking servo can be used for the selected pit rows in accordance with the correction amount of the playing position, in which case corrections can be made with high precision that is narrower than one track width.

7 Claims, 33 Drawing Sheets

(56) References Cited

U.S. PATENT DOCUMENTS

| | | |
|---|---|---|
| 7,391,708 B2 * | 6/2008 | Yamanaka ................ 369/275.3 |
| 2001/0019518 A1 * | 9/2001 | Levich et al. .............. 369/44.13 |
| 2001/0055262 A1 * | 12/2001 | Kasazumi et al. ....... 369/112.02 |
| 2003/0206503 A1 * | 11/2003 | Kosoburd et al. .......... 369/44.29 |
| 2005/0157613 A1 | 7/2005 | Ogasawara et al. |
| 2005/0179967 A1 | 8/2005 | Ogasawara |
| 2005/0219986 A1 * | 10/2005 | Shimada et al. ................ 369/94 |
| 2005/0237896 A1 | 10/2005 | Tachibana et al. |
| 2008/0002553 A1 | 1/2008 | Tachibana et al. |
| 2008/0285392 A1 | 11/2008 | Fukushima |

FOREIGN PATENT DOCUMENTS

| | | |
|---|---|---|
| JP | 7 254155 | 10/1995 |
| JP | 2005 203070 | 7/2005 |
| JP | 2005 228416 | 8/2005 |
| JP | 2005 250038 | 9/2005 |
| JP | 2007 79438 | 3/2007 |
| JP | 2008 287754 | 11/2008 |
| WO | 2004 021339 | 3/2004 |

* cited by examiner

| PIT ROW A | PIT ROW B | PIT ROW C | PIT ROW D | PIT ROW E | PIT ROW F |

* IN EACH PIT ROW IS 1 ch bit (b) 4ch bit = 1011 = Data bit "0"
4ch bit = 1101 = Data bit "1"

(c) 12ch bit = 1111 | 1111 | 1011 = Sync1
12ch bit = 1111 | 1111 | 1101 = Sync2

FIG. 16
(a)
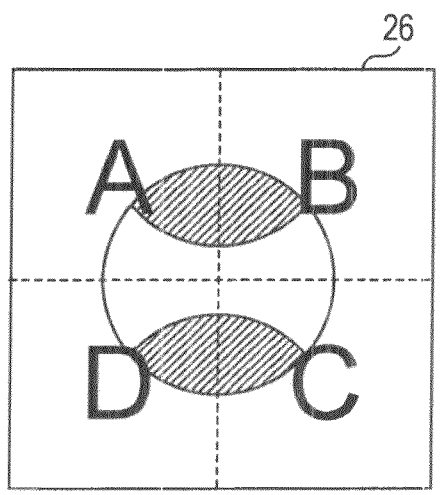
(b)
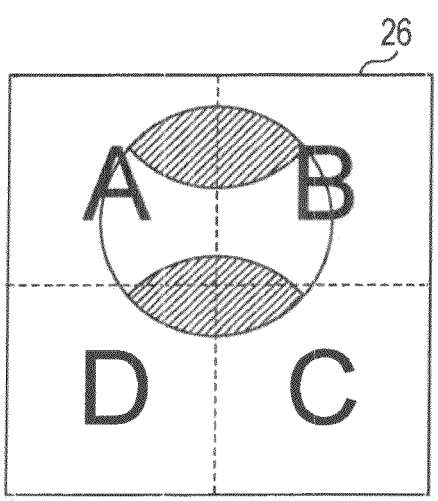

FIG. 23
(a)
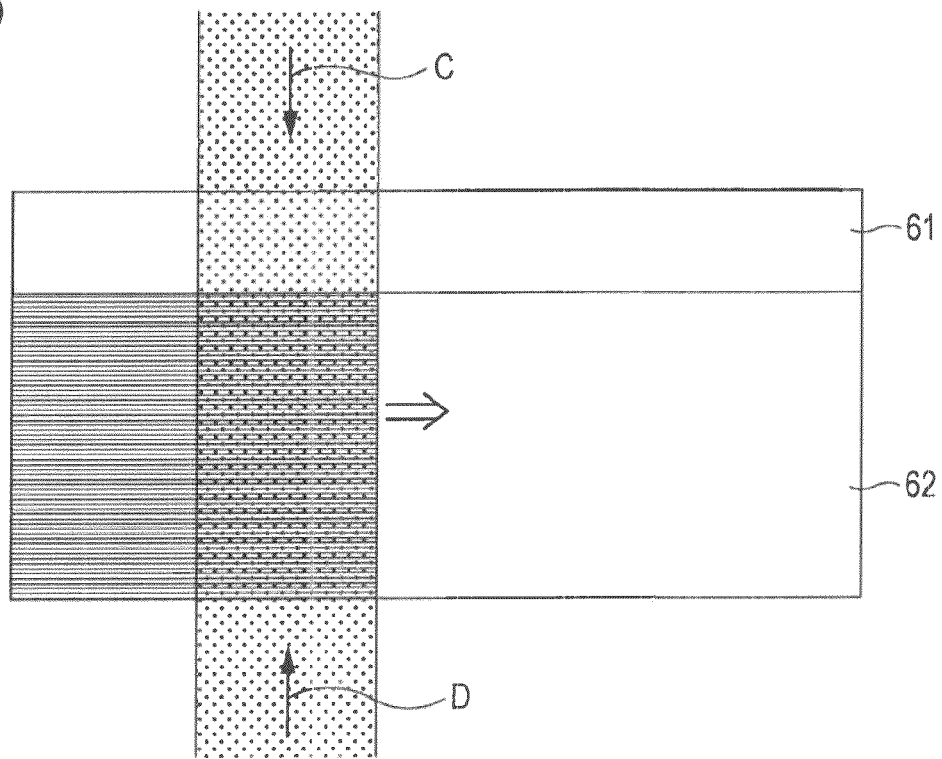
(b)
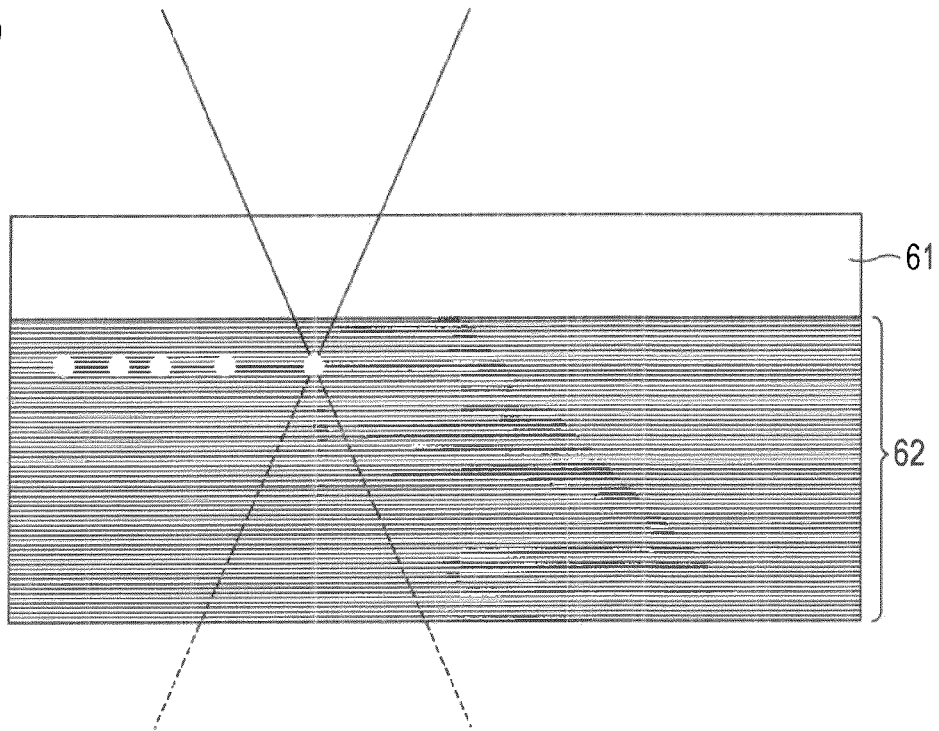

DISK-SHAPED RECORDING MEDIUM, OPTICAL SPOT POSITION CONTROL DEVICE, AND OPTICAL SPOT POSITION CONTROL METHOD

TECHNICAL FIELD

The present invention relates to a disc-shaped recording medium. Also, in particular, the present invention relates to an optical spot position control device that is favorable in the case that control of a recording/playing position of information is performed based on light irradiated separate from information recording/playing light, serving as an optical spot position control device that controls the spot position of the light irradiated onto the disc-shaped recording medium, and to a method thereof.

BACKGROUND ART

For example, as in the above-mentioned Patent Literatures, a hologram recording/playing system is known, which performs data recording by an interference pattern of signal light and reference light. With this hologram recording/playing system, at the time of recording, signal light provided with spatial-optical modulation according to the recording data (e.g. optical intensity modulation), and reference light that is separate from the signal light herein, are irradiated onto the hologram recording medium, and an interference pattern thereof is formed on the hologram recording medium, thereby performing data recording.

Also, at the time of playing, the reference light is irradiated onto the hologram recording medium. Thus, by the reference light being irradiated, diffracted light according to the interference pattern formed on the hologram recording medium is obtained as described above. Thus, playing light (playing signal light) in accordance with the recording data is thus obtained. The playing light thus obtained is detected with an image sensor such as a CCD (Charge Coupled Device) sensor or CMOS (Complementary Metal Oxide Semiconductor) sensor, whereby the recording data is played.

Now, as a hologram recording playing system, similar to a conventional optical disc recording/playing system such as a CD (Compact Disc) or DVD (Digital Versatile Disc), there is consideration being given to recording data along a track formed on the recording medium. That is to say, by performing recording/playing position control such as a tracking servo which handles tracks, similar to the case of a conventional optical disc, data recording is performed at appropriate positions on the disc.

An example of a configuration of the hologram recording medium used in the case of performing such recording/playing position control will be described using a cross-sectional configuration diagram in FIG. 32.

In FIG. 32 shows a configuration example of a hologram recording medium 1000 of a reflective type that has a reflective film.

As shown in the diagram, the hologram recording medium 100 has a recording layer (106), whereupon recording of the hologram is performed with the interference pattern of the above-described signal light and reference light, and a position control information recording layer, whereupon recording of address information and the like for position control has been performed with an uneven cross-sectional configuration on a substrate 110, are each formed separately.

Specifically, the hologram recording medium 100 has, in sequence from the upper layer, a cover layer 105, recording layer 106, reflective film 107, intermediate layer 108, reflective film 109, and substrate 110.

Laser light (the above-described reference light) for playing the hologram at the time of playing is irradiated onto the reflective film 107 formed on a layer under the recording layer 106, and upon a playing image according to the hologram recorded on the recording layer 106 being obtained, this is provided to be returned to the device side as reflected light.

Also, a track for guiding the recording/playing position of the hologram on the recording layer 106 is formed on the substrate 110 in a spiral shape or in a concentric fashion. For example, the track may be formed by information recording of address information or the like being performed with pit rows.

The reflective film 109 formed on the layer above the substrate 100 is provided to obtain the reflected light according to the pit rows. Note that the intermediate layer 108 is an adhesive material such as a resin, for example.

The recording/playing light for performing recording/playing of the hologram on the recording layer 106 and the position control light for obtaining the reflected light from the position control information are each individually irradiated onto the hologram recording medium 100 which has a cross-sectional configuration such as described above.

Now, if we say that only one type of light is used for both the recording/playing of the hologram and the position control, there is the risk that the components corresponding to the uneven cross-sectional shape of the substrate 110 (reflective film 109) will be superimposed on the playing image of the hologram as noise, thereby deteriorating playing capabilities. Therefore, for position control with the hologram recording/playing system, the position control light for obtaining the reflected light from the position control information recording layer is separately irradiated, along with the recording/playing light of the hologram.

Also, in the case of thus irradiating the hologram recording/playing light and the separate position control light, lights having differing wavelength bands are used. The reason thereof is, in the case of using light having the same wavelength bands for position control light and recording/playing light, there is the risk that of recording layer 106 becoming photosensitized due to the irradiation of the position control light, so this is for the prevention thereof.

For example, for the hologram recording/playing light, a violet laser light having a wavelength of approximately $\lambda=405$ nm is used, and for the position control light, red laser light having a wavelength of approximately $\lambda=650$ nm is used.

Now, in order to obtain reflected light from the position control information recording layer by irradiation of the position control light, the position control light must arrive at the reflective layer 109 whereupon the uneven cross-sectional shape of the substrate 110 is reflected. That is to say, the position control light has to pass through the reflective film 107 that is formed on a layer above the reflective film 109.

On the other hand, the hologram recording/playing light has to reflect at the reflective film 107, so that the playing image according to the hologram recorded on the recording layer 106 is returned to the device side as reflected light.

With consideration for these points, a reflective film having wavelength selectivity is used for the reflective film 107, whereby the violet laser light for recording/playing reflects and the red laser light for position control passes through. Thereby, the position control light arrives at the reflective film 109 and the reflected light for position control is appropriately returned to the device side, and at the same time, the playing image of the hologram recorded on the recording layer 106 can be reflected with the reflective film 107 and appropriately returned to the device side.

Now, in the case of thus using light that is separate from the hologram recording/playing light to perform control of the recording/playing position, on the recording/playing device side, the hologram recording/playing light and the position control light are composited on the same optical axis, as shown in the following FIG. 33, and irradiates the composited light as to the hologram recording medium 100. Tracking servo control based on the reflected light of the position control light is then performed.

Thus, by performing position control based on the reflected light of the position control light while synthesizing the hologram recording/playing light and position control light on the same optical axis and irradiating this onto the hologram recording medium 100, the hologram recording/playing position is controlled at positions along tracks (pit rows) formed in the hologram recording medium 100.

CITATION LIST

Patent Literature 1: Japanese Patent Application Publication No. 2005-250038
Patent Literature 2: Japanese Patent Application Publication No. 2007-79438

SUMMARY OF INVENTION

However, a conventional control method for the hologram recording/playing position as described above is a method presuming that the optical axes of the position control light and recording/playing light will match, whereby in the case that there is a shift in the two optical axes resulting from temporal changes or temperature changes for example, as shown in FIG. 34, the hologram recording/playing position can become uncontrollable to accurate positions along the pit rows.

That is to say, as we can understand from this point, with a conventional hologram recording/playing system that performs position control with the above-mentioned method, there is the possibility that the recording hologram rows cannot be accurately traced at the time of playing, and accordingly, there has been the concern that the hologram could not be correctly played.

Also, the problem of a shift between the hologram recording position and playing position resulting from a shift in the two optical axes can also similarly occur in the case of performing playing with a disc on which recording has been performed on an external device. For example, in the case that the optical axis shift amount between the position control light and recording/playing light at the time of recording the hologram on another device is α, if the optical axis shift amount between the position control light and recording playing light at the device itself is β, the hologram recorded on the other device cannot accurately played at this device.

Now, using a method for correcting such a shift between the hologram recording position and playing position is conceivable.

A method can be suggested for such a specific method, wherein the optical axis position of the recording/playing light (reference light) at the time of playing is caused to match the actual position of the hologram recorded position and is adjusted, upon separately having an adjustment mechanism provided such as an actuator that adjusts the optical axis position of the recording/playing light.

To describe more specifically, in the case of using this method, in advance of performing hologram playing, the optical axis position of the recording/playing light (reference light) is vibrated at multiple locations by the actuator (adjustment mechanism) to perform calibration that identifies the optical axis position obtaining the most playing light amount. That is to say, therefore, the position wherein the hologram is actually recorded is identified. By adjusting the optical axis position of the recording/playing light at the position thus obtained, the shift between the hologram recording position and playing position can be obtained.

However, the point to note here is the point wherein, at the time of playing the hologram, even if the shift in irradiation position of the recording/playing light (reference light) as to the recorded hologram is minute, this invites a decrease in the diffractive effect (i.e. a decrease in the playing light amount). In other words, correcting the light axis position of the recording/playing light as described above requires a highly-precise adjustment (precision in the order of sub-microns, for example).

Thus, since such highly precise adjustments have to be made, in the case of using a method to provide an adjustment mechanism to perform corrections to the light axis position of the recording/playing light as described above, the technical ease/difficulty is increased, and the adjustment mechanism also has to be a mechanism that has extremely high precision and high rigidity, so from the device manufacturing cost perspective and so forth, realizing this as a product becomes very difficult.

According to the present invention, the configuration below is made as a disc-shaped recording medium, to resolve the problems described above.

That is to say, the disc-shaped recording medium of the present invention has multiple pit row phases, wherein, the pit rows having a spacing between one round of pit formable positions that is limited to a predetermined first spacing are formed in a spiral shape or concentrically, and with pit rows arrayed in the radius direction, the spacing in the pit row forming direction of the pit formable positions is set to positions shifted by a predetermined second spacing.

Also, the present invention proposes a configuration as described below, as a first configuration of the optical spot position control device.

That is to say, a first light source is provided for irradiating a first light as to the disc-shaped recording medium of the present invention having multiple pit row phases, wherein the pit rows having a spacing between one round of pit formable positions that is limited to a predetermined first spacing are formed in a spiral shape or concentrically, and with pit rows arrayed in the radius direction, the spacing in the pit row forming direction of the pit formable positions is set to positions shifted by a predetermined second spacing.

Also, a second light source is provided for irradiating a second light as to the disc-shaped recording medium.

Also, an objective lens is provided, to which the first light and the second light are input, serving as an output end of the first light and the second light as to the disc-shaped recording medium.

Also, a tracking control mechanism configured so that the relative position relation in the radius direction between the optical axes of the first and second light that are irradiated via the objective lens, and the disc-shaped recording medium, is changed, so that tracking control is performed for the first and second lights.

Also, a light receiving unit to receive the reflected light of the second light from the disc-shaped recording medium is provided.

Also, a first tracking error signal generating unit is provided, which generates a first tracking error signal expressing the position error in the radius direction of the second optical spot as to the pit formed on the disc-shaped recording medium, based on the receiving signal obtained from the light receiving unit.

Also, a clock generating unit is provided, which generates a clock according to the spacing of the pit formable positions, based on the light receiving signal obtained from the light receiving unit.

Also, a timing selection signal generating unit is provided, which generates multiple timing selection signals, each representing timing of the pit formable positions at each of the multiple pit rows, and each having different pit row phases formed on the disc-shaped recording medium, based on a clock generated by the clock generating unit.

Also, a first timing selection signal selecting unit is provided, which selects a first timing selection signal from the multiple timing selection signals.

Additionally, a first tracking servo control for controlling the tracking control mechanism so that tracking servo of the second optical spot is performed, based on a signal of a partial segment of the first tracking error signal generated by the first tracking error signal generating unit, which is extracted according to a timing represented by the timing selection signal selected by the first timing selection signal selecting unit.

Also, the present invention proposes a configuration as described below, as a second configuration of the optical spot position control device.

That is to say, a first light source is provided for irradiating a first light as to the disc-shaped recording medium of the present invention having multiple pit row phases, wherein the pit rows having a spacing between one round of pit formable positions that is limited to a predetermined first spacing are formed in a spiral shape or concentrically, and with pit rows arrayed in the radius direction, the spacing in the pit row forming direction of the pit formable positions is set to positions shifted by a predetermined second spacing.

Also, a second light source is provided for irradiating a second light as to the disc-shaped recording medium.

Also, an objective lens is provided, to which the first light and the second light are input, serving as an output end of the first light and the second light as to the disc-shaped recording medium.

Also, a tracking control mechanism is provided, configured so that the relative position relation in the radius direction between the optical axes of the first and second light that are irradiated via the objective lens, and the disc-shaped recording medium, is changed, so that tracking control is performed for the first and second lights.

Also, a light receiving unit is provided, to receive the reflected light of the second light from the disc-shaped recording medium.

Also, a first tracking error signal generating unit is provided, for generating a first tracking error signal representing position error in the radius direction of the second optical spot as to the pits formed on the disc-shaped recording medium, based on the reception signal obtained from the light receiving unit.

Also, a clock generating unit is provided, for generating a clock according to the spacing of the pit formable positions, based on the light receiving signal obtained from the light receiving unit.

Also, a timing selection signal generating unit is provided, for generating timing selection signals, each representing timing of the pit formable positions at each of the multiple pit rows, and each having different pit row phases formed on the disc-shaped recording medium, based on a clock generated by the clock generating unit.

Also, a second timing selection signal selecting unit is provided, for selecting from the multiple timing selection signals, timing selection signals corresponding to two pit rows having the same phase difference as to the pit rows for the tracking servo, respectively.

Also, a pit existence/non-existence reflection signal sampling unit is provided, for sampling values of the pit existence/non-existence reflection signals generated by the pit existence/non-existence signal generating unit, at respective timings represented by the timing selecting signals selected by the second timing selection signal selecting unit.

Also, a second tracking error signal generating unit is provided, for generating the second tracking error signal which represents position error in the radius direction as to the pit row for the tracking servo of the second optical spot position, by calculating the difference in the pit existence/non-existence reflection signal values each sampled by the pit existence/non-existence reflection signal value sampling unit.

Also, a second tracking servo control unit is provided, for controlling the tracking control mechanism so the tracking servo is performed for the second optical spot, based on the second tracking error signal generated by the second tracking error signal generating unit.

Also, the present invention proposes a configuration as described below, as a third configuration of the optical spot position control device.

That is to say, a first light source is provided, for irradiating a first light as to the disc-shaped recording medium of the present invention having multiple pit row phases, wherein the pit rows having a spacing between one round of pit formable positions that is limited to a predetermined first spacing are formed in a spiral shape or concentrically, and with pit rows arrayed in the radius direction, the spacing in the pit row forming direction of the pit formable positions is set to positions shifted by a predetermined second spacing.

Also, a second light source is provided, for irradiating a second light as to the disc-shaped recording medium.

Also, an objective lens is provided, to which said first light and said second light are input, serving as an output end of the first light and the second light as to the disc-shaped recording medium.

Also, a tracking control mechanism is provided, configured so that the relative position relation in the radius direction between the optical axes of the first and second light that are irradiated via the objective lens, and the disc-shaped recording medium, is changed, so that tracking control is performed for the first and second lights.

Also, a light receiving unit is provided, to receive the reflected light of the second light from the disc-shaped recording medium.

Also, a first tracking error signal generating unit is provided, for generating a first tracking error signal representing position error in the radius direction of the second optical spot as to the pit formed on the disc-shaped recording medium, based on the receiving signal obtained from the light receiving unit.

Also, a clock generating unit is provided, for generating a clock according to the spacing of the pit formable positions, based on the light receiving signal obtained from the light receiving unit.

Also, a timing selection signal generating unit is provided, for generating multiple timing selection signals, each representing timing of the pit formable positions at each of the multiple pit rows, and each having different pit row phases formed on the disc-shaped recording medium, based on a clock generated by said clock generating unit.

Also, a first timing selection signal selecting unit is provided, for selecting a first timing selection signal from the multiple timing selection signals.

Also, a pit unit tracking error signal value sampling unit is provided, for sampling values of the first tracking error signal, generated by the first tracking error signal generating unit, at a timing represented by the timing selection signal selected by the first timing selection signal selecting unit.

Also, a mirror portion tracking error signal value sampling unit is provided, for sampling values of the first tracking error signal generated by the first tracking error signal generating unit, at a timing corresponding to a mirror portion which is a portion other than the pit formable position on the disc-shaped recording medium, based on the clock generated by the clock generating unit.

Also, a third tracking error signal generating unit is provided, for generating a third tracking error signal, by subtracting a mirror portion tracking error signal value sampled by the mirror portion tracking error signal value sampling unit from the pit unit tracking error signal 1 sampled by the pit unit tracking error signal value sampling unit.

Also, a third tracking servo control unit is provided, for controlling the tracking control mechanism so that the tracking servo is performed for the second optical spot, based on the third tracking error signal generated by the third tracking error signal generating unit.

According to the disc-shaped recording medium of the present invention described above, if the configuration has "multiple pit row phases, wherein the pit rows having a spacing between one round of pit formable positions that is limited to a predetermined first spacing are formed in a spiral shape or concentrically, and with pit rows arrayed in the radius direction, the spacing in the pit row forming direction of the pit formable positions is set to positions shifted by a predetermined second spacing", then even if the array spacing in the radius direction of the various pit rows is narrowed to where the pit forming positions in the radius direction are overlapped, exceeding the optical limitations can be prevented. In other words, the various pit rows can therefore be arrayed at a narrower pitch than the minimum track pitch (track pitch with conventional limitations) that can be realized with a conventional method.

Thus, if a disc-shaped recording medium having pit rows arrayed at a narrower pitch than a track with conventional limitations in the radius direction is used, the position control in the optical spot tracking direction can be performed in fine increments exceeding a track width of conventional limitations. That is to say, adjustments of the first light irradiating position can be performed with higher precision when correcting the shift between the information recording position and playing position.

Also, as we can understand from the above description also, according to the present invention, for example, the adjustments to the first light irradiating position to be performed when correcting the shift between the information recording position and playing position with irradiation of the first light is performed by selecting a pit row for the tracking servo. That is to say, according to such a present invention, when correcting the shift between the information recording position and playing position with irradiation of the first light, providing a separate adjustment mechanism for adjusting the optical axis position on the first light (recording/playing light) side is not needed as exemplified earlier, and corrections can be made using an existing tracking control mechanism provided for position control by irradiation of the second light.

Accordingly, according to the present invention, a problem occurring in a case of providing a separate adjustment mechanism for optical axis position correction of the first light as described above can be avoided.

According to the present invention as described above, in the case of performing irradiation position control of the first light by performing irradiation position control for the second light (position control light) irradiated separately from the first light (recording/playing light), adjustments to the irradiation position of the first light, when correcting the shift between the information recording position and playing position by irradiation of the first light, can be performed with high precision.

Since adjustments can be made with such high precision, playing capability can be improved.

Also, in performing corrections to the shift between the information recording position and playing position by irradiation of the first light, the present invention does not provide a separate adjustment mechanism for adjusting the optical axis position of the first light (recording/playing light), but performs corrections using a known tracking control mechanism provided for position control by the irradiation of the second light.

In the case of providing a separate adjustment mechanism for the optical axis position adjustment, in order to perform highly precise corrections such as performing corrections with a narrower width than a conventional one track width, the technical difficulty thereof is extremely great, and the adjustment mechanism is required to be a mechanism with extremely high precision and high rigidity, and has the problem wherein actual use thereof becomes very difficult. Conversely, accordingly to the present invention, such problems can be avoided, and actual use as a product can be made easier.

BRIEF DESCRIPTION OF DRAWINGS

FIG. 4 is a diagram illustrating a format of address information.

FIG. 16 is a diagram illustrating received optical spot position shifting of the reflected light in accordance with tilting or lens shifting.

FIG. 23 is a diagram illustrating a negative-type micro-hologram method.

DESCRIPTION OF EMBODIMENTS

Embodiments to carry out the invention (hereafter called embodiments) will be described below.
Note that the description will be in the following order.
<1. First Embodiment>
[1-1. Configuration of Recording Medium]
　Cross-sectional Configuration
　Configuration of Position Control Information Recording Layer
　Format of Address Information
[1-2. Configuration of Recording/Playing Device]
　Hologram Recording/Playing System and Optical System for Position Control
　Fine Adjustment Method of Spot Position
　Configuration for Spot Position Control
[1-3. Summary of Embodiment]
<2. Second Embodiment>
[2-1. Sampling of Focus Error Signal at Mirror Unit]
[2-2. Configuration of Recording/Playing Device]
<3. Third Embodiment>
[3-1. Generation of Tracking Error Signal by Difference in Sum Signals]
[3-2. Configuration of Recording/Playing Device]
<4. Fourth Embodiment>
[4-1. Generation of Tracking Error Signal Using Push Pull Signal at Mirror Unit]
[4-2. Configuration of Recording/Playing Device]
<5. Fifth Embodiment>
[5-1. Tilt Detection Using Push Pull Signal at Mirror Unit]
[5-2. Configuration of Recording/Playing Device]
<6. Sixth Embodiment>
[6-1. Bulk-Type Recording Medium]
[6-2. Recording/Playing Method of Bulk-Type Recording Medium]
[6-3. Configuration of Recording/Playing Device]
<7. Seventh Embodiment>
<8. Modified Example>

1. First Embodiment 1-1. Configuration of Recording Medium

Cross-Sectional Configuration

Figure 1:
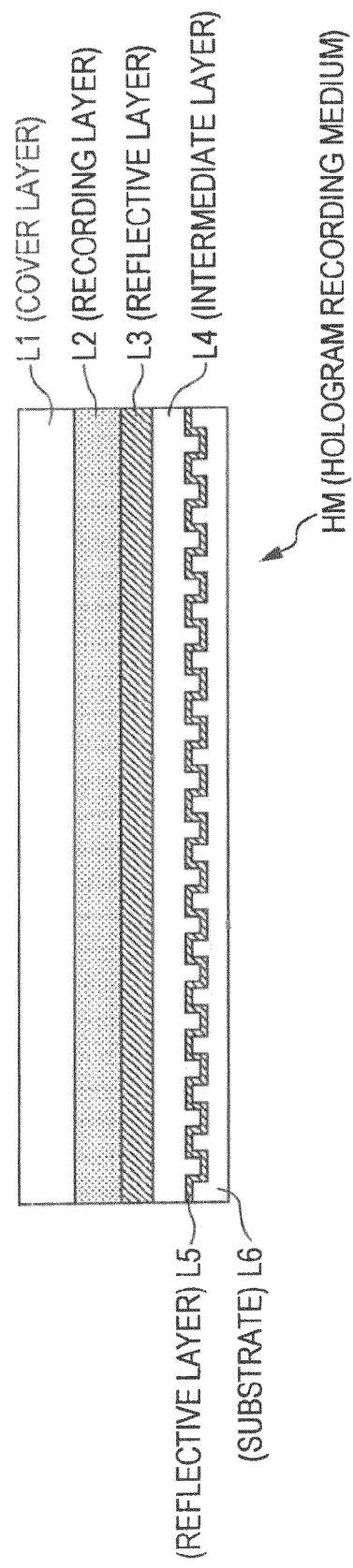
FIG. 1 is a cross-sectional configuration diagram of a disc-shaped recording medium as an embodiment of the present invention.

FIG. 1 shows a cross-sectional configuration of a hologram recording medium HM as an embodiment of a disc-shaped recording medium according to the present invention.

First, the hologram recording medium HM according to the present embodiment is a reflective recording medium, and has a reflective film L3 and a reflective film L5 as shown in the diagram. Also, a recording layer L2 whereupon hologram recording/playing is performed, and a position control information recording layer whereupon recording of address information and so forth is performed for position control with the uneven cross-sectional configuration on the substrate L6 in the diagram, are separately formed on the hologram recording medium HM.

Also, the hologram recording medium HM according to the present embodiment is a disc-shaped recording medium.

As shown in the diagram, a cover layer L1, recording layer L2, reflective film L3, intermediate layer L4, reflective film L5, and substrate L6 are formed, in order from the top layer, on the hologram recording medium HM.

The cover layer L1 is made up of a plastic base or glass plate or the like, and is provided for protection of the recording layer L2.

A photopolymer, for example, is selected as the material for the recording layer L2, and hologram recording/playing is performed with violet laser light (e.g. wavelength λ=405 nm, approximately) having a first laser 2 described later with FIG. 5 as the light source thereof.

Also, the reflective film L3 is provided, in the event that playing light according to an interference pattern (data) recorded on the recording layer L2 is obtained whereupon reference light from the violet laser light is irradiated at time of playing, so that this is returned as reflected light to the recording/playing device side.

The substrate L6 and reflective film L5 are provided for recording/playing position control.

Pit rows are formed on the substrate L6 in a spiral shape or concentric circle, for guiding the recording/playing positions of the hologram in the recording layer L2. In this case, the pit rows are formed by information recording such as address information being performed by a pattern of whether or not pits are formed, as described later.

The reflective film L5 is formed on the face (surface) on which the pit rows are formed on the substrate L6 by a sputtering or vapor deposition or the like, for example. The intermediate layer L4 formed between the reflective film L5 and reflective film L3 is an adhesive material such as a resin, for example.

Now, as also described later, according to the present embodiment, the red laser light having the second laser 20 shown in FIG. 5 (i.e. wavelength of approximately λ=650 nm) is irradiated onto the hologram recording medium HM, and position control (tracking servo control or the like) is performed using the reflected light obtained thus from the reflective film L5, whereby control of the hologram recording/playing position is performed by the violet laser light.

In this case, in order that position control is correctly performed, the red laser light has to reach the reflective film L5 provided as an uneven cross-sectional shape for position control. That is to say, the red laser light has to pass through the reflective film L3 formed on an upper layer from reflective film L5.

On the other hand, the reflective layer L3 has to reflect the violet laser light so that the playing light according to the hologram recorded on the recording layer L2 is returned to the recording/playing device side as reflected light.

From these points, the reflective film L3 uses a reflective film which has wavelength selectivity, through which violet laser light for hologram recording/playing passes, and through which red laser light for position control passes. That is to say, this has wavelength selectivity wherein light of an identified wavelength band as violet laser light is reflected, and light of other than this wavelength band is passed through.

By using the reflective film L3 having such wavelength selectivity, the red laser light correctly reaches the reflective layer L5 and the reflected light for position control is correctly detected on the recording/playing device side, while the playing light of the hologram recorded on the recording layer L2 is correctly detected by the recording/playing device.

Configuration of Position Control Information Recording Layer

Figure 2:
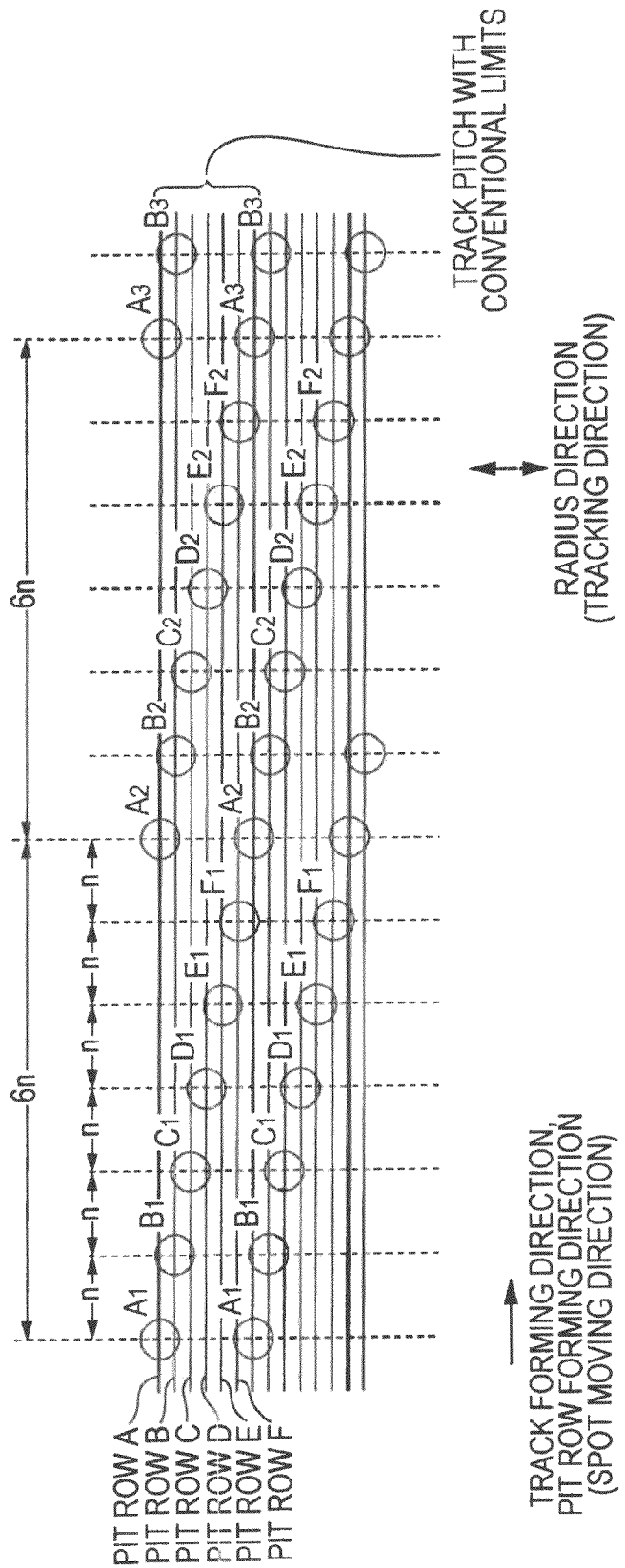
FIG. 2 is a diagram (plan view) of the surface of a position control information recording layer that is formed on the disc-shaped recording medium according to an embodiment, a portion of which is expanded and shown.

FIG. 2 is a diagram (plan view) of the surface of a position control information recording layer on the hologram recording medium HM (uneven on the substrate L6 is reflected off the reflective film L5 and formed), a portion of which is expanded and shown.

The hologram recording medium HM according to the present embodiment has a feature of an array of pit rows on the position control information recording layer.

First, in FIG. 2, the direction facing the right side from the left side on the paper is in the pit row forming direction, i.e. the track forming direction. The spot of the red laser light for position control as described above moves from the left side of the paper to the right side in accordance with rotation driving of the hologram recording medium HM.

Also, the direction (the vertical direction on the paper) that is orthogonal to the pit row forming direction is in the radius direction of the hologram recording medium HM.

Also in FIG. 2, A through F shown with white circles in the diagram shows pit formable positions. That is to say, on the position control information recording layer, the pits are formed only on the pit formable positions, and pit formation is not performed other than at the pit formable positions.

Also, the separate reference symbols of A through F in the diagram indicate the separate pit rows (separate pit rows arrayed in the radius direction), and the numbers appended to the reference symbols of A through F indicate the separate pit formable positions on the pit rows.

Now, the spacing indicated with the block bold lines in the diagram indicate the minimum track pitch that can be realized with a conventional hologram recording medium 100 (track pitch of conventional limitations). As we understand from this also, with the hologram recording medium HM, a total of 6 pit rows of A through F are arrayed in the radius direction within the width of one track of conventional limitations.

However, simply arraying these multiple pit rows within the width of one track of conventional limitations, may result in the pit forming positions overlapping in the pit row forming direction, i.e. the pit spacing in the pit row forming direction may exceed optical limitations.

Thus, according to the present embodiment, between the multiple pit rows of A through F arrayed within the width of one track of conventional limitations, the following conditions are defined so that the spacing between pits in the pit row forming direction do not exceed optical limitations.

That is to say,
1) In each of the pit rows of A through F, the spacing of the pit formable positions is limited to a predetermined first spacing.
2) Thus each of the pit rows of A through F wherein the spacing of pit formable positions are limited are arrayed so that the respective pit formable positions are each shifted in the pit row forming direction by a predetermined second spacing (i.e., the phase of each pit row is shifted by the second spacing).

Now, let us say that the spacing in the pit row forming direction of each pit formable position in the pit rows of A through F arrayed in the radius direction (second spacing mentioned above) is n. At this time, each of the pit rows of A through F are arrayed so as to satisfy the condition in 2) above, whereby the spacing between each pit formable positions of pit rows A-B, pit rows B-C, pit rows C-D, pit rows D-E, pit rows E-F, and pit rows F-A all become n, as shown in the diagram.

Also, the spacing of the pit formable positions in each of the pit rows of A through F (first spacing mentioned above) realize a total of six pit row phases from A through F, so becomes 6n in this case.

According to the present embodiment, the information playing on the position control information recording layer is performed under the conditions of wavelength λ=650 and numerical apertures NA=0.65, similar to the case of a DVD (Digital Versatile Disc). Corresponding to this, with the present embodiment, a segment length of each pit formable position is the segment length worth 3 T which is the same as the shortest mark on a DVD, and the spacing between edges of each pit formable positions of A through F in the pit row forming direction is also set to a similar length worth 3 T.

Consequently, the above conditions 1) and 2) are satisfied.

Now, in order to understand the pit forming situation over the entire position control information recording layer, a more specific pit row forming method will be described with reference to the following FIG. 3.

Figure 3:
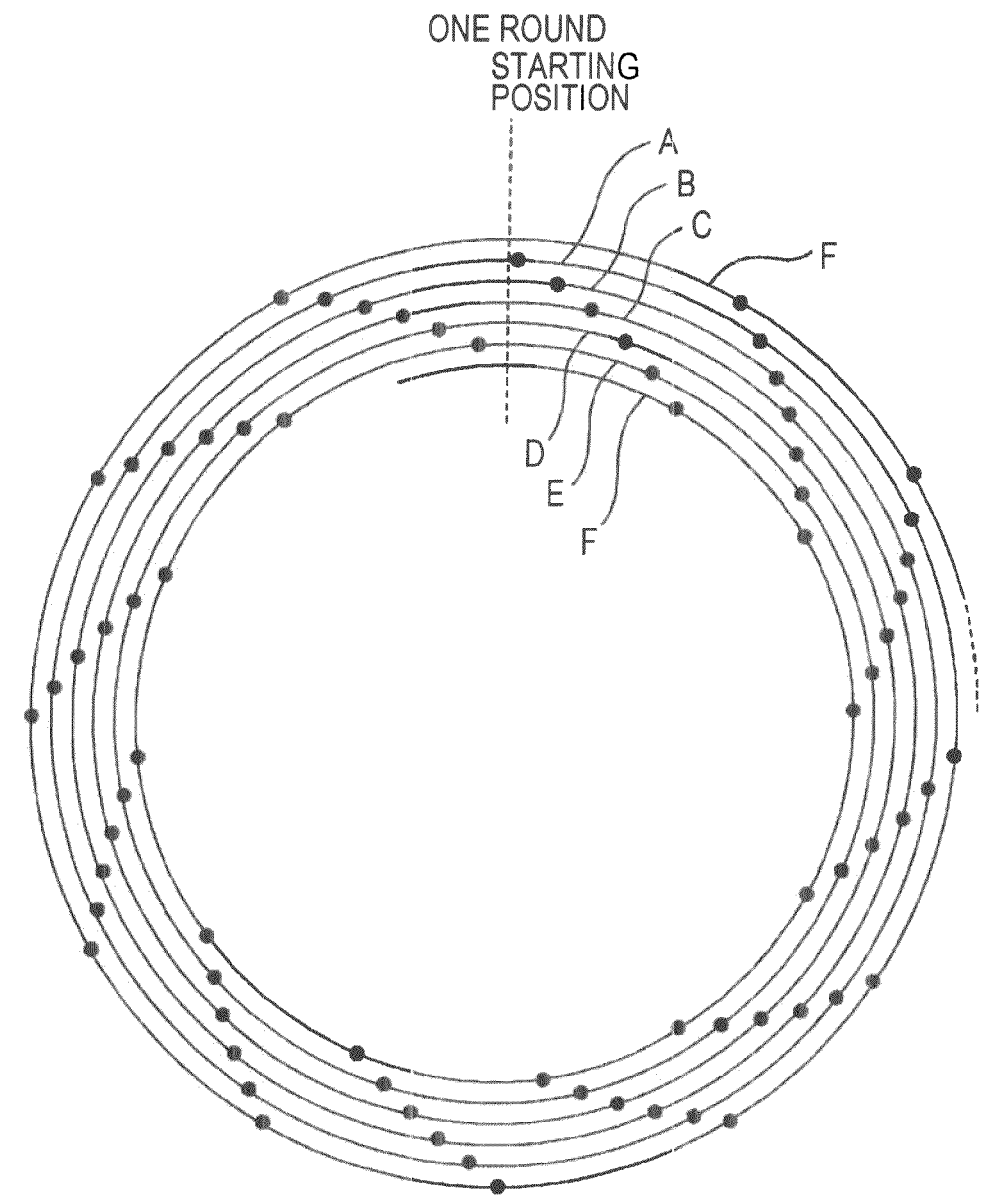
FIG. 3 is a diagram illustrating a pit forming state over the overall position control information recording layer.

Now that FIG. 3 schematically shows a portion of pit rows (seven rows worth) formed on the position control information recording layer of the hologram recording medium HM. In the diagram, the black circles indicate the pit formable positions.

As we can see from referencing this FIG. 3, the pit rows in the hologram recording medium HM according to the present embodiment are formed in a spiral shape.

According to the present embodiment, for each round of a pit row, the pit formable positions are defined so that the pit row phase shifts only the amount of the second spacing ("n"), whereby the above-mentioned conditions 1) and 2) are satisfied relating to the pit rows arrayed in the radius direction.

For example, in the example shown in FIG. 3, in the first round of the pit row, pit formable positions are defined so that the pit row phase for pit row F can be obtained, and in the second round of the pit row having the first round starting position (predetermined angle position) in the drawing, the pit formable positions are defined so that the pit row phase for pit row E can be obtained. Similarly thereafter, in the third round, pit formable positions are defined so that the pit row phase for pit row D can be obtained, pit row C for the fourth round, pit row B for the fifth round, pit row A for the sixth round, and again pit row F for the seventh round, and so on, such that the pit formable positions for each pit row round are defined so that the pit row phase is shifted in the amount of the second spacing n.

Format of Address Information

Next, an example of a format of the address information recorded on the position control information recording layer will be described with FIG. 4.

In FIG. 4, first, FIG. 4 (a) schematically shows the relation between pit formable positions of each pit row (A through F) which each has a different pit row phase. Note that in FIG. 4 (a), the pit formable positions are indicated by a "*" mark.

Now, as will be described later, the recording/playing device according to the present embodiment (recording/playing device 1) selects one pit row from the pit rows of A through F, and uses a tracking servo to target the selected one pit row.

However, the problem at this time is the point that each pit row of A through F is arrayed in the radius direction at a spacing exceeding conventional optical limitations. That is to say, in this case the tracking error signal (push pull signal) obtained by moving (running) the beam spot on the track, results in reflecting the pits of all of A through F, whereby even if the tracking servo is used based on the tracking error signal, the one selected pit row cannot be tracked.

Therefore the recording/playing device according to the present embodiment extracts the tracking error signal of the segment of pit formable positions in the selected pit row, and uses a tracking servo based on the extracted tracking error signal (intermittently, so to speak).

Similarly, in the case of reading address information also, a method is used whereby the sum signal (later-described sum signal) of the segment of pit formable positions in the selected pit row is extracted so that only the information recorded in the selected pit row is read out, and address information is detected based on the extracted sum signal.

In order to correspond to such an information detecting method, according the present embodiment, a format is used to express the "0" "1" of the channel data, by whether or not pits are formed in the pit formable positions. That is to say, one pit formable position handles one channel bit worth of information.

Additionally according to the present embodiment, one bit of a data bit is expressed with the "0" "1" data pattern of such multiple channel bits.

Specifically with the present example, as shown in FIG. 4 (b), four channel bits express the "0" "1" of the data bit, and for example a four-channel bit pattern "1011" expresses the data bit "0", and a four-channel bit pattern "1101" expresses the data bit "1".

What is important now is that the channel bit "0" is not repeated. That is to say, if the channel bit "0" is repeated, this means that, when the servo is performed using the tracking error signal intermittently as described above, a period will be continued whereby the error signal cannot be obtained, thereby securing the precision of the tracking servo becomes accordingly extremely difficult.

Therefore, according to the present embodiment, with a data bit definition such as described above, the condition is satisfied that the channel bit "0" is not repeated. That is to say, with such as data bit definition, the decrease in precision of the tracking servo can be suppressed to a minimum.

FIG. 4 (c) shows an example of a sync pattern.

For example, a sync pattern is expressed with a 12-channel bit as shown in the diagram, whereby the 8 bits in the first half are a channel bit pattern "11111111" that does not meet the above-mentioned data bit definition, and expresses a separate (type) sync with the latter 4 channel bit pattern. Specifically, if the 4-channel bit pattern following the above-mentioned 8 bits is "1011", then the type is Sync1, and if "1101", then the type is Sync 2.

With the hologram recording medium HM according to the present embodiment, the address information is recorded following a sync such as described above.

Now, address information is recorded at least as radius position information and angle position information.

Note that to confirm, with the present example, several pit rows of A through F are arrayed within one track width of conventional limitations, but recording the address information is performed so that the information is broken out by pit row so that the radius position of each pit row is expressed individually. That is to say, the same address information is not recorded as to each pit row of A through F arrayed within one track width of conventional limitations.

1-2. Configuration of Recording/Playing Device

Hologram Recording/Playing System and Optical System for Position Control

Figure 5:
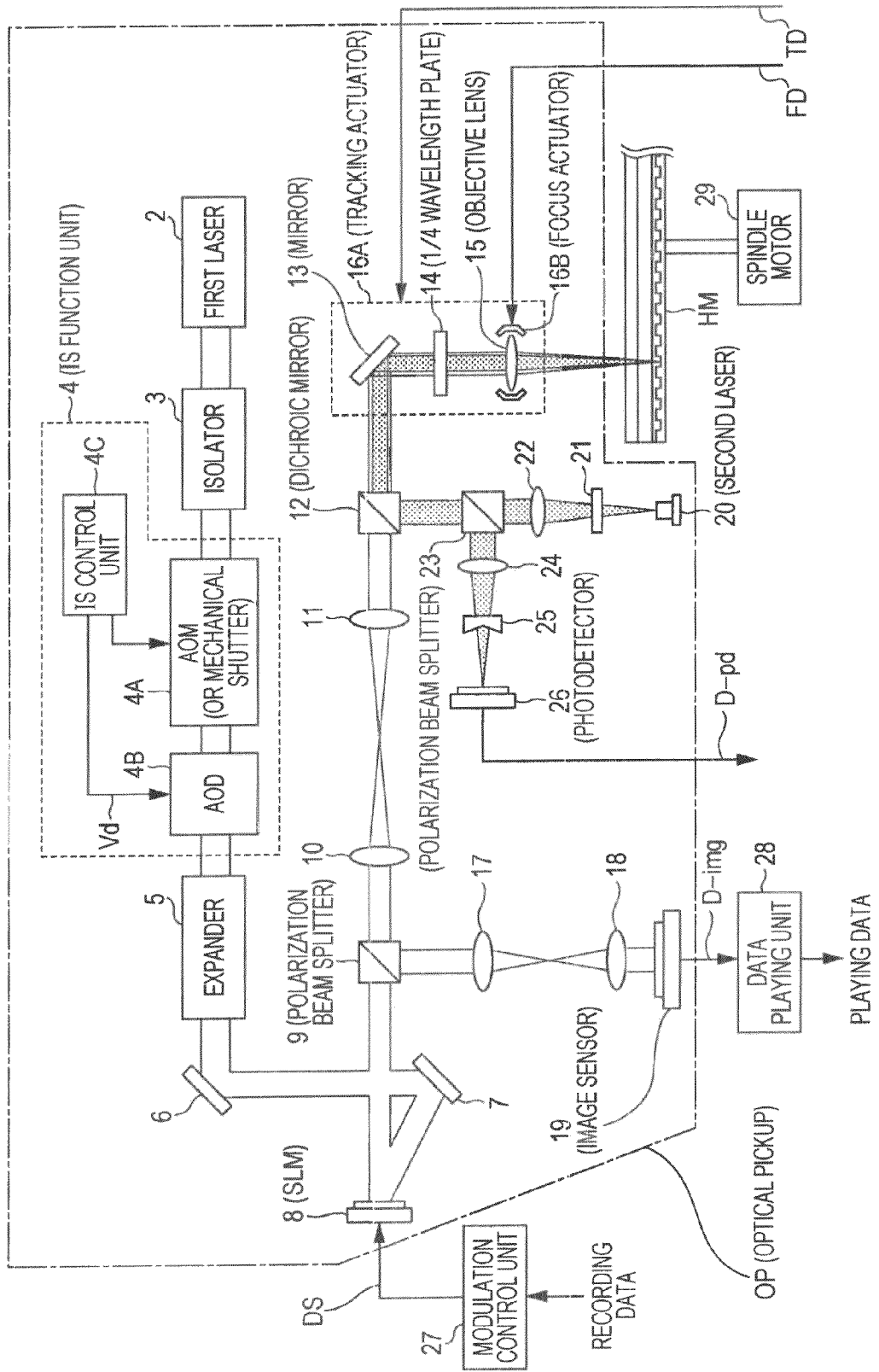
FIG. 5 is a block diagram illustrating a configuration primarily of a hologram recording/playing system and an optical system for position control of the recording/playing device according to an embodiment of the present invention.

FIG. 5 is a diagram showing an extraction of only the configurations of primarily the hologram recording/playing system and the optical system for position control as an internal configuration of the recording/playing device 1 that performs recording/playing of information corresponding to the hologram recording medium HM serving as the embodiment described above.

First, the recording/playing device 1 according to the present embodiment uses a so-called coaxial method as the hologram recording/playing method. That is to say, the signal light and reference light are disposed on the same axis, these are irradiated together onto the hologram recording medium HM set at a predetermined position to perform information recording with the interference pattern, and at the time of playing the reference light is irradiated as to the hologram recording medium HM, thereby performing playing of the information recorded with the interference pattern.

In FIG. 5, a spindle motor 29 for rotationally driving the hologram recording medium HM is provided in the recording/playing device 1. When the hologram recording medium HM is loaded in the recording/playing device 1, the hologram recording medium HM is maintained in a state that can be rotationally driven.

Recording/playing of a hologram page is performed by a laser light whereby the first laser 2 in the diagram serves as the light source is irradiated onto the hologram recording medium HM thus maintained.

The first laser 2 is a laser diode having an external resonator, for example, and outputs violet laser light with a wavelength of $\lambda=405$ nm. Hereafter, the laser light using the first laser 2 as the light source may also be called a recording/playing laser light a first laser light.

The recording/playing laser light emitted from the first laser 2 passes through an isolator 3 and passes through an AOM (acousto-optical modulator) 4A→AOD (acousto-optical deflector) 4B provided in an IS (image stabilizer) function unit 4, after which is adjusted to a desired beam diameter with an expander 5, and is irradiated into an SLM (spatial light modulator) 8 via a mirror 6→mirror 7.

Note that the IS function unit 4 will be described later.

The SLM 8 performs spatial light modulation to generate the above-described reference light and signal light as to the recording/playing light that is irradiated. A diffraction type of spatial light modulator that arrays multiple minute mirrors or a device that performs spatial light modulation in pixel increments such as that which uses a liquid crystal panel, for example, is selected as the SLM 8. Thus, signal light reflecting the recording data and reference light that has a predetermined intensity pattern can be generated.

Figure 6:
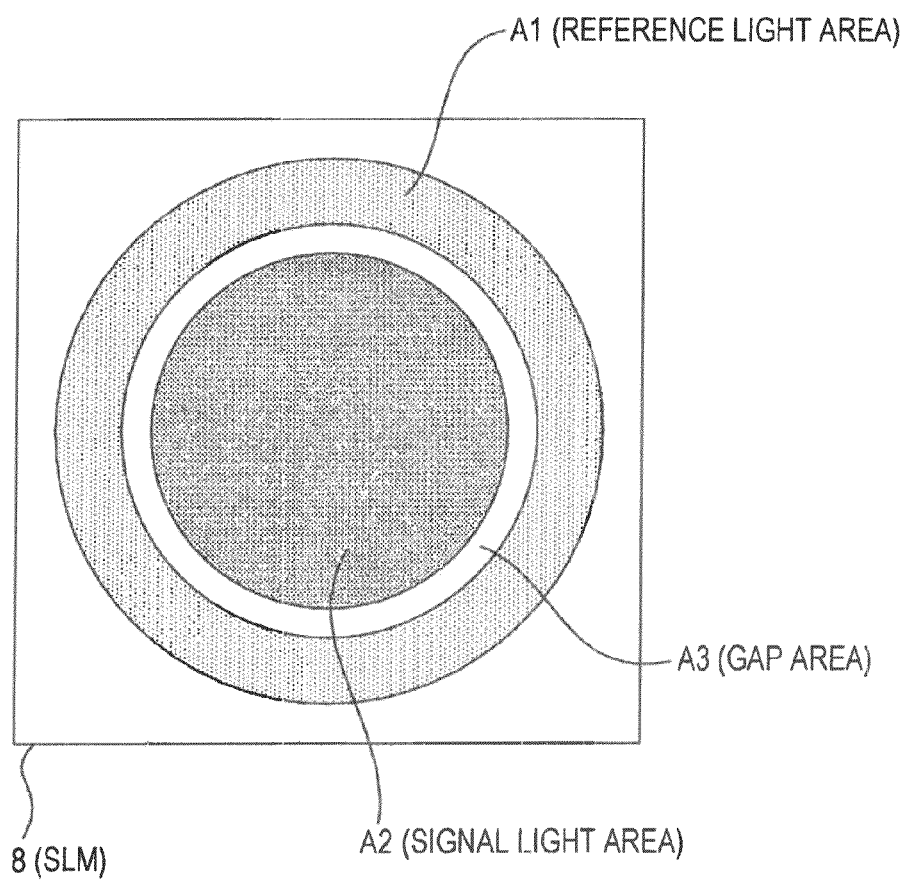
FIG. 6 is a diagram illustrating various areas set in spatial light modulation (SLM).

Thus, in the case that a coaxial method is used as the hologram recording/playing method, various areas such as shown in the following FIG. 6 are set in the SLM 8.

As shown in FIG. 6, in the SLM 8, a signal light area A2 is formed in a circular shape in the center portion thereof, and in the peripheral portion, via a ring-shaped gap area A3, similarly a ring-shaped reference light area A1 is set. The signal light area A2 is an area set as a signal light generating region. Similarly, the reference light area A1 is an area set as a reference light generating region.

Note that the gap area A3 is set as a buffer region for preventing the light via the reference light area A1 and signal light area A2 mutually interfere and become noise.

Returning to FIG. 5, the SLM 8 generates the signal light and reference light at time of recording, and the reference light at time of playing, based on the driving signal DS from a modulation control unit 27 in the diagram.

The modulation control unit 27 sets driving signal values for each pixel so that the pixel pattern in the signal light area A2 of the SLM 8 (e.g., an ON/OFF pattern for each pixel) becomes a pattern according to the input recorded data. Also, along with this, driving signal values are set for each pixel so that the pixel pattern in the reference light area A1 becomes a predetermined pattern that is determined beforehand, and areas other than those including the gap area A3 are all OFF. The driving signals DS from such set values are supplied to the SLM 8. Thus, at time of recording, signal light having a light intensity pattern according to the recorded data and reference light having a predetermined light intensity pattern are generated from the SLM 8.

Also, at time of playing, driving signal values are set and the various pixels of the SLM 8 are driven such that only the pixel pattern in the reference light area A1 becomes the predetermined pattern that is determined beforehand, and other areas are all OFF, whereby only reference light is output from the SLM 8.

The light subjected to spatial light modulation at the SLM 8 is irradiated into a polarization beam splitter 9 as shown in the diagram. The polarization beam splitter 9 passes the recording/playing laser light through which is thus irradiated from the SLM 8.

The laser light having passed through the polarization beam splitter 9 is irradiated into a dichroic mirror 12 after gone through a relay lens system made up of relay lens 10→relay lens 11.

The dichroic mirror 12 has wavelength selectivity, and is configured such that the recording/playing laser light irradiated via the relay lens system is passed through and the position control laser light using the later-described second laser 20 as a light source is reflected.

Accordingly, the recording/playing laser light via the relay lens system passes through the dichroic mirror 12.

The optical axis of the recording/playing laser light that passed through the dichroic mirror 12 is bent 90° with a mirror 13, as shown in the diagram, and is irradiated into a ¼ wavelength plate 14. The recording/playing laser light via the ¼ wavelength plate is irradiated onto the hologram recording medium HM via an objective lens 15.

The objective lens 15 is retained by a focus actuator 16B so as to be displaceable in the focus direction (direction of attaching/detaching to/from the hologram recording medium HM). Also, the [object lens 15/focus actuator 16B/¼ wavelength plate 14/mirror 13] are displaceable in the tracking direction (radius direction of the hologram recording medium HM) in an integrated manner, by the tracking actuator 16A.

A tracking drive signal TD and focus drive signal FD from a later-described servo circuit 34 (see FIG. 11) are supplied to the tracking actuator 16A and focus actuator 16B, respectively. Thus, control of the relative position relation in the tracking direction of the light irradiated onto the hologram recording medium HM via the objective lens 15 and the hologram recording medium HM, and focusing control of the light irradiated onto the hologram recording medium HM via the objective lens 15, are performed, whereby various servo operations of focusing/tracking and operations such as track jumping are realized.

Note that while omitted for diagram convenience, actually a slide mechanism is also provided for changing the position relation in the tracking direction of the optical pickup OP1 and hologram recording medium HM in the diagram which includes the objective lens 15.

Now, depending on the spatial light modulation at time of recording by the SLM 8 as described above, the signal light and reference light are generated based on the recording/playing light having the first laser 2 as the light source thereof. That is to say, at time of recording, the signal light and reference light are irradiated as to the hologram recording medium HM, and accordingly data is recorded on the hologram recording medium HM (recording layer L2) by the interference pattern (hologram) of the signal light and reference light.

Also, at time of playing, only the reference light is generated by the SLM 8, and this is irradiated as to the hologram recording medium HM by an optical path described above. Thus, by the reference light being irradiated as to the hologram medium HM, diffracted light (playing image) is obtained according to the interference pattern. The playing image thus obtained is returned to the device side as reflected light from the reflective film L3 formed on the hologram recording medium HM.

Upon being changed to parallel light via the objective lens 15, the returned light herein travels via the ¼ wavelength plate 14→mirror 13, and further via the dichroic mirror 12→relay lens 11→relay lens 10, upon which is irradiated into the polarization beam splitter 9.

Now, the returned light from the hologram recording medium HM thus irradiated into the polarization beam splitter 9 becomes linearly polarized light which is orthogonal in the polarization direction as to the linearly polarized light having passed through the polarization beam splitter 9 in the outward travel, by the reaction with the ¼ wavelength plate 14 and the reflective film (L3) formed on the hologram recording medium HM. Thus, the returned light from the hologram recording medium HM reflects the polarization beam splitter 9.

The returned light reflected by the polarization beam splitter 9 is irradiated into an image sensor 19 via a relay lens system made up of a relay lens 17→relay lens 18 as shown in the diagram.

The image sensor 19 is a CCD (Charge Couple Device) sensor or CMOS (Complementary Metal Oxide Semiconductor) sensor or the like for example, and receives the returned light (playing image) from the hologram recording medium HM irradiated as described above and converts this to an electrical signal to obtain an image signal. The image signal thus obtained reflects a light intensity pattern (i.e., "0" "1" pattern) provided as to the signal light at the time of recording. That is to say, the image signal thus detected with the image sensor 19 becomes a readout signal for the recorded data as to the hologram recording medium HM.

Note that the readout signal (image signal) obtained with the image sensor 19 is called a readout signal D-img.

A data playing unit 28 inputs the readout signal D-img obtained with the image sensor 19 and performed predetermined signal processing (decoding processing), thereby performing playing of the recorded data from a combination of the two values "0" and "1".

Note that in playing such recorded data with the "0" and "1", signal processing for performing "0" "1" data identification in data pixel increments of the SLM 8 is performed for the readout signal D-img with the image sensor 19. In this way, there are various types of techniques for generating recorded data of "0" and "1" from the output of the image sensor 19, and should not be restricted in particular here.

Now, based on the recording/playing method of the hologram described above, the IS function unit 4 mentioned above will be described.

In the case of rotationally driving the hologram recording medium HM to perform recording/playing of the hologram as in the case of the present embodiment, in order for the recording/playing laser light to be continuously irradiated for a predetermined time as to the same position on the recording medium, the recording/playing laser light is scanned periodically, at fixed intervals. That is to say, by performing scans of the laser light, for example interference patterns can be formed more accurately at the time of recording, and the detected light amount can be increased at the time of playing whereby more accurate readouts can be performed. A function to perform scans in this way periodically at fixed intervals, wherein the recording/playing laser light is irradiated for only a predetermined amount of time as to the same position on the recording medium, is called an IS (image stabilizing) function.

In FIG. 5, an AOM 4A and AOD 4B, and an IS control unit 4C for driving control of these, are provided to the IS function unit 4.

The AOM 4A is made up of a device (acousto-optical medium) that is driven by a high frequency signal of approximately a hundred and several tens of MHz for example, and that the transmittance changes according to changes in the amplitude of the high frequency signal. That is to say, a shutter function is realized by such transmittance changes.

Also, the AOD 4B is driven by a high frequency signal similar to the AOM 4A, but is made with an acousto-optical medium that has been configured to change the polarization angle of the light according to the changes in frequency of the high frequency signal. The AOD 4B scans the irradiated laser light by such control of the polarization angle.

Now, in order to irradiate the laser light on sequential positions for a fixed amount of time as the IS function, a blanking period becomes necessary for the period to move the laser spot from a certain position to the next position. During the blanking period, if the laser light continues to be irradiated, more than a small amount of recording material will react, whereby especially at time of recording, an afterimage will be appended to the recorded hologram (diffraction grating) in accordance with the laser spot movements, and becomes the cause for noise.

Therefore to realize an IS function, along with means to scan the laser light (AOD 4B), a shutter (AOM 4A) for significantly reducing transmittance of the laser light during the blanking period to prevent the reaction of recording material is necessary.

In the IS function unit 4, an IS control unit 4C performs driving control of the AOM 4A and AOD 4B so that changes to the polarization angle and transmittance of the laser light are provided in order to realize the above-described image stabilizing function. Specifically, a driving signal with a serrated waveform so that scan operations are obtained periodically at a fixed interval as described above is supplied to the AOD 4B, and on the other hand, a driving signal, with a rectangular waveform so that the laser light passes through during the scanning periods and the laser light is blocked during the blanking period between the scanning periods, is supplied to the AOM 4A. The IS function is realized in this way.

Note that as shown in the diagram, a mechanical shutter may be used instead of the AOM 4A.

Next, an optical system for performing control of the recording/playing position with the recording/playing laser light will be described.

In FIG. 5, the optical system for such position control is made up of a second laser 20, lens 21, collimation lens 22, polarization beam splitter 23, condensing lens 24, cylindrical lens 25, and photodetector 26.

The second laser 20 is configured so as to output laser light having a different wavelength from the recording/playing laser light which has the first laser 2 as the light source thereof. Specifically, in this case, the configuration is such that a red laser light having a wavelength of approximately 650 nm is output, similar to a DVD or the like.

The emitted light from the second laser 20 is irradiated into the dichroic mirror 12 after passing through the polarization beam splitter 23, via the lens 21→collimation lens 22.

As mentioned above, the dichroic mirror 12 is configured so that the position control laser light from the second laser 20 is reflected. The position control laser light reflected by the dichroic mirror 12 is irradiated onto the hologram recording medium HM via the mirror 13→¼ wavelength plate 14→objective lens 15, similar to the case of the recording/playing laser light described above.

Note that as we can understand from this description, the dichroic mirror 12 is a device that is provided so that the recording/playing laser light and the position control laser light are composited on the same optical axis and irradiated as to the hologram recording medium HM.

The position control laser light irradiated as to the hologram recording medium HM as above, by the above-described reflective film L3 having wavelength selectivity, arrives at the reflective film L5 (position control information recording layer) provided on a level that is lower thereof. That is to say, reflected light reflecting the bit row formed at the position control information recording layer is obtained. The reflected light (returned light) from the reflective film L5 is returned to the device side via the objective lens 15.

The returned light of the position control laser light via the objective lens 15 is irradiated into the dichroic mirror 12 via the ¼ wavelength plate 14→mirror 13. At the dichroic mirror 12, the returned light of the position control laser light is reflected, and the reflected light thereof is irradiated into a polarization beam splitter 23. Similar to the case of the polarization beam splitter 9 above, with the polarization beam splitter 23, the returned light thus irradiated is reflected. Consequently, the returned light of the position control laser light is irradiated as to the photodetector 26 via the condensing lens 24→cylindrical lens 25.

The photodetector 26 receives the returned light of the position control laser light irradiated as described above, and obtains a received light signal D-pd according to the pit rows formed on the position control information recording layer of the hologram recording medium HM.

Thus, based on the received light (reflected light signal) D-pd of the position control laser light obtained with the photodetector 26, minute adjustment controls of the spot position, address information detection, and so forth can be performed to serve as embodiments to be described below.

Note that specific configurations to realize minute adjustment controls of the spot position and address information detection according to the embodiments will be described again later.

Minute Adjustment Method for Spot Position

Based on the description of the configuration of the recording/playing device 1 above, a minute adjustment method of spot positions as an embodiment will be described.

As described with reference to FIG. 34, in the case of using light that is separate from the hologram recording/playing light to perform control of the hologram recording/playing positions, shifts in the two optical axes can occur as a result of temporal changes or temperatures changes, for example. In the case that such optical axis shift occurs, even if reflected light of the position control laser light is used to perform position control with a tracking servo or the like, a problem occurs in that the hologram recording/playing positions cannot be controlled to the correct positions along the pit rows.

That is to say, because of this point, with the hologram recording playing system, the recording hologram rows may not be able to be accurately traced at the time of playing, and the hologram may not be appropriately played.

Alternatively, the problem of shifts between the hologram recording positions and playing positions, which results from such biaxial shift, also can occur in the case of performing playing for a disc wherein recording has been performed on another device. For example, in the case that the optical axis shift amount between the hologram position control light and recording/playing light at another device is α, in the case that the optical axis shift amount between position control light and recording playing light at this device is β, the hologram recorded with the other device cannot be appropriately played on the current device.

Therefore, with the hologram recording/playing system, it becomes necessary to provide some sort of means to correct such a shift between the hologram recording positions and playing positions.

However, a point of caution is a point wherein, at the time of playing the hologram, even if the irradiation position shift of the recording/playing light (reference light) as to the recorded hologram is minute, this tends toward a decrease in the diffraction effect (i.e., a decrease in the playing light amount). Therefore, in order to perform playing position corrections as to the hologram recording position, extremely highly precise adjustments are needed.

Specifically, the adjustment precision in this event has to be precision in the order of sub-microns.

To address this point, the present embodiment proposes a minute adjustment method for favorable spot positions in the case of performing corrections in shifts between such hologram recording positions and playing positions.

Figure 7:
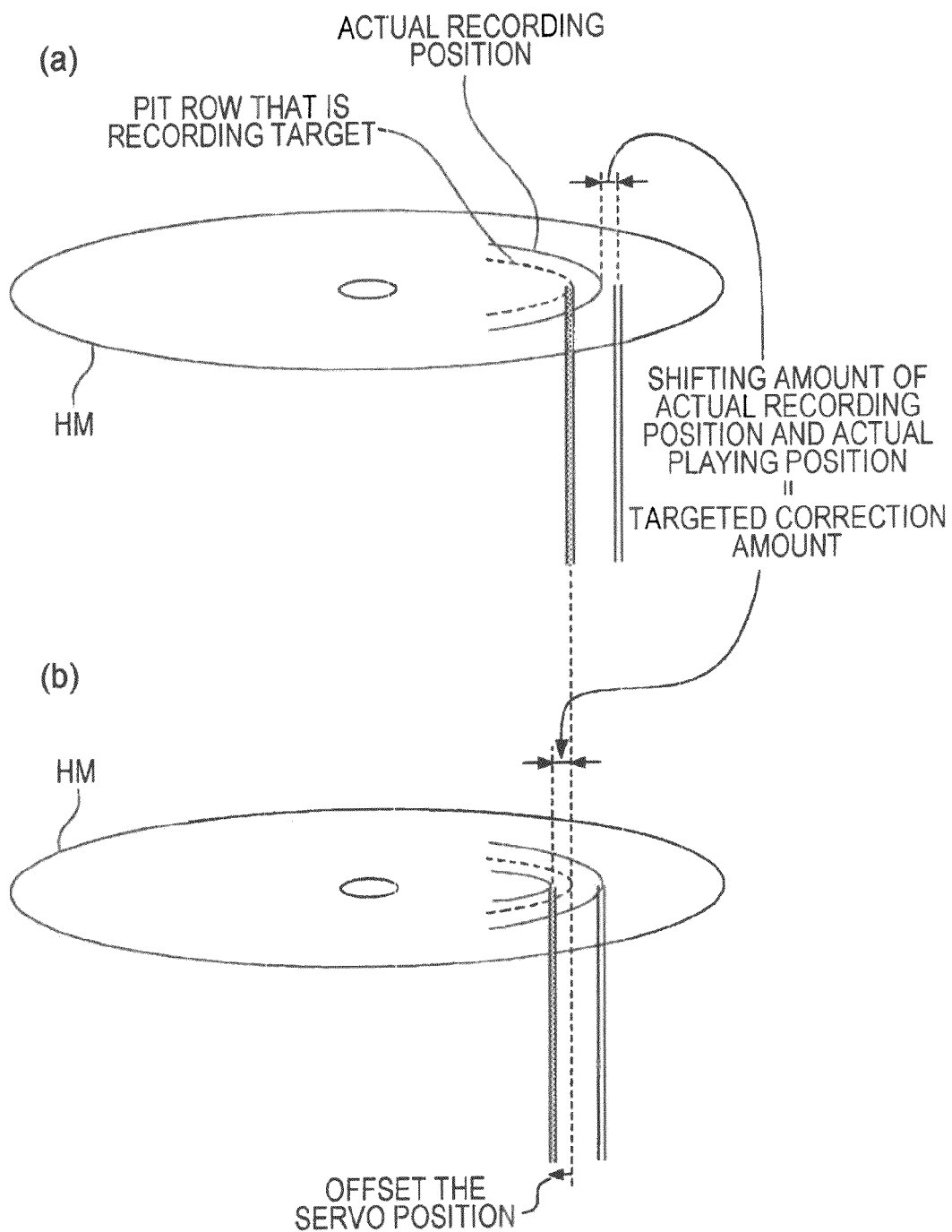
FIG. 7 is a diagram illustrating a correction (adjustment) method of the playing position.

First, a specific method for correcting the shifts between the hologram recording positions and playing positions will be described, with reference to FIG. 7.

FIG. 7(a) schematically shows the shift between the hologram recording positions and playing positions.

Figure 34:
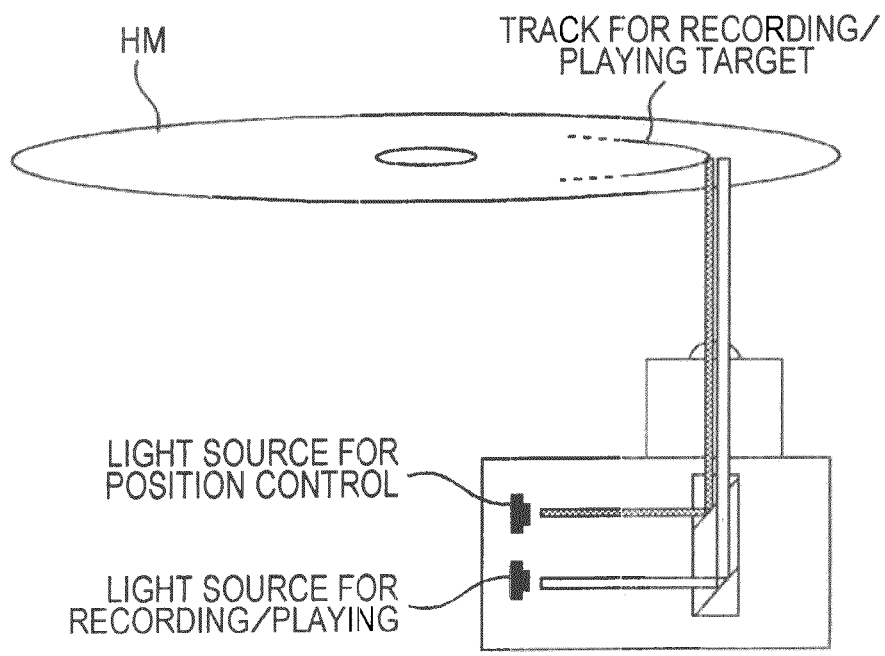
FIG. 34 is a diagram expressing the optical axis shift of the recording/playing light and the position control light irradiated onto the hologram recording medium.

First, in the case that an optical axis shift occurs between the hologram recording positions and playing positions as described above, even if hologram recording is performed using the pit rows (address) existing at the time of recording as targets, the hologram rows actually recorded (hologram recording positions) are not formed on the above-mentioned target pit rows (state in FIG. 34). At this time, if the shift amount of the two optical axes at time of playing is the same as at the time of recording there is no problem, but the optical axis position shifting amount at the time of playing is not necessarily the same as the shifting amount at the time of recording (due to temperatures changes or differences in devices). Accordingly, as shown in FIG. 7(a), even if the pit rows serving as the targets are traced at the time of playing, shifts can occur between the actual hologram recording position and playing position, whereby appropriate playing cannot be performed.

Thus, while detecting the shift amount between the actual recording positions and playing positions with some sort of method, using the shift amount herein as a target correction amount, a servo position is offset by the amount of correction herein as shown in FIG. 7(b). That is to say, the pit rows serving as targets for the tracking servo which performs based on the position control light are changed to pit rows on the positions separated in the amount according to the correction amount from the recording target pit rows (playing target pit rows), whereby, as a result, the irradiation positions of the recording/playing light are positioned on the actual recording/playing positions to perform corrections.

At this time, with the hologram recording medium HM according to the embodiment described above, the pit rows are arrayed at a spacing that is narrower than a one-track width of conventional limitations. Therefore, the adjustment width from the offset of the servo positions as described above is extremely minute. That is to say, a highly precise correction can be made, exceeding conventional optical limitations.

Now, with the hologram recording medium HM according to the present embodiment, the pitch in the pit row radius direction is narrower than the track pitch of conventional limitations, whereby, if hologram recording is performed along one pit row, the hologram recording pitch becomes excessively narrow, and correct recording/playing cannot be performed. Therefore, hologram recording as to the hologram recording medium HM according to the present embodiment is not performed by tracing one pit row, but is performed so as to obtain an appropriate radius direction pitch.

For example, in the case that an appropriately formed pitch in the hologram radius direction equates to 10 pit rows, the hologram recording can be performed using a method of jumping the next 10 rows after having completed recording of one round of a pit row. That is to say, one round of a certain pit row is recorded→10 pit rows are jumped→one round of the pit row after jumping is recorded→10 pit rows are jumped→one round of the pit row after jumping is recorded . . . is repeated, whereby hologram recording is performed in a form close to concentric recording.

Regardless, in the case of using the hologram recording medium HM according to the present embodiment, if recording along one pit row is performed, the hologram radius direction pitch becomes excessively narrow, whereby the hologram recording is performed with a hologram forming pitch in the radius direction as the appropriate pitch.

Therefore, as we can understand from this, with the hologram recording medium HM according to the present embodiment, the forming pitch of the pit rows formed on the position control information recording layer becomes considerably narrow as compared to a pitch of the track where the hologram is recorded.

Now, the target correction amount needed to realize the above-described correction method can be obtained by performing calibration before playing, for example. Specifically, if the pit row with the greatest amount of playing light from the nearby pit rows is obtained as a standard of the pit rows for playing (pit row for recording), the number of pit rows to this pit row becomes the target correction amount.

Note that the present embodiment only proposes a minute adjustment method for performing corrections in playing positions as described above, and does not propose the playing position correction method itself. That is to say, the present embodiment proposes a method for minute adjustments of the playing positions which is necessary for realizing such playing position corrections.

Accordingly, with the present embodiment, any method may be used as a method to obtain the target correction amount, and should not be limited to the method described above.

Based on the above description, a specific method for realizing the minute adjustment of playing positions as described above will be described with reference to FIG. 8 through FIG. 10.

Figure 8:
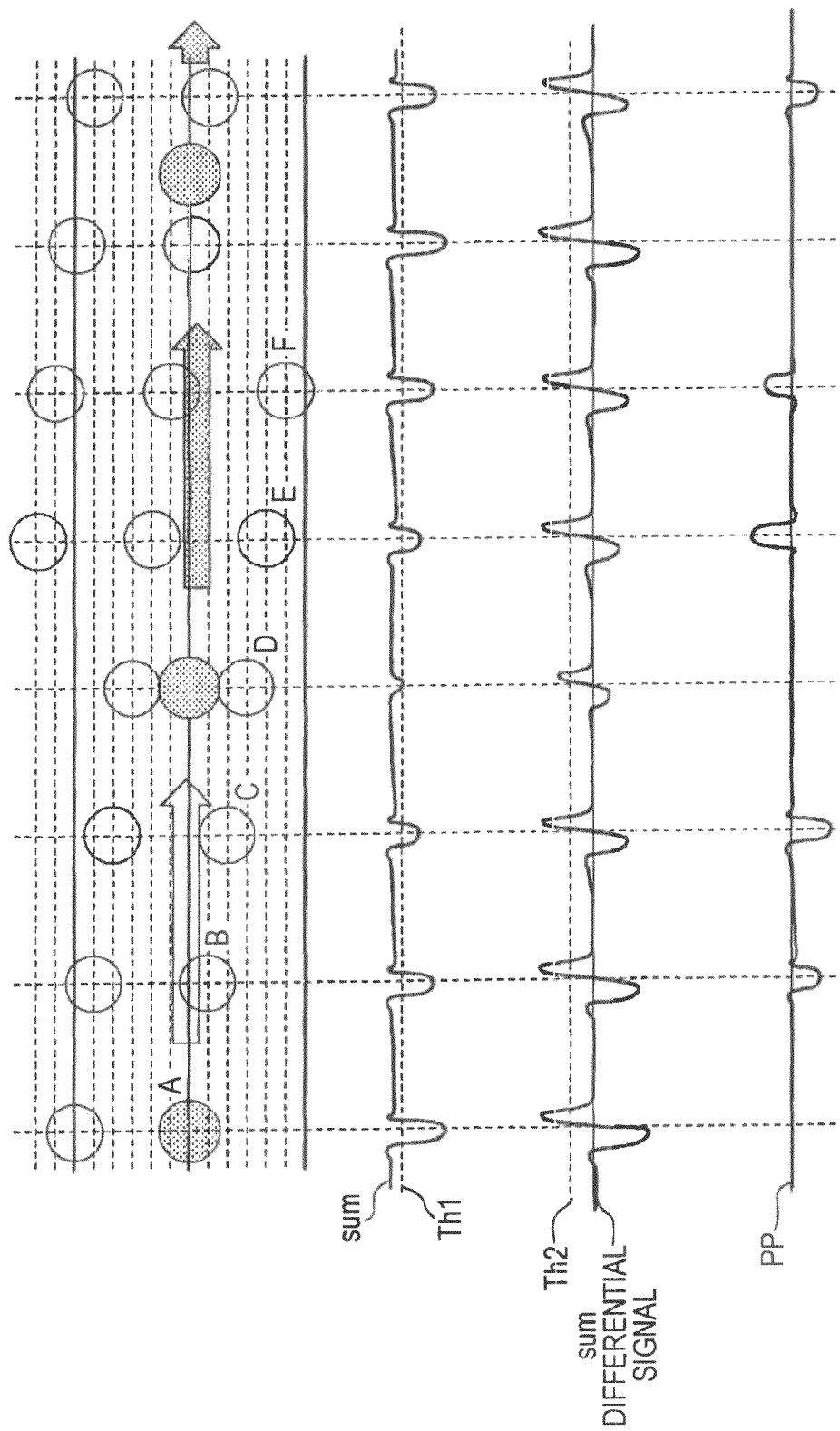
FIG. 8 is a diagram schematically illustrating the state of a spot of position control light moving across the position control information recording layer in accordance with the rotation driving of the recording medium, and the relation between waveforms of a sum signal, sum differential signal, and PP (Push Pull) signal obtained in the event thereof.

FIG. 8 schematically shows the state of a position control optical spot moving over the position control information recording layer in accordance with the rotational driving of the hologram recording medium HM, and the relation of the sum signal, sum differential signal, and PP (Push Pull) signal waveforms.

The sum signal is a sum signal of the recorded light signal D-pd obtained with multiple light-receiving devices as the photodetector 26 shown in FIG. 5, and the sum differential signal is a signal obtained by differentiating the sum signal. The PP signal is a tracking error signal wherein a position shift amount in the tracking direction of the spot positions as to the pits is calculated from the light receiving signal of the photodetector 26.

Now, for ease of description, in this diagram, pits are formed in all of the pit formable positions in the diagram.

As shown in the diagram, as the beam spot of the position control light moves according to the rotation of the hologram recording medium HM, the sum signal peaks the signal level thereof in the cycle corresponding to the array spacing of the pit row forming direction of the various pits A through F. That is to say, the sum signal shows the spacing in the pit for forming direction (forming cycle) of the various pits A through F.

In the example in this diagram the spot moves along the pit row A, whereby the peak value of the sum signal becomes greatest when passing the pit A forming position in the pit forming direction, and the peak values tend to gradually decrease over the various forming positions of pit B through pit D. Thereafter, the peak value changes to an upward tendency in the order of the pit E forming position→pit F forming position, and the peak value is greatest when reaching the pit A forming position again. That is to say, at the forming positions of the pits E and F in the pit row forming direction, the effect of the pit is received at the pit rows E and F which are adjacent to the outer side, whereby the peak values of the sum signal increases in the order of the forming positions of pits E and F.

Also, the sum differential signal generated by differentiating the sum signal and the PP signal serving as a tracking error signal obtain waveforms respectively as shown in the diagram.

The sum differential signal is used to generate a clock CLK according to the spacing in the pit row forming direction of the pit forming positions (to be more exact, pit formable positions) of the various pit rows A through F as described below.

Figure 9:
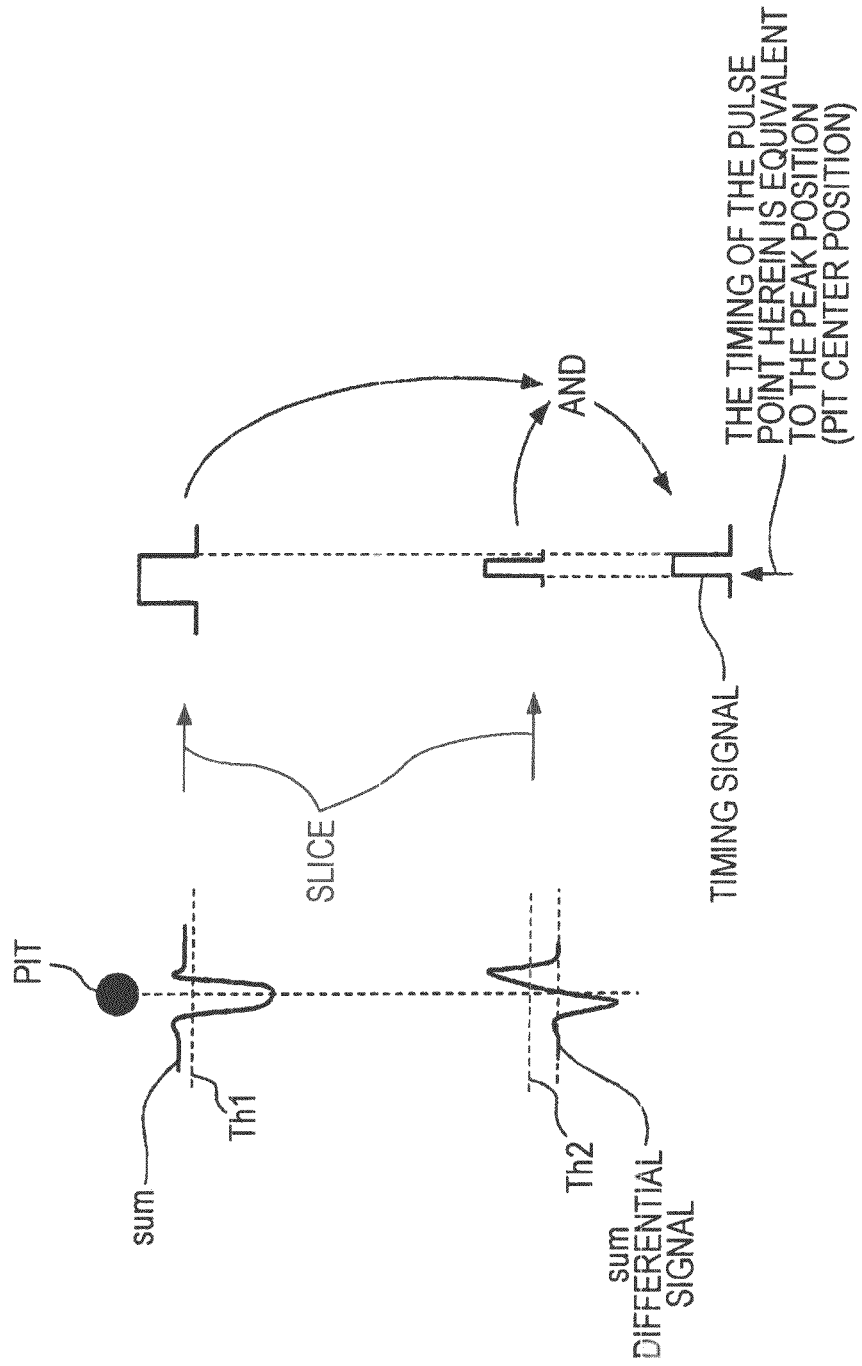
FIG. 9 is a diagram illustrating a timing signal generated based on the sum differential signal and sum signal when generating a clock.

FIG. 9 is a diagram to describe a timing signal generated based on the sum differential signal and sum signal when generating the clock CLK.

According to the present embodiment, the clock CLK generates a signal wherein the position (timing) equivalent to the center position (peak position) of each pit is the pulse position (timing). Specifically, a signal wherein the sum signal is sliced with a predetermined threshold Th1 shown in FIG. 8 and a signal wherein the sum differential signal is sliced similarly with a predetermined threshold Th2 are generated, and a timing signal having a pulse timing equivalent to the peak position by taking the AND thereof is generated.

Figure 10:
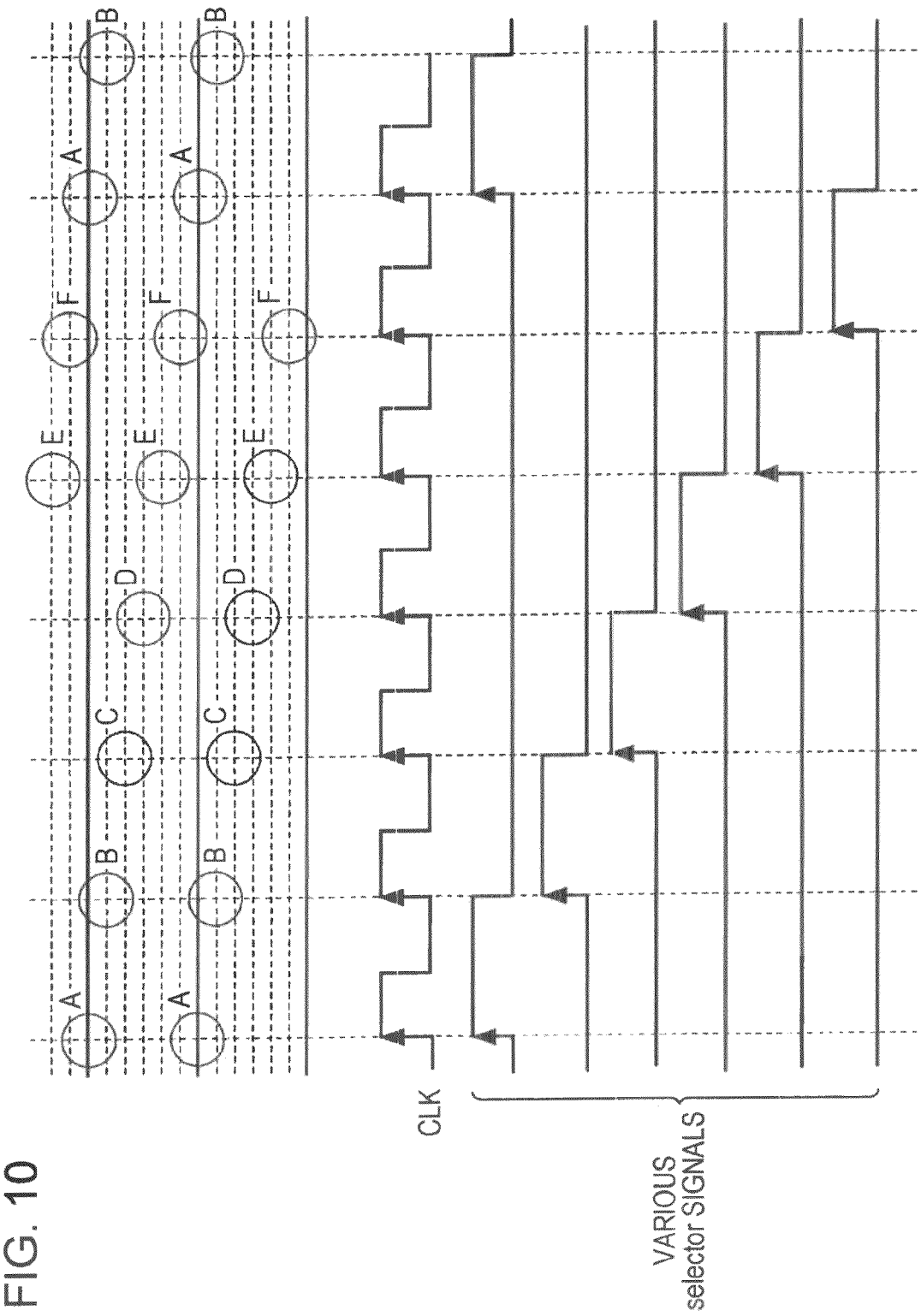
FIG. 10 is a diagram schematically illustrating the relation between a clock generated from the timing signal, the waveforms of the various selector signals generated based on the clock, and (a portion of) various pit rows formed on the position control information recording layer.

FIG. 10 schematically shows the relation between the clock CLK generated from the timing signal that is generated with the above-described procedures, and the waveforms of the various selector signals generated based on the clock CLK, and (a portion of) the various pit rows formed on the position control information recording layer of the hologram recording medium HM.

As shown in the diagram, the clock CLK is a signal that rises at a timing corresponding to the peak position of each pit (pit formable position), and the intermediate point between the various pulse positions become the baseline position.

Such a clock CLK is generated by performing PLL (Phase Locked Loop) wherein the timing signal generated as described above is the input signal (standard signal).

Also, according to the present embodiment, six types of selector signals are generated indicating the timings of the pit formable positions of each of A through F, from the clock CLK having cycles according to the forming spacing of pits A through F. Specifically, these selector signals are generated by dividing the clock CLK into ⅙ of a cycle, and each of the phases thereof are shifted by ⅙ of a cycle. In other words, each of the selector signals have the pulse signals thereof shifted by ⅙ of a cycle, and are generated by dividing the clock CLK into ⅙ of a cycle at each timing.

These selector signals each serve as signals indicating the timing for the pit formable positions of the pit rows corresponding to A through F. According to the present embodiment, upon generating these selector signals, an optional selector signal is selected, and tracking servo control is performed in accordance with the PP signal within the period shown by the selected selector signal, whereby the beam spot of position control light is traced on an optional pit row from the pit rows A through F. That is to say, by doing so, the beam spot positions of the position control light can be traced on an optional pit row of A through F.

Thus, tracking servo control can be performed with an optional pit row out of the pit rows A through F as a target, whereby adjustments to the position control light to be performed at the correction of the playing position shifts can be performed at the spacing of the pit rows A through F. That is to say, the hologram playing positions can thus be minutely adjusted with a spacing that is narrower than a conventional one track width.

Configuration for Spot Position Control

Figure 11:
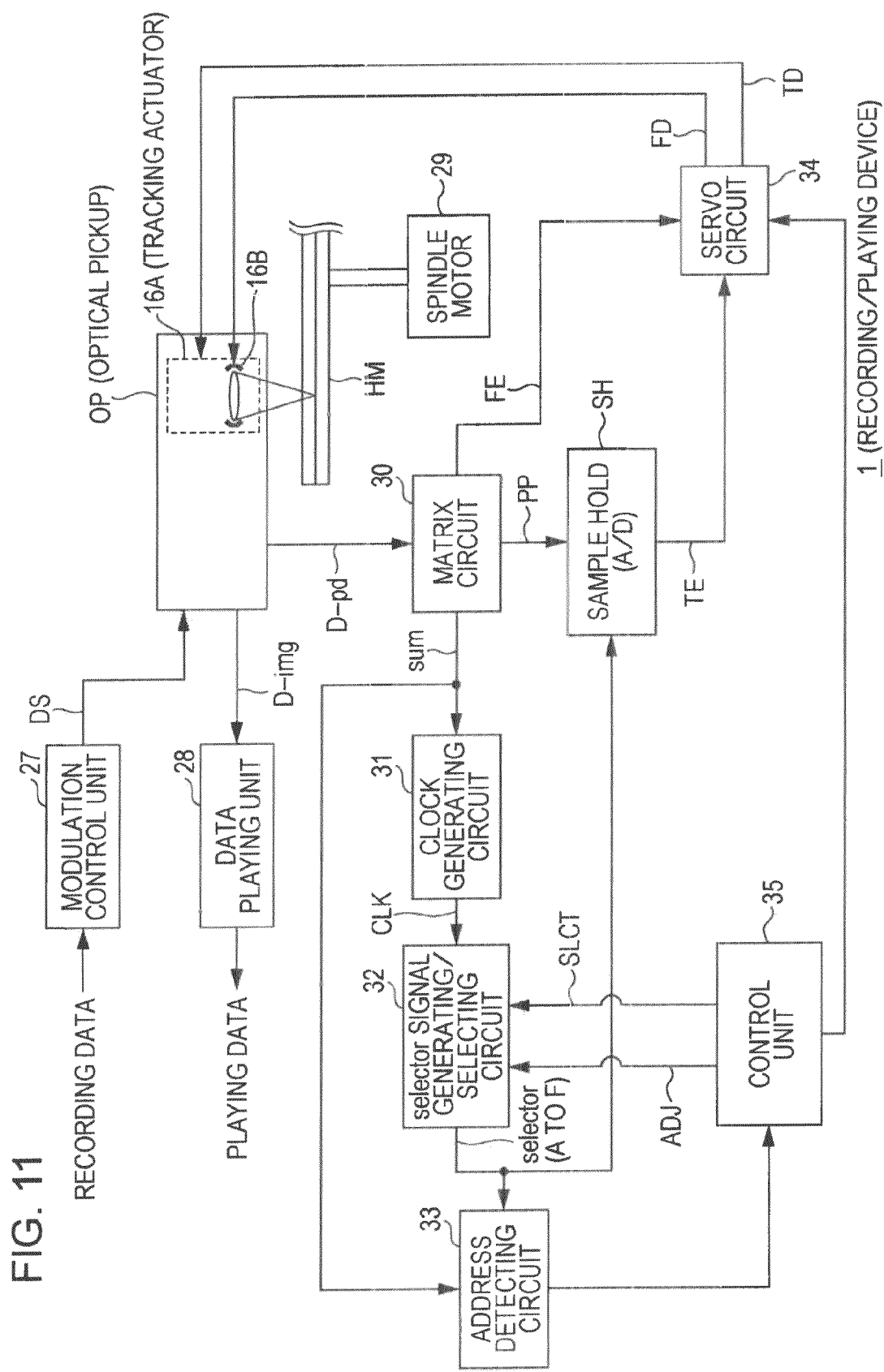
FIG. 11 is a block diagram illustrating an internal configuration of the overall recording playing device according to an embodiment.

FIG. 11 shows an internal configuration of the entire recording/playing device 1 according to an embodiment for realizing the minute adjustment method according to the embodiment described above.

Note that in FIG. 11, the optical pickup OP1, modulation control unit 27, data playing unit 28, and spindle motor 29 have already been described with FIG. 5, so a repeat of the description will be omitted.

In FIG. 11, the light receiving signal D-pd obtained with the photodetector 26 within the optical pickup OP1 described in FIG. 5 is input in a matrix circuit 30.

Based on the light receiving signal D-pd, the matrix circuit 30 generates a sum signal serving as the above-described sum signal, the PP signal serving as the tracking error signal, and a focus error signal FE (based on an astigmatic method).

The PP signal generated by the matrix circuit 30 is supplied to a sample hold circuit SH1.

Also, the sum signal is supplied to a clock generating circuit 31, and is also supplied to an address detecting circuit 33.

Also, the focus error signal FE is supplied to a servo circuit 34.

The clock generating circuit 31 generates a clock CLK according to the above-described procedures.

Figure 12:
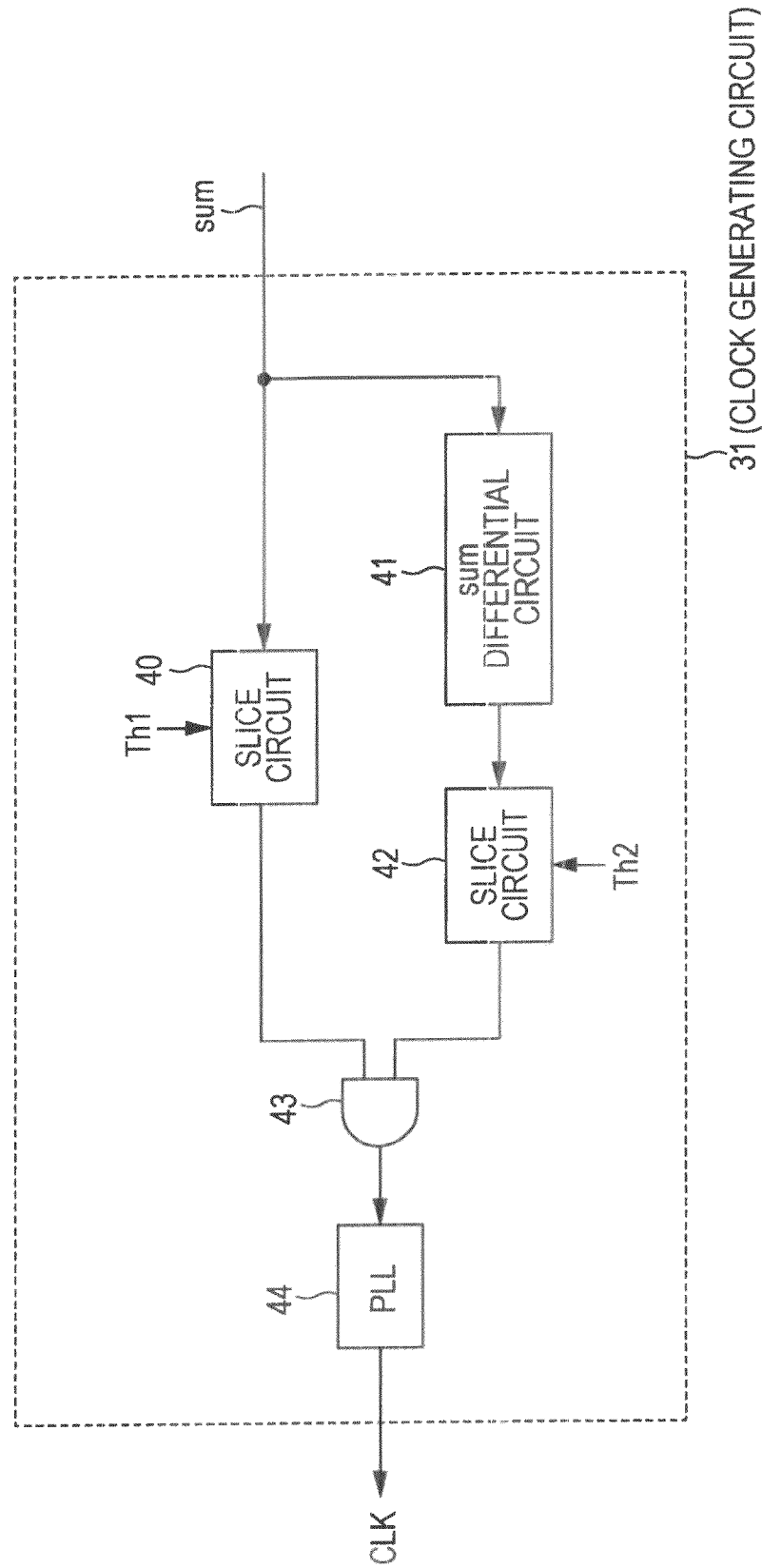
FIG. 12 is a block diagram illustrating an internal configuration of a clock generating circuit.

FIG. 12 shows an internal configuration of the clock generating circuit 31. As shown in FIG. 12, the clock generating circuit 31 has a slicing circuit 40, sum differential circuit 41, slicing circuit 42, AND gate circuit 43, and PLL circuit 44 provided thereto.

The sum signal from the matrix circuit 30 is supplied to the slicing circuit 40 and the sum differential circuit 41, as shown in the diagram. The slicing circuit 40 slices the sum signal based on the set threshold Th1, and outputs the result thereof to the AND gate circuit 43.

The sum differential circuit 41 differentiates the sum signal above and generates the sum differential signal described above. The slicing circuit 42 slices the sum differential signal generated by the sum differential circuit 41 based on the set threshold Th2, and outputs the result thereof to the AND gate circuit 43.

The AND gate circuit 43 takes the AND of the output from the slicing circuit 42 and the output from the slicing circuit 42, and generates the timing signal described above.

The PLL circuit 44 performs PLL processing using the timing signal obtained with the AND gate circuit 43 as the input signal, and generates the clock CLK described above.

Returning to FIG. 11, the clock CLK generated by the clock generating circuit 31 is supplied to a selector signal generating/selecting circuit 32.

Based on the clock CLK, the selector signal generating/selecting circuit 32 generates six types of selector signals expressing the timing of the pit formable positions for each of the pit rows A through F, and selects one selector signal specified by a later-described control unit 35 from the generated six types of selector signals.

Specifically, the selector signal generating/selecting circuit 32 generates signals of which the phase thereof have been shifted by ⅙ of a cycle, as signals of the clock CLK are divided as ⅙, thereby obtaining the six types of selector signals. The selector signal generating/selecting circuit 32 selects and outputs the selector signal of the phase specified by the selector signal SLCT supplied by the control unit 35.

Thus, the selector signal selected/output by the selector signal generating/selecting circuit 32 is supplied to each of the sample hold circuit SH1 and address detecting circuit 33.

Now, the selector signal generating/selecting circuit 32 also performs processing to adjust the phase of the selected selector signal, based on an adjustment signal ADJ supplied by the control unit 35, but this will be described later.

The sample hold circuit SH1 has an A/D converter, and sample-holds the PP signal supplied from the matrix circuit 30 at the leading edge of the selector signal.

Thus, the PP signal subjected to a sample hold by the sample hold circuit SH1 according to the selector signal is notated as tracking error TE, as shown in the diagram.

The servo circuit 34 generates a tracking servo signal by performing servo computations based on the tracking error signal TE obtained by the above sample hold processing, and supplies the tracking drive signal TD generated based on the tracking servo signal as to the tracking actuator 16A in the optical pickup OP1.

Based on such tracking drive signal TD, the tracking actuator 16A is subjected to driving control, whereby the spot position of the position control laser light having the second laser 20 as the light source is traced over one pit row of the various pit rows A through F.

Also, the servo circuit 34 turns off a tracking servo loop according to a jump command (pit jump command) from the control unit 35, and outputs a jump pulse serving as the tracking drive signal TD, thereby executing a jump operation between the pit rows.

Also, the servo circuit 34 performs servo computations based on the focus error signal FE supplied from the matrix circuit 30 to generate a focus servo signal, and provides a focus drive signal FD corresponding thereto to the focus actuator 16B in the optical pickup OP1, thereby performing focus servo control.

Note that while omitted in the diagram, a thread mechanism for moving the entire optical pickup OP1 in the tracking direction is actually provided, as mentioned above, and corresponding thereto the servo circuit 34 subjects the thread mechanism to driving control, based on a thread error signal generated based on the tracking error signal TE and the seek operation control from the control unit 35 and so forth, and moves the entire optical pickup OP1 in the tracking direction.

The address detecting circuit 33 performs detection of the address information recorded with the pit rows, based on the results of identifying H/L of the sum signals supplied from the matrix circuit 30 according to a timing shown by the selector signal supplied from the selector signal generating/selecting circuit 32.

As described with reference to FIG. 4, in the case of the present embodiment, the address information of the various pit rows are recorded as information of one channel bit as to whether a pit is formed at the pit formable positions in the pit row thereof. Accordingly, the address detecting circuit 33 identifies H/L of the sum signals at the pulse timing of the selector signal, thereby performing data identification of "0" "1" of the one channel bits, and based on the results thereof, performs address decoding processing according to the formats described in FIG. 4, and performs detection (playing) of the recorded address information.

The address information detected with the address detecting circuit 33 is supplied to the control unit 35.

The control unit 35 is made up of a CPU (Central Processing Unit), ROM (Read Only Memory), RAM (Random Access Memory), and so forth, and executes various computing processing and control processing based on the program stored in the ROM or the like for example, thereby performing overall control of the recording/playing device 1.

For example, the control unit 35 performs control as to the above-described selector signal generating/selecting circuit 32 and servo circuit 34, thereby performing control of the hologram recording/playing position.

Specifically, at the time of hologram recording, recording control processing is performed to set the hologram forming pitch in the radius direction to be an appropriate pitch as described above. Specifically, control is performed to repeat, as exemplified earlier, record one round of a certain pit row→jump 10 pit rows→record one round of the pit row after jumping→jump 10 pit rows→record one round of the pit row after jumping, for example.

Also, when the state is reached that playing of certain data recorded on the hologram recording medium HM is to be performed, first, a target address is specified and seek operation control is performed.

Now, the "target address" set in this event is the address reflecting the "target correction amount" obtained in the calibration performed beforehand. That is to say, the address for playing (i.e. the address wherein data is recorded) may be shifted away from the actual recording position, as shown in FIG. 7(*a*), so an address, offset from the address to be played in the amount of the target correction obtained beforehand through calibration, is set as the "target address". By performing seeking operation control to the "target address" thus set, shifting between the actual recording position and playing position can be corrected.

Upon performing such "target address" setting, the seek operation control in this case is performed, broadly in the sequence below, for example.

1) Move near the target address by moving the entire optical pickup OP1
2) Turn focus servo ON
3) Generate clock CLK and each selector signal based on sum signal
4) Tracking servo control with an optional pit row as a target, based on an optionally selected selector signal
5) Address (radius position and separate pit rows A through F) can be read from the tracking servo in 4) above, so pit row jumping is performed from the address thereof to the "target address".

The control unit 35 performs instructions as to the servo circuit 34 so that the operations in 1) and 2) above are executed. Also, the control unit 35 supplies a selection signal SLCT for instructing the selection of a selector signal by a predetermined phase as to the selector signal generating/selecting circuit 32, for selection of an optional selector signal in 4) above.

Also, in order for the operation in 5) above to be realized, the control signal 35 inputs address information to be detected by the address detecting circuit 33 according to the tracking servo in 4) above being used, and based on the address information, calculates the number of pit rows to jump that are needed until the "target address", performs instructions as to the servo circuit 34 to execute the pit row jumping operation for this number of jump rows.

Note that to specify for clarification, in the case of the present embodiment, the selection of a selector signal is needed to use the tracking servo. That is to say, as in 4) above, when using the tracking servo for reading out the address information at the movement destination, the point of selecting an optional selector signal and selecting an optional pit row is a unique configuration not found conventionally.

Also, in the case of the present embodiment, the hologram recording is not performed along one pit row, but is performed so that the appropriate pitch is realized as described above.

That is to say, corresponding thereto, the control unit 35 upon performing seeking operation controls to the target address as described above, performs controls so that spot position moving is performed with a method similar to the time of recording. Specifically, in the case of taking a recording method to perform pit row jumping every time one cycle of recording is completed as described above, the control unit 35 performs control as to the servo circuit 34 so that pit row jumping for a predetermined number of row is performed each time one cycle of playing is completed, and selection instruction of the selector signal as to the selector signal generating selection circuit 32.

Also, the control unit 35 also performs control processing for adjusting the phase of the selector signal for each track cycle when the tracking servo is in the ON state.

Here, as we can understand from the description in FIG. 4, with the hologram recording medium HM according to the present embodiment, the pit row phase differs with each cycle of pit row. That is to say, because of this, after the positions where the cycles of pit rows ends (i.e., the starting position of the next cycle), shifts occur in the phases of each selector signal.

Therefore with the present embodiment, processing is performed for adjusting the phase shift of the selector signal for each cycle. Specifically, at each cycle, the control unit 35 instructs the applicable phase adjustment amount as to the selector signal generating/selecting circuit 32 with the adjustment signal ADJ in the diagram, based on the phase adjustment amount information for each cycle determined beforehand.

The selector signal generating/selecting circuit 32 adjusts the phase of the selector signal in the amount of the phase adjustment amount instructed by the adjustment signal ADJ. Thus, the phase shifts occurring in the selector signal every cycle can be corrected.

To confirm, the procedures for phase adjustment control processing for each cycle that the control unit 35 performs will be described with the flowchart in FIG. 13.

First, in the processing in step S101 and step S102 in the diagram, until a condition is satisfied whereby one cycle ending position is reached or the playing is ended.

At this time, as described above, according to the present embodiment, a predetermined angle position is set to the starting position of a cycle, whereby determining in step S101 whether or not the cycle ending position has been reached can be performed based on the address information detected with the address detecting circuit 33.

In step S101, in the case that a positive result is obtained as the cycle ending position having been reached, the flow is advanced to step S103, and upon performing processing to output an adjustment signal ADJ that instructs the phase adjustment amount according to the current radius information, the flow is returned to step S101.

That is to say, as the above-described "phase adjustment amount information determined beforehand for each cycle", in this case each pit row (radius position) is correlated, and table information wherein phase adjustment amount information corresponding thereto is used, and in step S103, based on the table information, information of the phase adjusting amount according to the current radius position is obtained, and this is instructed as to the selector signal generating/selecting circuit 32 by the adjustment signal ADJ.

Figure 13:
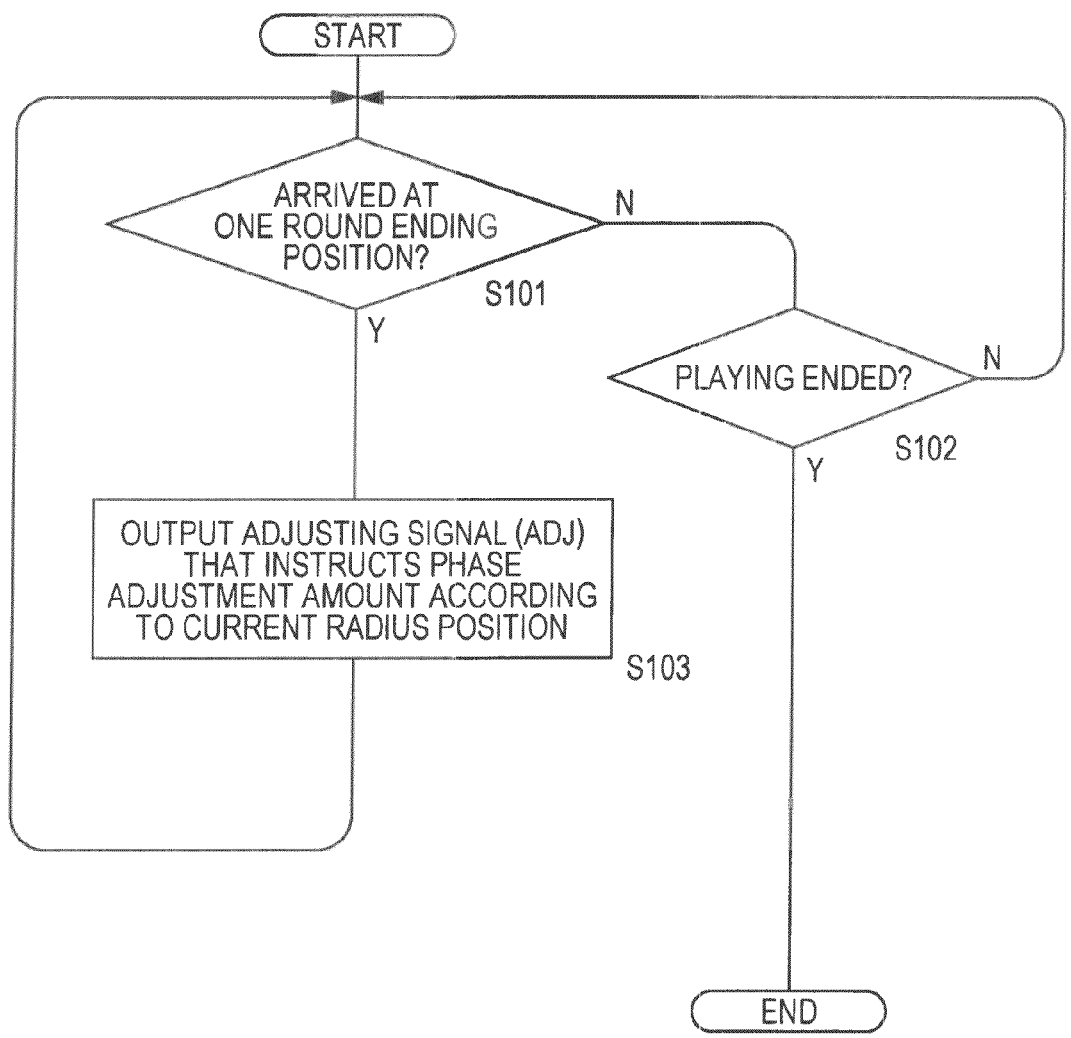
FIG. 13 is a flowchart describing procedures of the phase adjusting processing performed for each rotation.

Also, in step S102, in the case that a positive result is obtained as playing having been completed, the processing operations shown in FIG. 13 are ended.

Note that in the above description, the phase adjustment amount for each cycle is to be defined beforehand, but for example in the case there is regularity to the phase shift amount for each cycle, for example, the phase adjustment amount may be calculated for each phase and obtained.

1-3. Summary of Embodiment

As described above, according to the present embodiment, a hologram recording medium HM is used which has multiple pit rows arrayed within one track width of conventional limitations. Additionally, a method is used wherein, on the recording playing device 1 side, selector signals showing the timing for the pit formable positions at each of the pit rows each having different phases formed on the hologram recording medium HM are generated, a selector signal according to the pit row for which the tracking servo is used is selected therefrom, and the tracking servo is used based on the tracking error signal within the period shown by the selected selector signal.

Thus, the hologram playing position can be adjusted by a pitch that is narrower than on track width of conventional limitations (i.e. exceeding optical limitations). In other words, the hologram playing position can be minutely adjusted at a fine spacing exceeding conventional optical limitations, and a minute adjustment method that is favorable in the case of performing corrections between the hologram recording/playing positions requiring extremely high precision adjustments such as in sub-micron increments, for example, can be provided.

Also, according to the present embodiment, adjustments to the hologram playing position are performed by offsetting the spot position of the position control laser light from the pit rows targeted at the time of recording. That is to say, the adjustments in this case is performed using a current tracking control mechanism (tracking actuator 16A) provided to control the irradiation position of position control laser light.

By using such an adjustment method, in adjusting the hologram playing position, adding a separate configuration such as providing an actuator for adjusting the optical axis position on the recording/playing laser light side is unnecessary.

As described above, in the case of providing a separate adjustment mechanism for such optical axis position adjusting, in order to perform high precision corrections that exceed conventional optical limitations for example, the technical difficulty thereof becomes extremely high, and the adjustment mechanism also requires an extremely high precision/rigidity mechanism, whereby actual use thereof becomes a very difficult problem. Conversely, according to the present embodiment, such problems can be avoided, and actual use as a product is made easier.

2. Second Embodiment

2-1. Sampling of Focus Error Signal at Mirror Unit

Now, according to the first embodiment, servo control in the tracking direction is primarily discussed, and relating to the focus direction, simply generating a focus error signal FE based on a astigmatic method is described.

Now, as is well-known, in the case of performing detection of focus error components with an astigmatic method (astigmatic method) the diffracted light components (push pull signal components) of the pit formed on the disc overlaps with the noise components as to the focus error signal FE, and performing appropriate focus servo control may be difficult.

Particularly, in the case that various pit rows are formed at a narrow pitch exceeding optical limitations, as in the case of the present example, noise overall as to the focus error signal FE may be great, and countering this is effective.

As a focus error detecting method for avoiding noise influence from the pits, a beam size method is known, for example. However, a beam size method has greater optical design constraints as compared to a simple astigmatic method, and the design cost of the optical system and adjustment costs are accordingly required.

Alternatively, as a focus error detecting method for avoiding noise influence from the pits, a double astigmatic method is also know, but the double astigmatic method needs additional optical parts such as grating or the like, whereby parts costs and adjustment costs are increased.

The second embodiment proposes a method for obtaining a favorable focus error signal that suppresses the noise influence from the pits, while avoiding the problems that the conventional focus error detection methods have.

As we can understand from the above description also, the overlap in push pull signal components as to the focus error signal FE occurs in the pit forming portions. Accordingly, with the second embodiment, a method is used which samples and uses the focus error signal FE at the mirror portion which does not include such pit forming portions.

Figure 14:
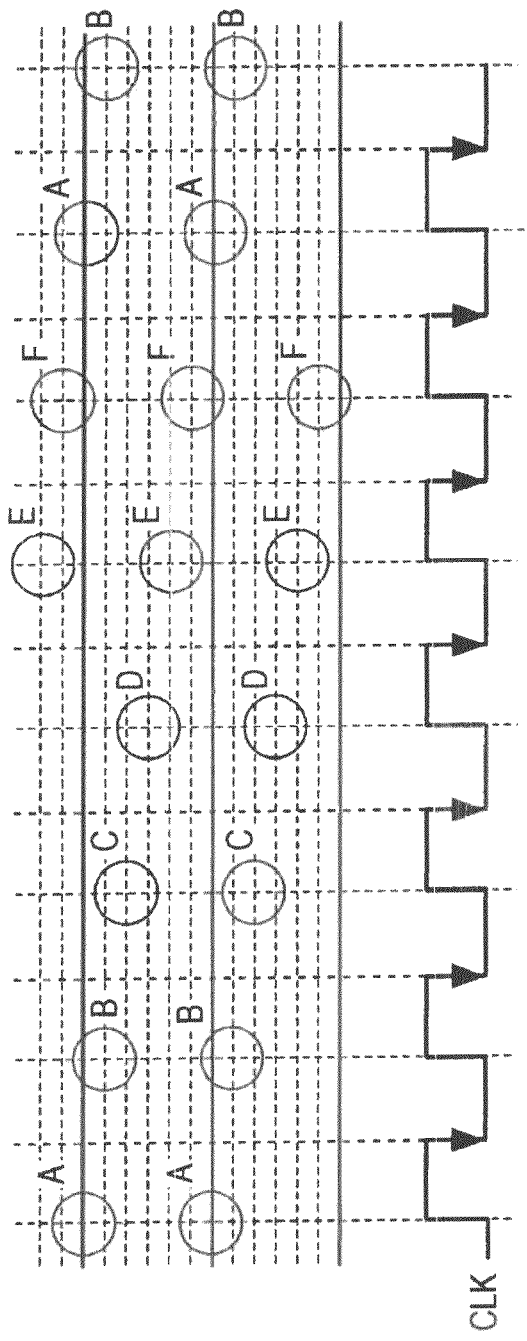
FIG. 14 is a diagram illustrating a detecting method of a mirror portion.

FIG. 14 is a diagram to describe the mirror portion detecting method, and schematically shows the relation between the pit rows formed on the hologram recording medium HM and the clock CLK.

As we can see by referencing FIG. 14, the baseline timing of the clock CLK described in FIG. 10 expresses the timing of the mirror portion of the hologram recording medium HM.

To address this point, the present embodiment samples the focus error signal FE obtained with an astigmatic method at the baseline timing of the clock CLK, and obtains a favorable focus error signal (called FE-m) with noise suppressed therewith.

2-2. Configuration of Recording/Playing Device

Figure 15:
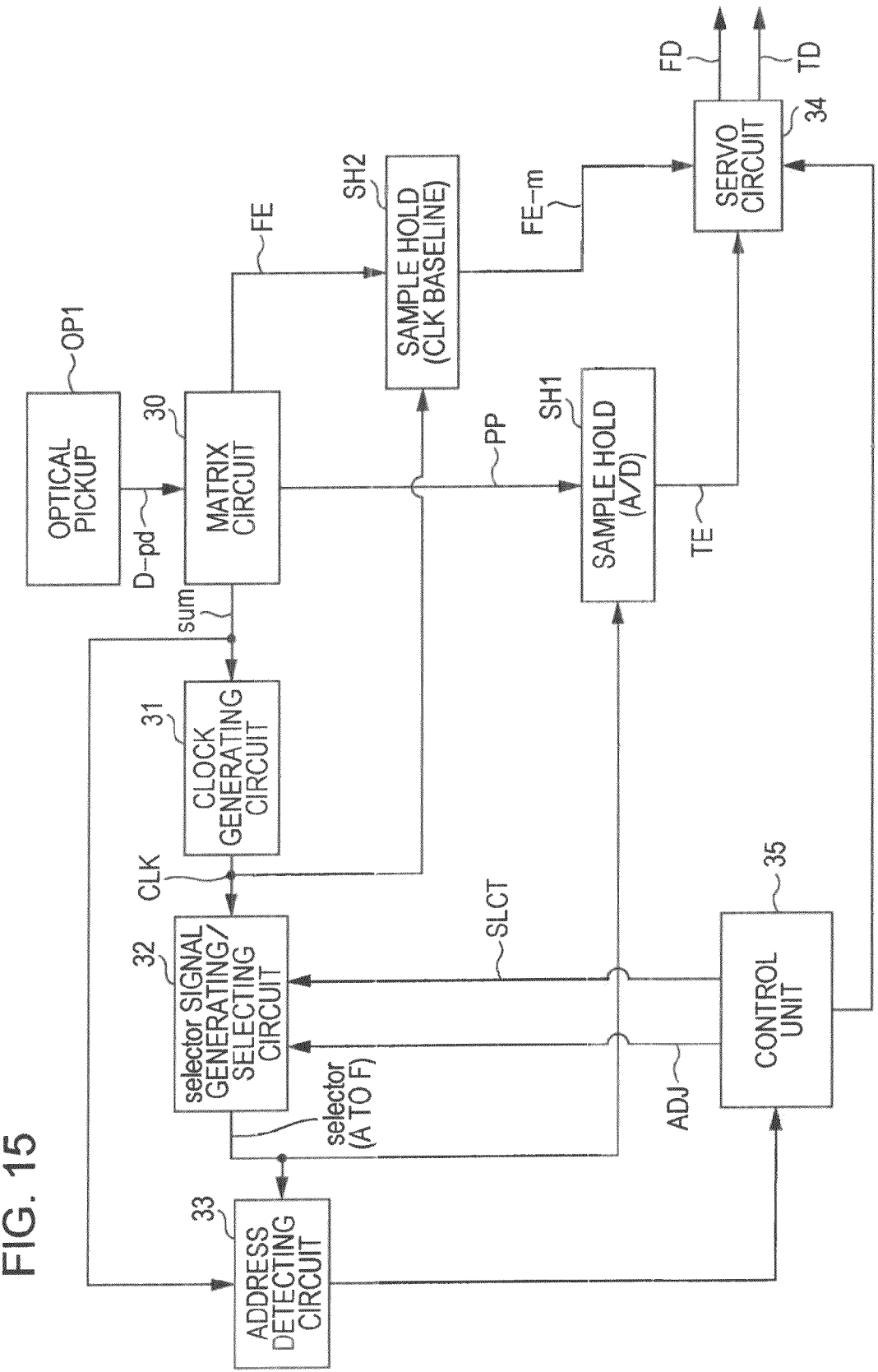
FIG. 15 is a block diagram illustrating an internal configuration of the recording/playing device according to a second embodiment.

FIG. 15 is a block diagram showing an internal configuration of the recording playing device serving as the second embodiment.

Note that in FIG. 15, the drawings of the modulation control unit 27, data playing unit 28, and spindle motor 29 shown in FIG. 5 and FIG. 11 above are omitted.

Also, in the descriptions below, the portions that have already been described will note the same reference numerals and omit the descriptions thereof.

As we can see from comparing this FIG. 15 and FIG. 11 above, the recording playing device of the second embodiment has a sample hold circuit SH2 added as to the recording playing device 1 of the first embodiment.

A focus error signal FE from the matrix circuit 30 is input in the sample hold circuit SH2, and the clock CLK from the clock generating circuit 31 is also input.

Differing from the case in FIG. 11, the focus error signal FA is not supplied as to the servo circuit 34, and is only supplied as to the sample hold circuit SH2.

The sample hold circuit SH2 subjects the focus error signal FE to a sample hold at the baseline timing of the clock CLK, and outputs the result thereof as a focus error signal FE-m to the servo circuit 34.

With such a configuration, a favorable focus error signal FE-m can be obtained that may prevent the overlap of push pull signal components, and consequently, can realize a focus servo control that is more stable and highly precise.

Also, at this time, the focus error detection method itself can use a simple astigmatic method, whereby, compared to a case of using a conventional method for avoiding the influence of the push pull signal components, such as the above-described beam size method or double astigmatic method for example, the configuration of the optical system can be very simple, and consequently, the manufacturing cost of the optical pickup OP1 (i.e. the overall recording/playing device) can be reduced.

3. Third Embodiment

3-1. Generation of Tracking Error Signal by Difference in Sum Signals

Next, a third embodiment will be described.

The third embodiment generates a tracking error signal with a method different from the case of the first embodiment.

Now, with the first embodiment, the push pull signal PP obtained at the pit formable positions on the pit rows for the tracking servo are subjected to sample holding, and the results thereof are used as the tracking error signals as to the pit rows for the tracking servo.

However, components of so-called tilting (skew) and lens shifting are known to become superimposed. To confirm, the lens shift indicates displacement in the tracking direction from the standard position of the objective lens 15 (center position on the design), and for example occurs resulting from the tracking servo control following the eccentric component of the disc.

FIG. 16 is a diagram to describe the light receiving spot position shifting of the reflected light accompanying the tilting and lens shifting, FIG. 16(a) shows a light receiving spot on the photodetector 26 in an ideal state wherein tilting/lens shifting is not occurring, and FIG. 16(b) shows a light receiving spot on the photodetector 26 in the case that tilting/lens shifting has occurred.

Note that in FIGS. 16 (a) and (b), the shaded portion shown in the light receiving spot indicate an overlap portion of a primary diffracted light component form the pits formed on the disc (push pull signal component overlap region).

First as a preface, in the case that a pair of light receiving devices A and B in the diagram and a pair of light receiving devices C and D are each adjacent pairs in the direction corresponding to the radius direction of the disc, the push pull signal PP is calculated as:

$$PP=(Ai+Bi)-(Ci+Di) \qquad \text{[Expression 1]}.$$

However, in [Expression 1], Ai, Bi, Ci, and Di are light receiving signals of the light receiving devices A, B, C, D, respectively.

Now, a beam spot of the second laser light is assumed to accurately trace over the targeted pit row.

In this case, if in the ideal state of FIG. 16(a) wherein tilting/lens shifting is not occurring, the value of the push pull signal PP calculated in accordance with the [Expression 1] becomes "0".

Conversely, in the case that a receiving optical spot position shift has occurred in accordance with a tilt/lens shift such as shown in FIG. 16(b), the value of the push pull signal PP calculated in [Expression 1] becomes a value different from "0" which should be obtained, and a difference occurs.

As we can understand from this, offsetting in accordance with tilting/lens shifting occurs in the push pull signal PP.

If the offset components in accordance with such tilting and lens shifting is to an extent that can be ignored, the tracking error signal TE generating method described with the first embodiment is valid, but with the third embodiment, a tracking error signal TE generating method that can avoid the influence from the offset components is proposed in order to further improve the precision and stability of the tracking servo control.

Conventionally, a so-called 3-spot method is knows as a tracking error detecting method to avoid the influence of offsets that are in accordance with tilting and lens shifting, but the 3-spot method needs additional optical parts such as grating, whereby the parts costs and adjustment costs may increase accordingly.

Also, a DPP (Differential Push Pull) method is also known as a tracking error detecting method for avoiding the influence of offsets, but a DPP method also needs additions such as grating, whereby the parts costs and adjustment costs may increase accordingly.

While seeking to resolve the problems that these conventional tracking error detecting methods have, in order to avoid the influence of offsets that are in accordance with tilting and lens shifting, with the third embodiment a tracking error signal is generated by a method described below.

Figure 17:
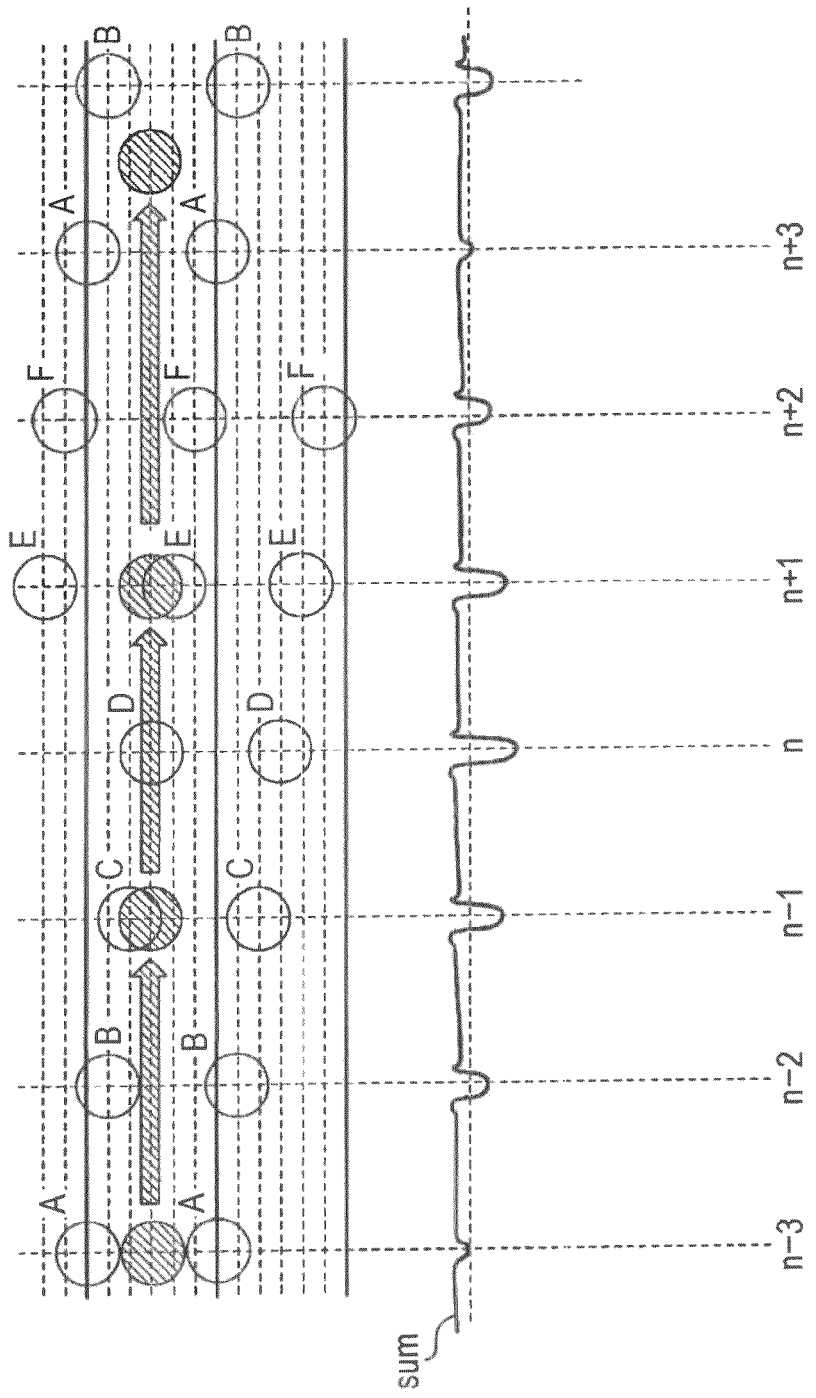
FIG. 17 is a diagram illustrating a generating method for a tracking error signal according to a third embodiment.

FIG. 17 is a diagram to describe a tracking error signal generating method serving as a third embodiment.

Note that FIG. 17 shows the various pit rows A through F formed on the hologram recording medium HM, a movement track (shaded portion) of the spot position of the second laser light when the tracking servo is in the state of being used so as to track over the pit row D thereof, and a waveform of the sum signal sum that is obtained in accordance with the movement of the second laser light.

As shown in FIG. 17, for example, in the case that the spot of the second laser light is accurately tracing over the pit row D, the value of the sum signal sum takes a minimum value at the timing (n in the diagram) matching the pit forming position on the pit row D, and as the phase difference as to the pit row D increases, the value at the pit forming position of the pit row thereof may gradually increase.

At this time, the value of the sum signal sum takes the same value at a timing (n−1, n+1 in the diagram) that matches the pit forming positions of each of the pit row C and pit row E which each are adjacent as to the pit row D (i.e., have the same phase difference), and takes the same value at a timing (n−2, n+2 in the diagram) that matches the pit forming positions of each of the pit row B and pit row F which each have the same phase difference as to the pit row D.

Now, unlike the state shown in the diagram, we can see that, if the spot of the second laser light traces a position shifted in the radius direction from the pit row D, a shift will occur in the value of the sum signal sum at the various pit forming positions of each pit row pair having the same phase difference as to the pit row D.

That is to say, as we can understand from this also, the value of the sum signal sum at the various pit forming positions of each pit row pair having the same phase difference as to the pit row targeted for the tracking servo reflects the error in the tracking direction as to the pit row targeted for the tracking servo. Specifically, the tracking error information can be obtained by calculating the difference of the values of the sum signals sum at the various pit forming position of each pit row pair having the same phase difference.

Based on these points, with the third embodiment, generating a tracking error signal TE based on the sum signal sum as will be described in detail below is performed.

That is to say, first, two pit rows having the same phase difference as to the pit row targeted for the tracking servo are selected. Specifically in the case of the present example, pit rows that are each adjacent to the pit row targeted for the tracking servo are selected.

Additionally, the value of the sum signal sum is sampled at a timing corresponding to the pit formable positions of the selected pit rows (the n−1 and n+1 in FIG. 17 are applicable), and the difference in the sampled sum values sum are calculated. The calculation result is the tracking error signal.

Now, a tracking error signal calculated with such a method as the third embodiment is written as "tracking error signal TE-c1" to indicate a distinction from the tracking error signal TE of the first embodiment.

3-2. Configuration of Recording/Playing Device

Figure 18:
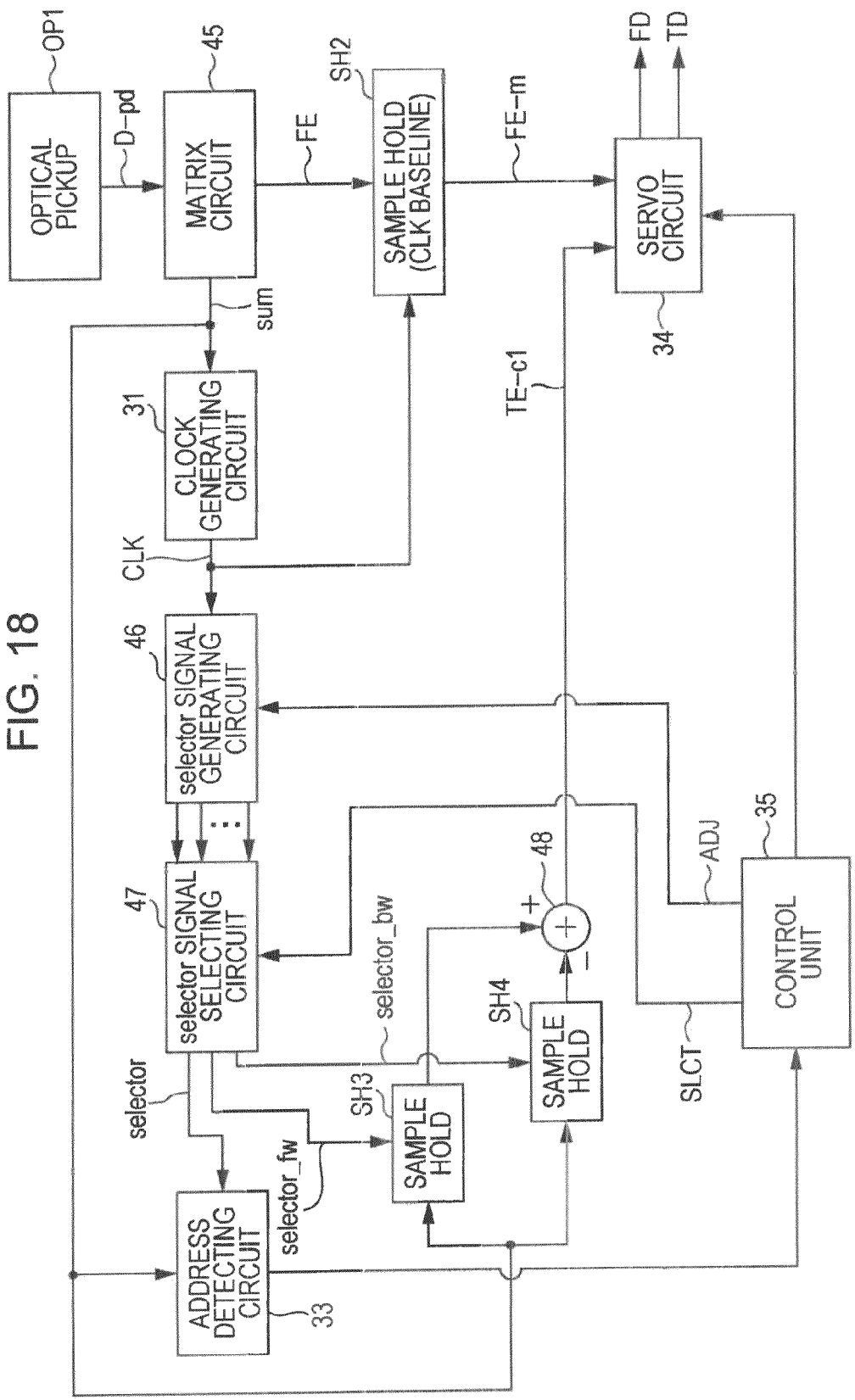
FIG. 18 is a block diagram illustrating an internal configuration of a recording playing device according to the third embodiment.

FIG. 18 is a block diagram showing an internal configuration of the recording/playing device serving as the third embodiment.

Note that in FIG. 18 also, the modulating control unit 27, data playing unit 28, and spindle motor 29 shown in FIG. 5 and FIG. 11 above are omitted from the diagram.

As we can see by comparing this FIG. 18 and FIG. 15 above, the recording/playing device of the third embodiment differs from the recording/playing device of the second embodiment, by being provided a matrix circuit 45 instead of the matrix circuit 30, and a selector signal generating circuit 46 and selector signal selecting circuit 47 instead of the selector signal generating/selecting circuit 32.

Additionally, a sample hold circuit SH3, sample hold circuit SH4, and subtractor 48 are added to the recording/playing device in this case.

The matrix circuit 45 differs from the matrix circuit 30 above, and generates/outputs a sum signal sum and focus error signal FE. The focus error signal FE is supplied to the sample hold circuit SH2 described in FIG. 15 above, as shown in the diagram.

Also, the sum signal sum is supplied to a clock generating circuit 31 and address detecting circuit 33, and is also supplied to a sample hold circuit SH3 and sample hold circuit SH4.

The selector signal generating circuit 46 is configured to have, of the functions that the selector signal generating/selecting circuit 32 has, a generating function for each selector signal, and a phase adjusting function for each selector signal based on the adjustment signal ADJ from the control unit 35.

The various selector signals generated with the selector signal generating circuit 46 is supplied to the selector signal selecting circuit 47.

The selector signal selecting circuit 47 selects/outputs the selector signal of the phase instructed by the selection signal SLCT from the control unit 35, from among the various selector signals supplied from the selector signal generating circuit 46, and also selects/outputs the selector signal corresponding to each of two pit rows having the same phase difference as to the pit row corresponding to the selector signal of the phase instructed by the selection signal SLCT.

Specifically in the case of the present example, along with the selector signal of the phase instructed by the selection signal SLCT, two selector signals corresponding to the pit rows each adjacent to the pit row corresponding to the selector signal instructed by the selection signal SLCT are selected/output.

Now, of the selector signals thus selected/output by the selector signal selecting circuit 47, the selector signal of the phase instructed by the selection signal SLCT is simply called a selector signal.

Also, the selector signals each corresponding to the two pit rows having the same phase difference as to the pit row corresponding to the selector signal of the phase instructed by the selection signal SLOT are each called a selector_fw signal and selector_bw signal.

The selector signal output by the selector signal selecting circuit 47 is supplied to the address detecting circuit 33.

Also, the selector_fw signal output by the selector signal selecting circuit 47 is supplied to the sample hold circuit SH3, and the selector_bw signal is supplied to the sample hold circuit SH4.

The sample hold circuit SH3 subjects the value of the sum signal sum supplied from the matrix circuit 45 to sample holding at a timing indicated by the selector_fw signal, and outputs the result thereof to the subtractor 48.

The sample hold circuit SH4 subjects the value of the sum signal sum supplied from the matrix circuit 45 to sample holding at a timing indicated by the selector_bw signal, and outputs the result thereof to the subtractor 48.

The subtractor 48 subtracts the sample hold output value by the sample hold circuit SH4 from the sample hold output value by the sample hold circuit SH3, and obtains a tracking error signal TE-c1. The tracking error signal TE-c1 is supplied to the servo circuit 34, as shown in the diagram.

According to the third embodiment described above, influences from offset components resulting from tilting and lens shifting can be avoided while preventing an increase in manufacturing costs/adjustment costs as in the case of using a conventional 3-spot method or DPP method, and further improvements to stability and precision of tracking servo controls can be made.

Also, according to the third embodiment, a method similar to that in the second embodiment above is used as a focus error detecting method, but according to this and to the use of a tracking error detecting method as the third embodiment, in resolving both the problem of the decrease in focus servo functionality by the noise components of the pits overlapping the focus error signals and the problem of the decrease in tracking servo functionality in accordance with tilting and lens shifting, only one photodetector serving as a quartered detector such as shown in FIG. 16 has to be provided as the configuration of the light receiving unit, and consequently the configuration of the optical system can be made very simple. That is to say, in resolving the various problems of the focus/tracking servo, the configuration of the optical system can be made very simple, as compared to a conventional configuration wherein grating or light receiving devices for receiving a side spot light are provided separately to the optical system.

4. Fourth Embodiment 4-1. Generation of Tracking Error Signal Using Push Pull Signal at Mirror Unit According to the fourth embodiment, a tracking error detecting method is proposed for avoiding the problem of decreased tracking servo functionality in accordance with tilting and lens shifting, similar to the third embodiment.

Specifically, according to the fourth embodiment, a favorable tracking error signal is generated, from which influences from tilting and lens shifting have been removed by subtracting the push pull signal PP at the mirror unit from the push pull signal PP at the pit portions.

Now, as we can understand from the description of FIG. 16 above, the push pull signal PP obtained at the pit portion includes components of the position difference in the radius direction as to the pit row targeted for an irradiation beam spot, and also includes components of tilting and lens shifting.

Conversely, the push pull signal PP at the mirror portion does not include the diffracted light components from the pit, whereby the push pull signal PP at the mirror portion only expresses the components of purely tilting and lens shifting.

Accordingly, by subtracting the push pull signal PP at the mirror unit from the push pull signal PP at the pit portion as described above, a favorable tracking error signal from which influences from tilting and lens shifting have been removed can be obtained.

A tracking error signal generated with a method such as in the fourth embodiment is written as the tracking error signal TE-c2.

4-2. Configuration of Recording/Playing Device

Figure 19:
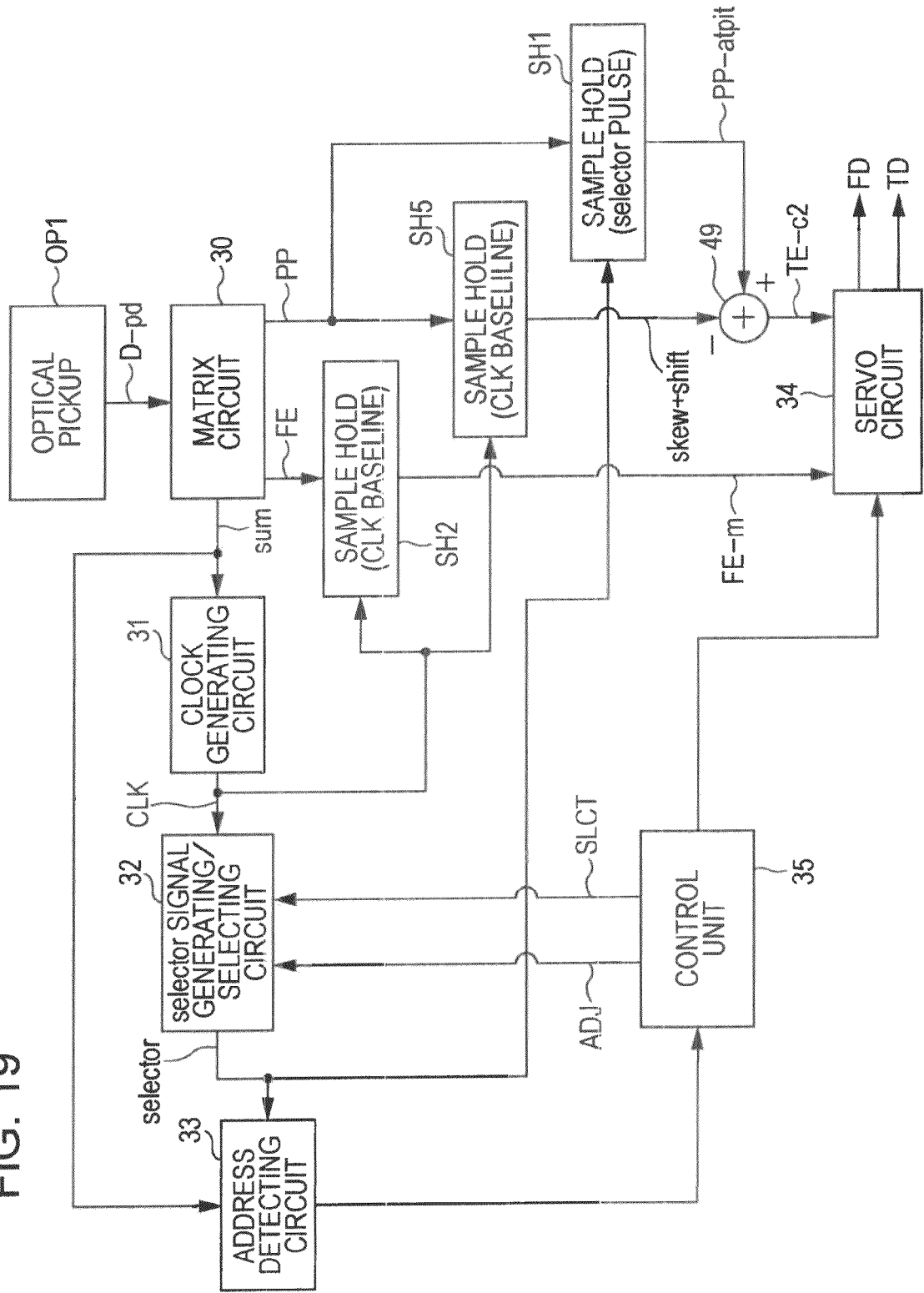
FIG. 19 is a block diagram illustrating an internal configuration of a recording/playing device according to a fourth embodiment.

FIG. 19 is a block diagram showing an internal configuration of a recording/playing device according to a fourth embodiment.

Note that in FIG. 19 also, the modulating control unit 27, data playing unit 28, and spindle motor 29 shown in FIG. 5 and FIG. 11 above are omitted from the diagram.

The recording/playing device according to the fourth embodiment has a sample hold circuit SH5 and a subtractor 49 added, as compared to the recording/playing device of the second embodiment shown in FIG. 15 above.

As shown in the diagram, the push pull signal PP output by the matrix circuit 30 is supplied to the sample hold circuit SH1, and is also supplied to the sample hold circuit SH5.

The clock CLK from the clock generating circuit 31 is input into the sample hold circuit SH5. The sample hold circuit SH5 subjects the value of the push pull signal PP to sample holding at a baseline timing of the clock CLK. Thus, the value of the push pull signal PP at the mirror portion (components of tilting+lens shifting) is sampled.

The sample hold value from the sample hold circuit SH5 and the sample hold value from the sample hold circuit SH1 (value of push pull signal PP at pit portion: components of tracking error+tilting+lens shifting) are input into the subtractor 49. The subtractor 49 subtracts the sample hold value by the sample hold circuit SH5 from the sample hold value by the sample hold circuit SH1. Thus, the tracking error signal TE-c2 can be obtained.

As shown in the diagram, the tracking error signal TE-c2 is supplied to the servo circuit 34.

According to such a fourth embodiment, the configuration of an optical system for resolving the problem of decreased tracking servo functionality by tilting and lens shifting can be simplified, and increases to manufacturing costs and adjustment costs such as in the case of using a conventional 3-spot method or DPP method can be prevented.

5. Fifth Embodiment

5-1. Tilt Detection Using Push Pull Signal at Mirror Unit

According to a fifth embodiment, tilting detection is performed using the value of the push pull signal PP at the mirror portion.

As described above, the value of the push pull signal PP at the mirror portion expresses the components of tilting+lens shifting. Thus, according to the fifth embodiment, the lens shifting amount of the objective lens 15 is detected separately, and the value of the detected lens shifting amount is subtracted from the value of the push pull signal PP at the mirror portion, thereby performing tilting detection.

According to the fifth embodiment, a method will be exemplified below for providing a position sensor to detect the position of the objective lens 15 in the tracking direction will be provided, to detect the lens shifting amount based on the output of the position sensor.

5-2. Configuration of Recording/Playing Device

Figure 20:
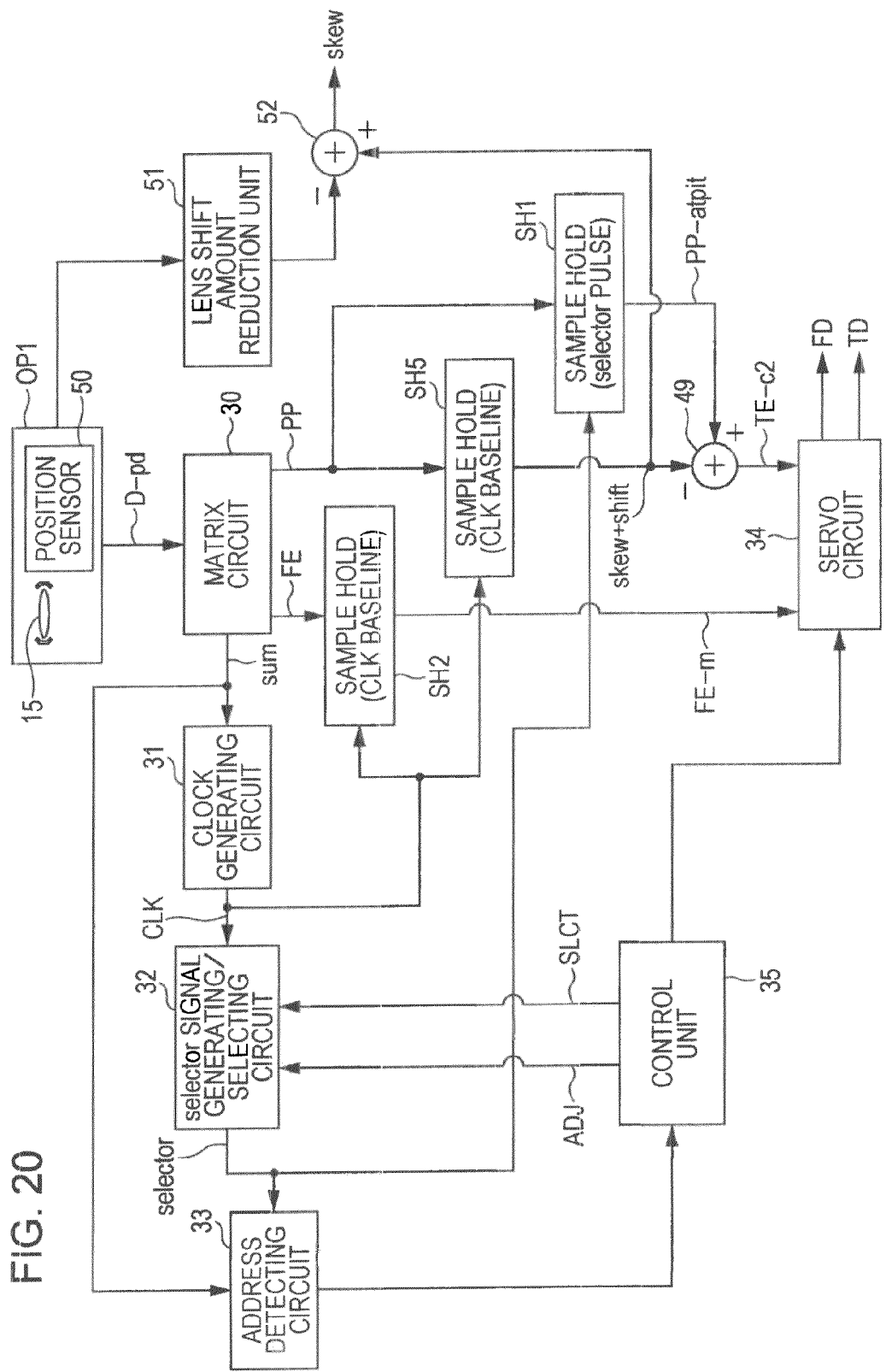
FIG. 20 is a block diagram illustrating an internal configuration of a recording/playing device according to a fifth embodiment.

FIG. 20 is a block diagram showing an inner configuration of the recording/playing device as the fifth embodiment.

Note that in FIG. 20 also, the modulating control unit 27, data playing unit 28, and spindle motor 29 are omitted from the diagram.

As we can see comparing with FIG. 19 above, the recording/playing device according to the fifth embodiment has a position sensor 50, lens shifting amount reduction unit 51, and subtractor 52 added thereto as compared with the recording/playing device of the fourth embodiment.

The position sensor 50 is provided in the optical pickup OP1 so as to be able to detect the position of the objective lens 15 in the tracking direction. The position information of the objective lens 15 detected with the position sensor 50 is input in the lens shifting amount reduction unit 51.

The lens shifting amount reduction unit 51 obtains the lens shifting amount of the objective lens 15, based on the position information of the objective lens 15 detected by the position sensor 50.

In this case, the lens shifting amount reduction unit 51 has a memory in which table information showing the correlation between the position information of the objective lens 15 and the lens shifting amount is stored, and based on this table information, reduction to the lens shifting amount from the position information of the objective lens 15 is performed.

Note that such reduction processing can be realized by computing processing using functions that indicate the correlation between the position information of the objective lens 15 and the lens shifting amount.

The value of the lens shifting amount of the objective lens 15 obtained by the lens shifting amount reduction unit 51 above and the sample hold value (tilting+lens shifting) by the sample hold circuit SH5 described with FIG. 19 above are input into the subtractor 52.

The subtractor 52 subtracts the value of the lens shifting amount from the sample hold value by the sample hold circuit SH5. Thus, the tilting amount (skew in the diagram) in the radius direction (radial direction) is detected.

Note that a method for detecting the lens shifting amount based on the output of the position sensor 50 is exemplified here, but the lens shifting amount can be detected with other methods such as estimating (detecting) from a driving signal of the tracking actuator 16A and so forth.

6. Sixth Embodiment

6-1. Bulk-Type Recording Medium

Next, a sixth embodiment will be described.

The sixth embodiment applies not a hologram recording medium HM, but rather a tracking servo method of the present invention as to a so-called bulk-type optical recording medium (hereafter called bulk-type recording medium).

Now, relating to an optical recording medium that will take the lead in the next generation of optical recording mediums that are widely used currently, such as a CD (Compact Disc) and DVD (Digital Versatile Disc), and BD (Blu-ray Disc: registered trademark), the present applicant proposes a so-called bulk-type recording medium such as described below in the Reference Document 1 and Reference Document 2.

Reference Document 1 . . . Japanese Unexamined Patent Application Publication 2008-135144

Reference Document 2 . . . Japanese Unexamined Patent Application Publication 2008-176902

Figure 21:
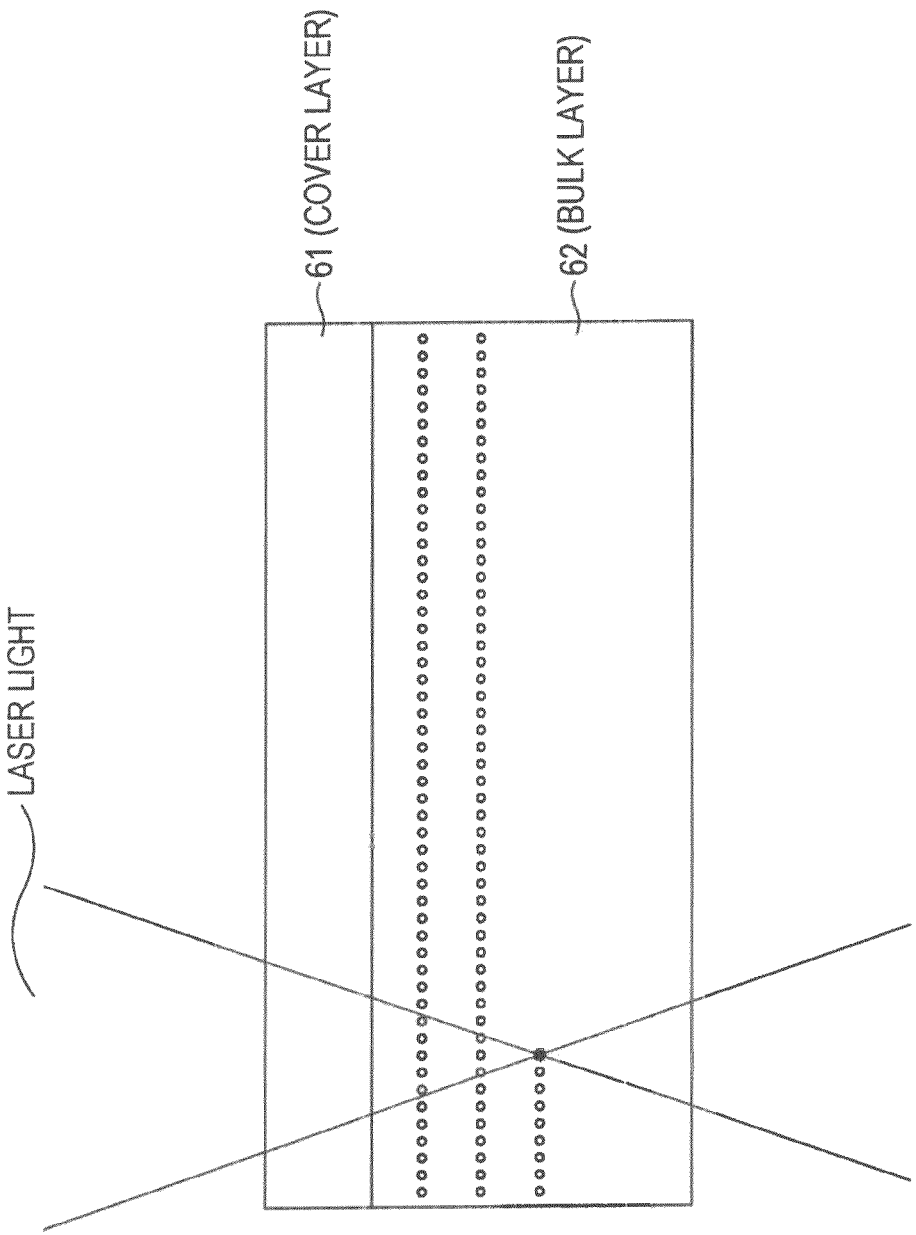
FIG. 21 is a diagram illustrating a bulk recording method.

Bulk recording is a recording method to increase recording capacity by multiple-layer recording, and for example as shown in FIG. 21, changes the sequential focal positions and performs laser light irradiation, as to an optical recording medium having at least a cover layer 61 and bulk layer (recording layer) 62, and selectively performs mark recording in the depth direction within the bulk layer 62.

Note that in the present description, the phrase "depth direction" is used; the depth direction refers to the direction that is parallel to optical axis of the laser light irradiated on the optical recording medium, i.e. the direction that is parallel to the focus direction.

Regarding such bulk recording, a recording technique called a so-called micro-hologram method is disclosed in the reference document 1.

Figure 22:
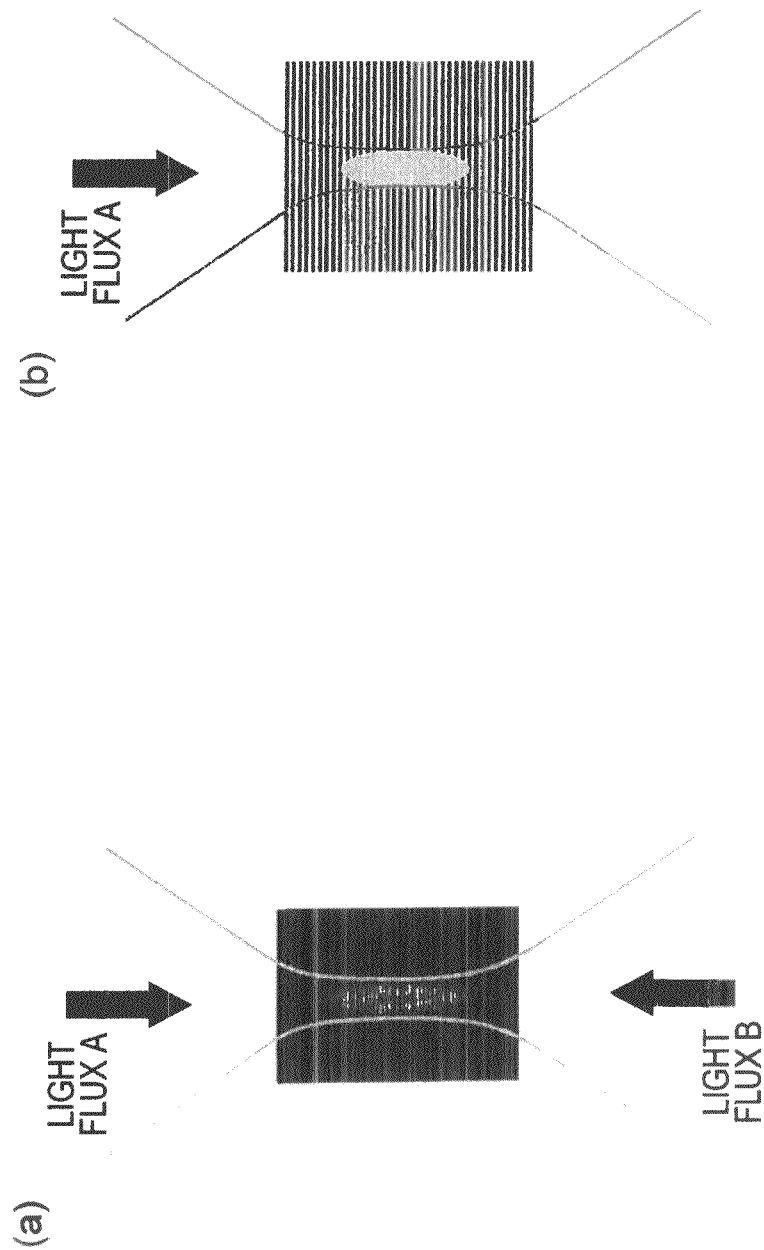
FIG. 22 is a diagram illustrating methods for an (a) positive-type micro-hologram and a (b) negative-type micro-hologram.

The micro-hologram method is largely divided into a positive-type micro-hologram method and negative-type micro-hologram method, as shown in the following FIG. 22.

According to the micro-hologram method, so-called hologram recording materials are used as the recording materials for the bulk layer 62. For example, an optical synthetic-type photopolymer or the like is used as the hologram recording material.

The positive-type micro-hologram method is a method that collects two opposing light fluxes (light flux A, light flux B) in the same position and forming a fine interference pattern (hologram), as shown in FIG. 22(a), and uses this as a recording mark.

Also, the negative-type micro-hologram method shown in FIG. 22(b) is an opposite concept from the positive-type micro-hologram method, and is a method that deletes the interference pattern formed beforehand with the laser light irradiation, and uses the deleted portion as a recording mark.

FIG. 23 is a diagram to describe the negative-type micro-hologram method,

With the negative-type micro-hologram method, prior to performing recording operations, initialization processing for forming the interference pattern as to the bulk layer 62 beforehand is performed, as shown in FIG. 23(a). Specifically, the light fluxes C and D in parallel light are irradiated to as to face one another as shown in the diagram, and the interference pattern thereof is formed on the entire bulk layer 62.

Upon thus forming the interference pattern beforehand with initializing processing, the information recording by forming the deleting marks is performed as shown in FIG. 23(b). Specifically, by performing the laser light irradiation according to the recording information in the state of setting the focus at an optional layer position, information recording by the deleting marks is performed.

Also, the present applicant proposes a recording method of forming a void (hole) such as disclosed in the Reference Document 2, as a bulk recording method that differs from the micro-hologram method.

A void recording method is a method to perform laser light irradiation with a relatively high power for example, as to the bulk layer 62 configured with a recording material such as an optical synthetic type photopolymer, and to record a hole (void) within the bulk layer 62. As described in the Reference Document 2, the hole portion thus formed becomes the portion wherein the refractive index differs from the other portions in the bulk layer 62, and the light reflectivity is increased at the border portions thereof. Accordingly, the hole portion functions as a recording mark, and information recording with the formation of hole marks is therefore realized.

This sort of void recording method does not form a hologram, so performing light irradiation from one side is sufficient for recording. That is to say, collecting two light fluxes in the same position and forming recording marks, as in the case of the positive-type micro-hologram method, is not necessary.

Also, compared to a negative-type micro-hologram method, this has the advantage that initializing processing is not needed.

Note that an example of performing precure light irradiation before recording when performing void recording is described in the Reference Document 2, but even if such irradiation of precure light is omitted, void recording can be made.

Now, this is a bulk-type recording medium proposing various types of recording methods described above, but the recording layer (bulk layer) of the bulk-type recording medium does not have an explicitly multi-layered configuration in the sense of having multiple reflective layers formed, for example. That is to say, a reflective film and guiding groove for each recording layer such as a normal multi-layer disc has, are not provided to the bulk layer 62.

Accordingly, in the state of the configuration of the bulk-type recording medium shown with FIG. 21 above, focus servo and tracking servo cannot be performed at the time of recording when the marks are not yet formed.

Therefore, actually, the bulk-type recording medium takes a configuration shown as in the following FIG. 24.

Figure 24:
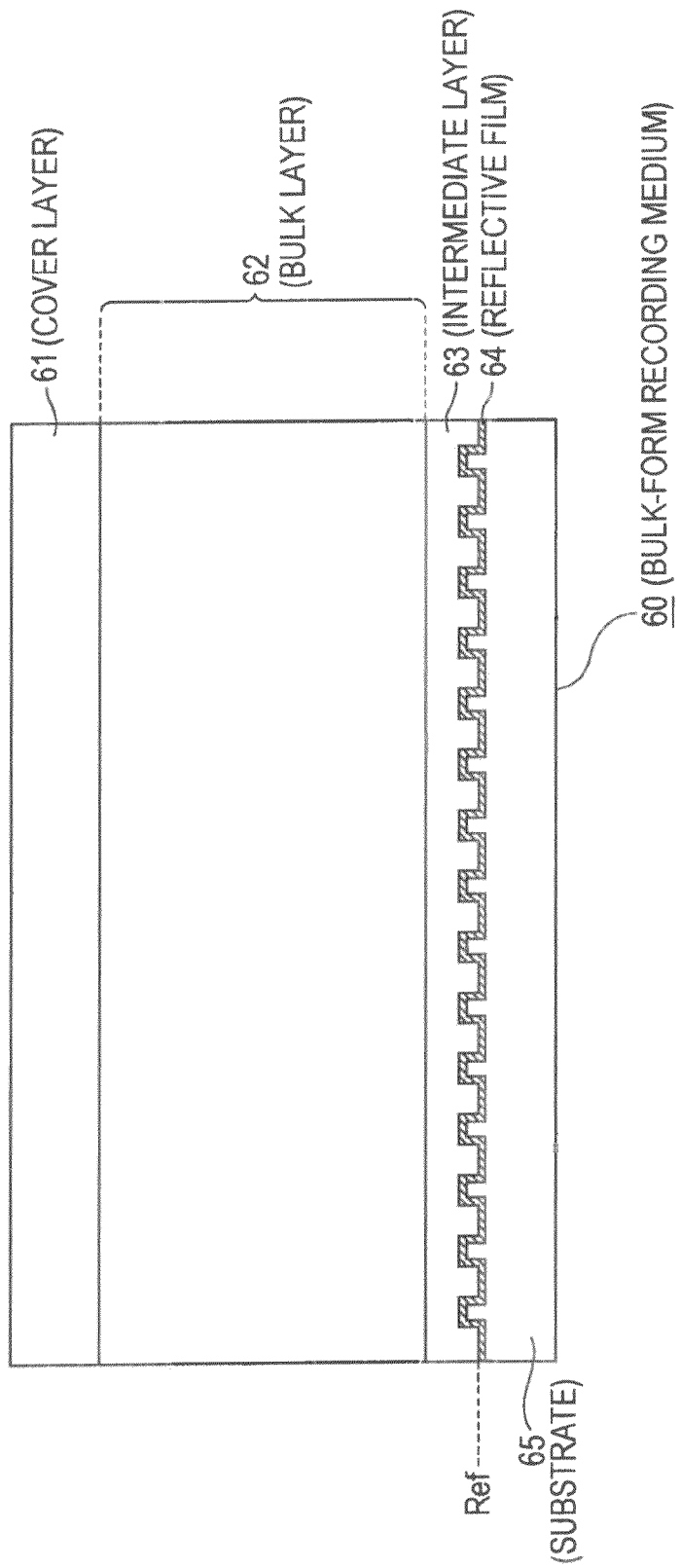
FIG. 24 is a diagram illustrating a cross-sectional configuration of the bulk-type recording medium.

As shown in FIG. 24, a reflective face (reference face Ref) is provided to the actual bulk-type recording medium (the bulk-type recording medium 60).

Specifically, a cover layer 61, bulk layer 62, intermediate layer 63, reflective layer 64, and substrate 65, in order from the upper layer side, are formed on the bulk-type recording medium 60 in this case.

A guiding grove by the formation of pit rows is formed on the upper face side of the substrate 65. In the case of the present example, the pit rows formed on the substrate 65 become the pit rows serving as the embodiment described with FIG. 2 and FIG. 3 above.

Thus, a reflective film 64 is formed on the substrate 65 whereupon the bit rows serving as the embodiment are formed. Also, the substrate 65 whereupon a reflective film 64 is thus formed is adhered to the lower layer side of the bulk layer 62, via the intermediate layer 63 made up of an ultraviolet cured resin or the like.

6-2. Recording/Playing Method of Bulk-Type Recording Medium

With a medium configuration as described above, a laser light for recording (or playing) marks as shown in the following FIG. 25 (hereafter, recording laser light, or may be simply called recording light), and further a servo laser light (also simply called servo light) serving as the laser light for position control, are irradiated as to the bulk-type recording medium 60.

As shown in the diagram, the recording laser light and servo laser light are irradiated onto the bulk-type recording medium 60 via a shared objective lens.

At this time, if the servo laser light and the recording laser light have the same frequency, when the servo laser light travels via the bulk layer 62, this may influence the mark recording negatively. Therefore with the bulk recording method as compared to conventional method, laser light having a different wavelength band from the recording laser light is used as the servo laser light.

Now, in terms of the first laser light and second laser light thus each having different wavelengths are irradiated onto the recording medium via a shared objective lens, the hologram recording/playing method and bulk recording method described with the embodiments earlier have a commonality.

Based on the above premise, the operations at the time of mark recording as to the bulk-type recording medium 60 will be described with reference to FIG. 25.

First, when performing multi-layer recording as to the bulk layer 62 on which a guiding groove and reflective film are not formed, where to position the layer position for recording marks in the depth direction of the bulk layer 62 is determined beforehand. In the diagram, a case is exemplified wherein a first information recording layer position L1 through a fifth information recording layer position L5, for a total of five information recording layer positions L, are set as layer positions (mark forming layer position: also called information recording layer position) to form marks within the bulk layer 62. As shown in the diagram, the first information recording layer position L1 is set at a position removed in the depth direction from the reflective film 64 wherein a guiding grove is formed (reference face Ref) in the amount of a first offset of-L1. Also, the second information recording layer position L2, third information recording layer position L3, fourth information recording layer position L4, and fifth information recording layer position L5 are set as positions removed from the reference face Ref in the amounts of a second offset of-L2, third offset of-L3, fourth offset of-L4, and fifth offset of-L5, respectively.

At the time of recording when marks are not yet formed, the focus servo and tracking servo that target the various layer positions within the bulk layer 62 based on the reflected light of the recording laser light cannot be performed. Accordingly, the objective lens focus servo control and tracking servo control at the time of recording are performed so that the spot position of the servo laser light follows the guiding grooves on the reference face Ref, based on the reflected light of the servo laser light.

However, the recording laser light has to have the focal position set on a higher layer side from the reference face Ref for mark recording. Therefore, a recording light focus mechanism for adjusting the focal position of the recording laser light independently from the focus mechanism of the objective lens is provided to the optical system in this case.

Figure 26:
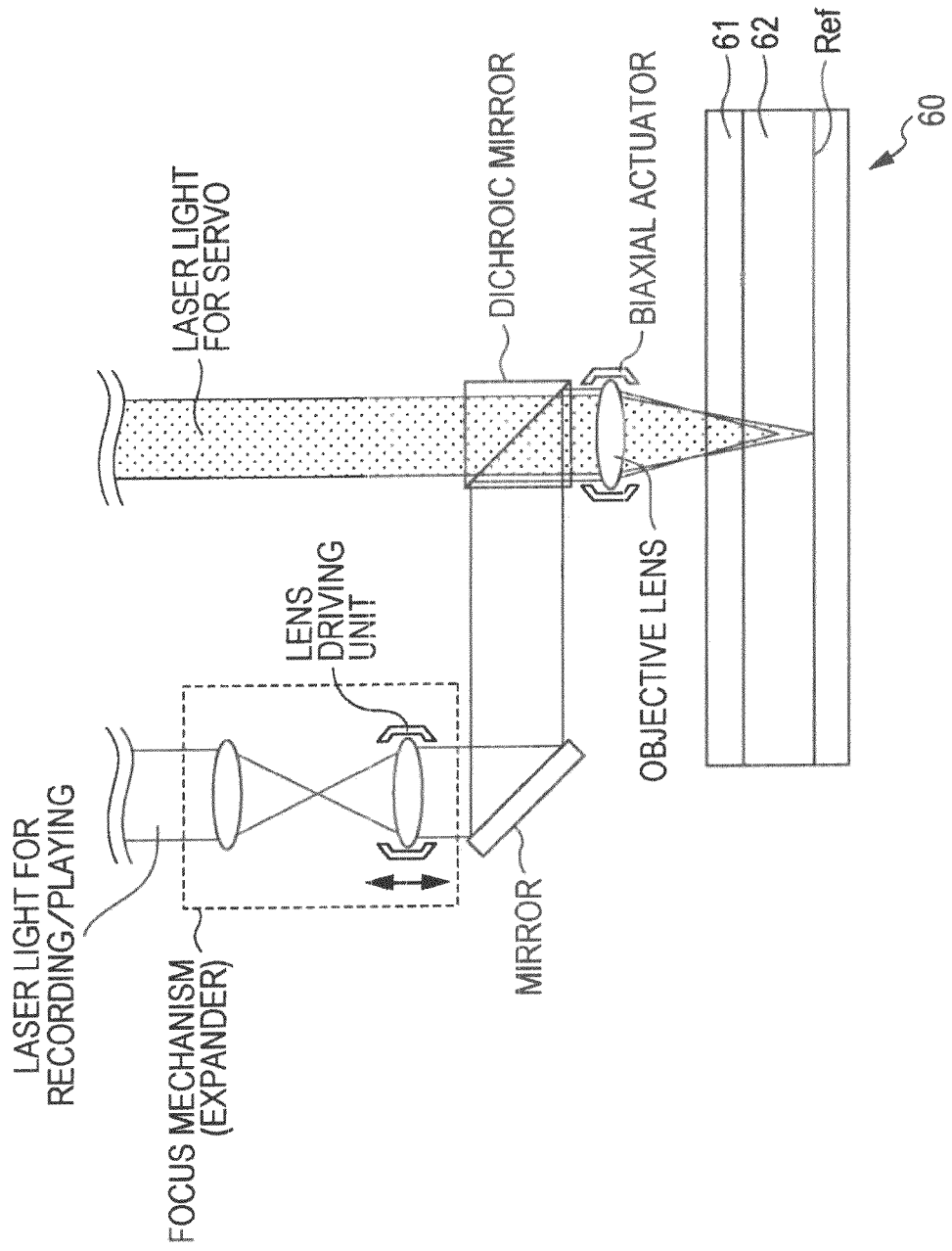
FIG. 26 is a diagram illustrating an overview of an optical system for performing recording/playing of the bulk-type recording medium.

Now, an overview of the optical system for performing the recording/playing of the bulk-type recording medium 60, which includes a mechanism for independently adjusting the focal position of such recording light laser light, is shown in FIG. 26.

Figure 25:
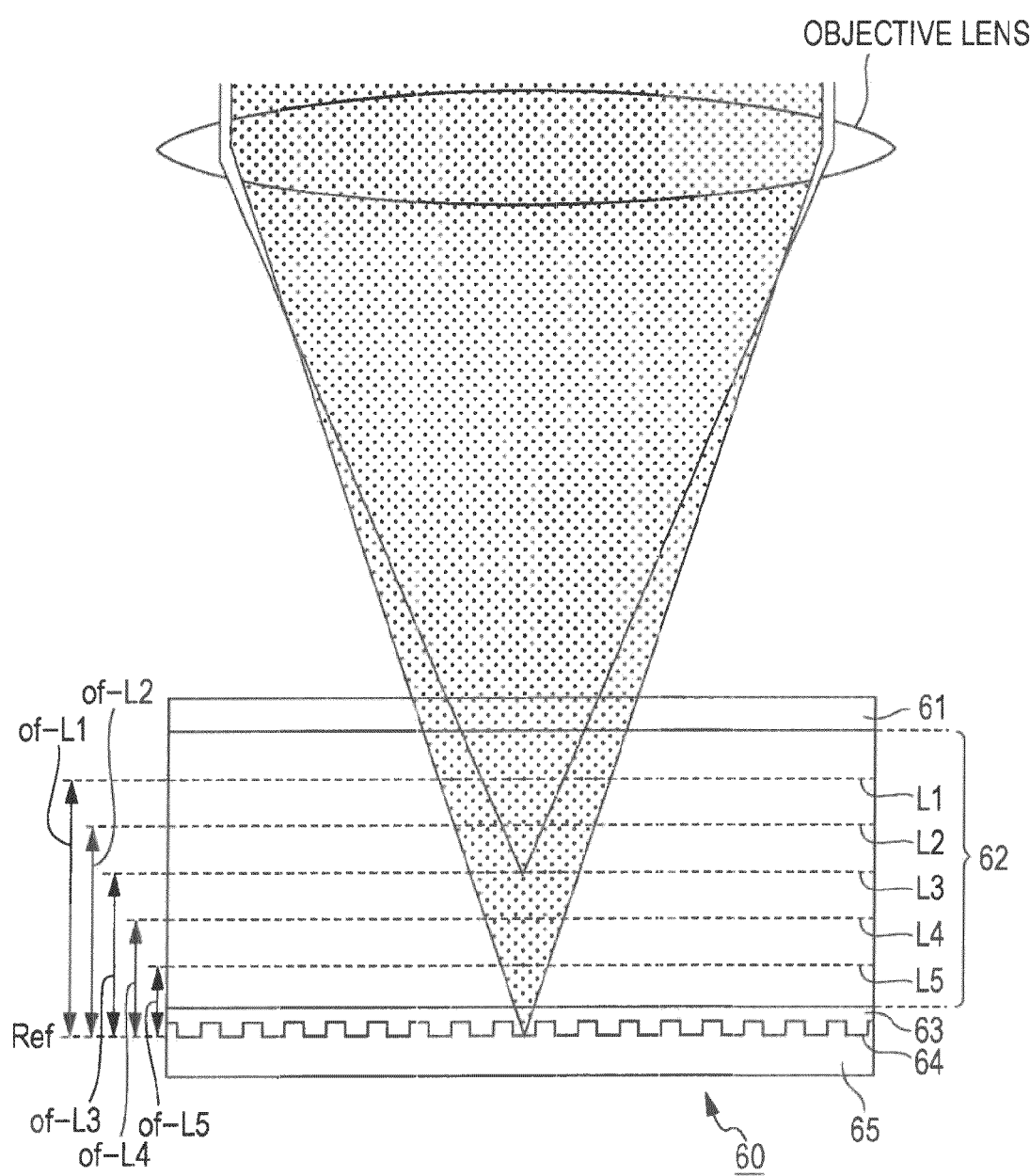
FIG. 25 is a diagram illustrating an operation at the time of mark recording as to the bulk-type recording medium.

First, in FIG. 26, the objective lens also shown in FIG. 25 is shown. The objective lens is maintained so as to be displaceable in the tracking direction and focus direction by a biaxial actuator.

The focus mechanism (expander) in the diagram is a relevant mechanism for independently adjusting the focal position of the recording laser light as described above. Specifically, the expander serving as a focus mechanism is made up of a fixed lens and movable lens, and a lens driving unit which hold the movable lens so as to be displaceable in a direction parallel to the light axis of the recording laser light, and by the movable lens being driven by the lens driving unit, a collimation of the recording laser light irradiated into the objective lens in the diagram is changed, whereby the focal position of the recording laser light is adjusted independently from the servo laser light.

Also, as described above, the recording laser light and the servo laser light each have different wavelength bands, whereby corresponding thereto, with the optical system in this case, the reflected flight from the bulk-type recording medium 60 of the recording laser light and servo laser light can be separated into respective systems by the dichroic mirror in the diagram (i.e. so that reflected light detection can be performed independently).

Also, in the case of thinking in terms of outward path light, the dichroic mirror has a function to composite the recording laser light and servo laser light on the same axis and irradiate onto the objective lens. Specifically, in the case of the example of this diagram, upon being reflected with a mirror via the expander as shown in the diagram, the recording laser light is reflected with the dichroic mirror and irradiated as to the objective lens. On the other hand, the servo laser light passes through the dichroic mirror and is irradiated onto the objective lens.

Figure 27:
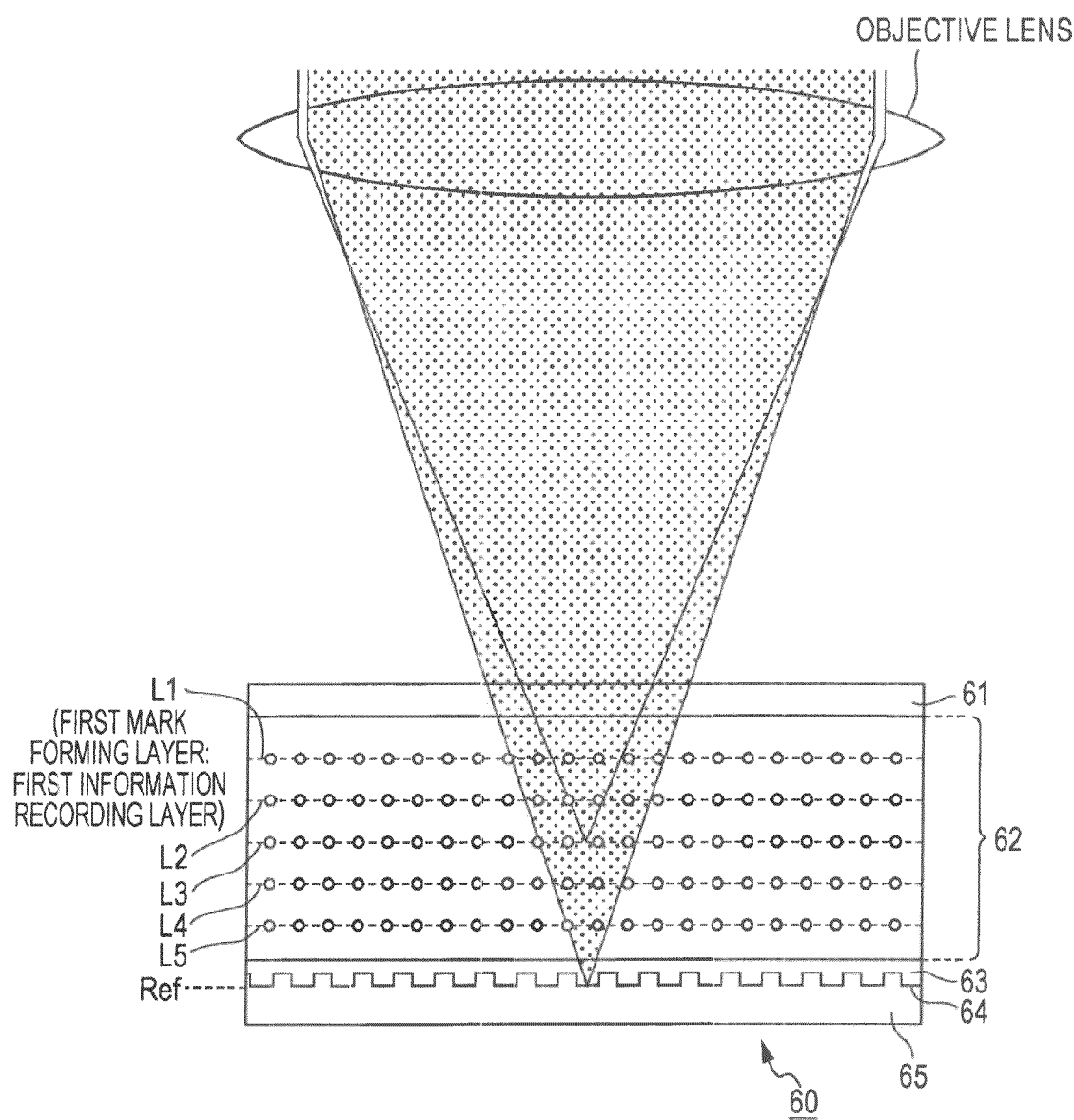
FIG. 27 is a diagram illustrating servo control at time of playing of the bulk-type recording medium.

FIG. 27 is a diagram to describe the servo control at time of playing of the bulk-type recording medium 60.

At the time of playing also, the objective lens focus servo control and tracking servo control are performed similar to at the time of recording. That is to say, at the time of playing also, the objective lens focus servo control and tracking servo control are performed so that the servo laser light focuses at the reference face Ref and follows the guiding groove, based on the reflected light of the servo laser light. The recording laser light is adjusted by the above-described recording light focus mechanism so that the focal position thereof is matched to the applicable information recording layer position L.

As described above, with the bulk recording method, the recording laser light for performing mark recording/playing and the servo laser light serving as the position control light are irradiated as to the bulk-type recording medium 60 via a shared objective lens (composited on the same optical axis), by performing objective lens focus servo control and tracking servo control so that the servo laser light follows the guiding grooves of the reference face Ref, and separately adjusting the focal position of the recording laser light by the recording light focus mechanism, even if guiding grooves are not formed in the bulk layer 62, recording/playing can be marked as to the necessary positions (depth direction and tracking direction) of the bulk layer 62.

6-3. Configuration of Recording/Playing Device

Figure 28:
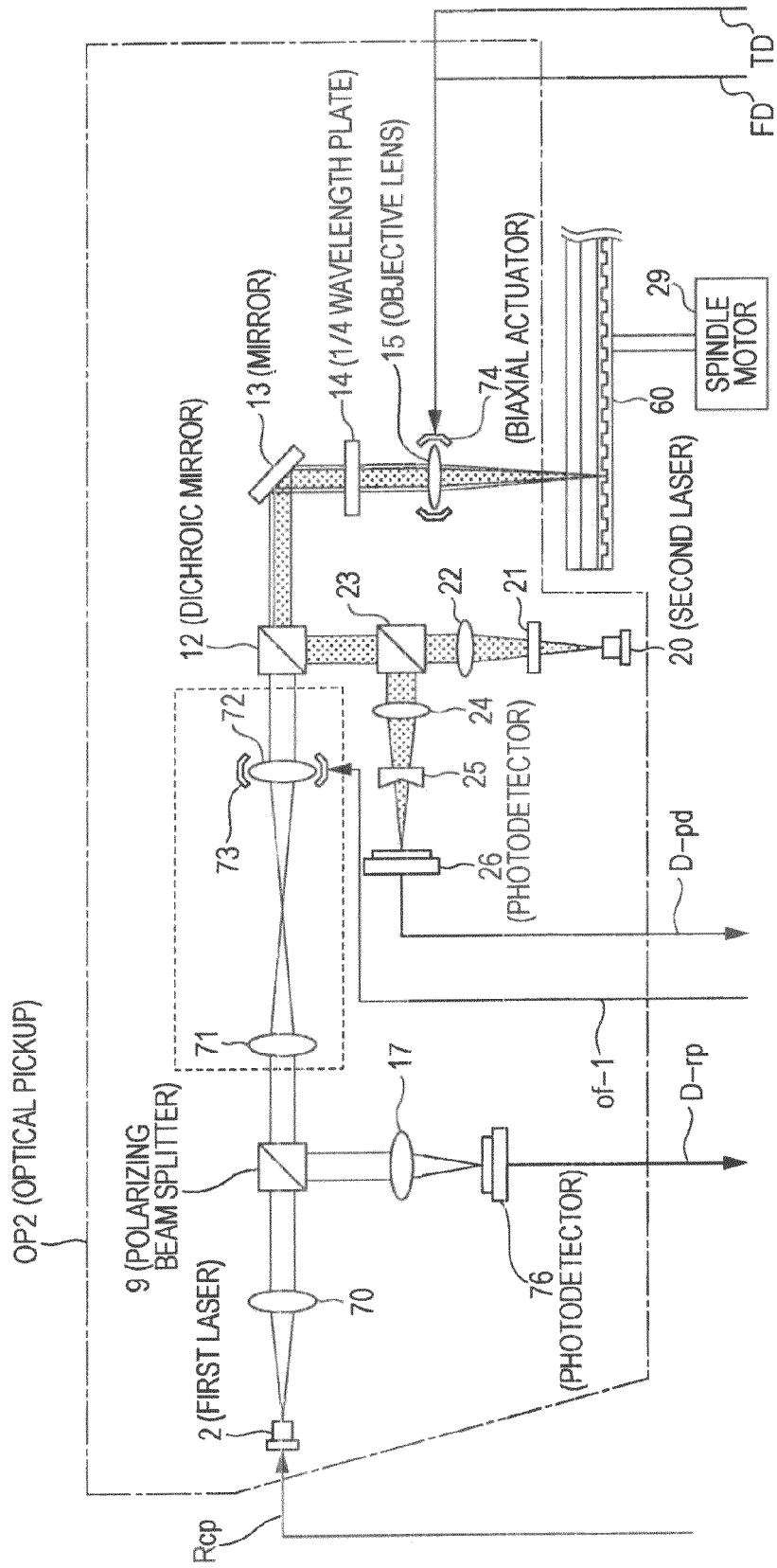
FIG. 28 is a diagram illustrating an internal configuration of an optical pick-up provided by the recording/playing device according to a sixth embodiment.
Figure 29:
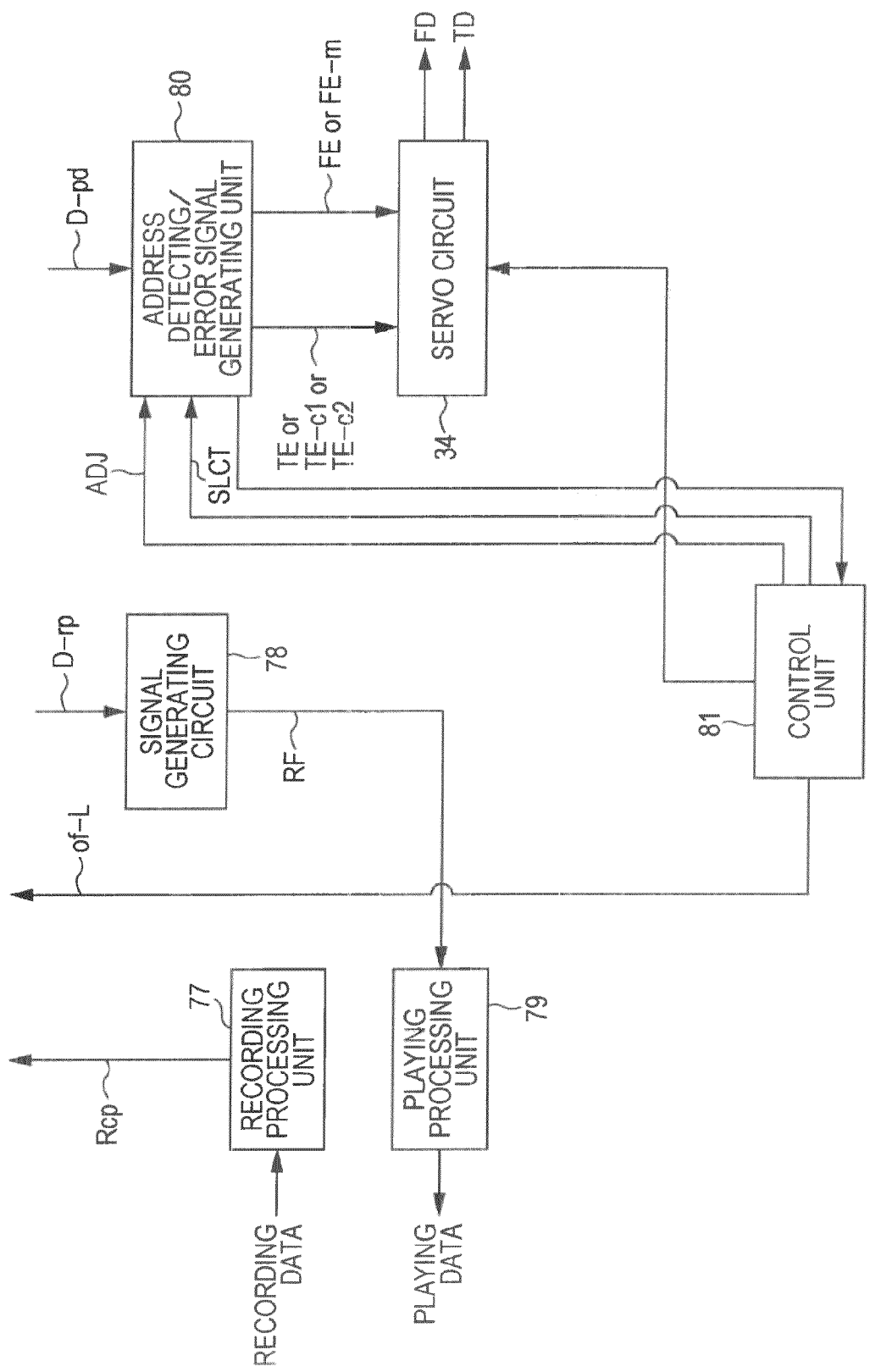
FIG. 29 is a block diagram illustrating an internal configuration of a portion excluding the optical pick-up of the recording/playing device according to a sixth embodiment.

FIG. 28 and FIG. 29 are diagrams to describe the internal configuration of the recording/playing device serving as the sixth embodiment, FIG. 28 shows an internal configuration of an optical pickup OP2 that the recording/playing device according to the sixth embodiment has, and FIG. 29 shows an internal configuration of portions excluding the optical pickup OP2.

Now, as we can understand from the above description also, even with a recording/playing device for a bulk-type recording medium 60, similar to the case of the recording/playing device for the hologram recording medium HM, a recording position in the tracking direction by the first laser light (light for recording/playing) is controlled by performing tracking servo control of the objective lens so that the second laser light follows the guiding groove (pit row) formed on the disc, based on the reflected light of the second laser light (light for position control).

As we can understand from this also, with the recording/playing device according to the sixth embodiment also, similar to the case with the hologram recording medium HM, even if mark recording is performed for a certain pit row (address) at the time of recording, there is a possibility of a problem occurring wherein the actually recorded mark row is not formed on the targeted pit row.

Therefore, as a recording/playing device according to the sixth embodiment also, similar to the cases of the recording/playing device of the various embodiments described herein, the pit rows for the tracking servo to be performed based on the reflected light of the second laser light are corrected at the time of playing according to the shifting amount of the recording position.

First, a configuration of the optical pickup OP2 of the recording/playing device of the sixth embodiment will be described with reference to FIG. 28.

As shown in the diagram, a first laser 2 that functions as the light source for the above-described recording/playing laser light is provided within the optical pickup OP2. Also, a second laser 20 that functions as the light source of the above-described servo laser light is also provided.

The recording/playing laser light emitted from the first laser 2, upon becoming parallel light via the collimation lens 70, is irradiated into the polarization beam splitter 9. The polarization beam splitter 9 is configured so as to pass through the recording laser light that is thus irradiated from the first laser 2 side.

The recording laser light having passed through the polarization beam splitter 9 is irradiated into a recording/playing light focus mechanism made up of a fixed lens 71, movable lens 72, and lens driving unit 73. The recording/playing light focus mechanism has the fixed lens 71 disposed on the side near the first laser 2 which is a light source, and the movable lens 72 disposed on the side far from the first laser 2. The movable lens 72 is driven in the direction parallel to the optical axis of the recording/playing laser light by the lens driving unit 73, whereby focus control that is independent of the recording/playing laser light can be performed. The lens driving unit 73 drives, based on the values of the offset of-L instructed by a later-described control unit 81 (FIG. 29).

The recording/playing laser light via the recording/playing light focus mechanism is irradiated into the dichroic mirror 12. The dichroic mirror 12 is configured so that light having the same wavelength band as the recording/playing laser light is passed through, and light of any other wavelength is reflected. Accordingly, the recording/playing laser light thus irradiated passes through the dichroic mirror 12.

The recording/playing laser light having passed through the dichroic mirror 12 is reflected by the mirror 13 as shown in the diagram, and upon traveling via the ¼ wavelength plate 14, travels via the objective lens 15 and is irradiated as to the bulk-type recording medium 60.

In this case, the objective lens 15 is maintained by a biaxial actuator 74 that can displace the objective lens 15 in the focus direction and in the tracking direction.

A focus coil and tracking coil are provided to the biaxial actuator 74, and a focus drive signal FD and tracking drive signal TD are provided to each thereof, whereby the objective lens 15 can be displaced in each of the focus direction and tracking direction.

At the time of playing, the recording/playing laser light is irradiated as to the bulk-type recording medium 60 as described above, whereby reflected light is obtained from the bulk-type recording medium 60 (mark row in the bulk layer 62). The reflected light of the recording/playing laser light thus obtained is guided to the dichroic mirror 12 via the objective lens 15→¼ wavelength plate 14→mirror 13, and passes through the dichroic mirror 12.

The reflected light of the recording/playing laser light having passed through the dichroic mirror 12 is irradiated into the polarization beam splitter 9 after having traveled via the above-described recording/playing light focus mechanism.

Thus, the polarization direction of the reflected light (return path light) of the recording/playing laser light to be irradiated into the polarization beam splitter 9 differs by 90 degrees from the recording/playing laser light (outbound path light) irradiated into the polarization beam splitter 9 from the first laser 2 side, by the action by the ¼ wavelength plate 14 and the action by the bulk-type recording medium 60 at time of reflecting. Consequently, the reflected light of the recording/playing laser light thus irradiated is reflected at the polarization beam splitter 9.

The reflected light of the recording/playing laser light reflected at the polarization beam splitter 9 is collected on a light-receiving face of a photodetector 76 via a condensing lens 75.

Now, the light receiving signal for the reflected light of the recording/playing laser light obtained by the photodetector 76 is called a receiving light signal D-rp.

Also, the servo laser light irradiated from the second laser 20 is irradiated into the polarization beam splitter 23 after being changed to parallel light via the lens 21→collimation lens 22. The polarization beam splitter 23 allows the servo laser light (outbound light) thus irradiated from the second laser 20 side to pass through.

The servo laser light having passed through the polarization beam splitter 23 is irradiated into the dichroic mirror 12. The dichroic mirror 12 is configured so as to pass the light having the same wavelength band as the recording/playing laser light and to reflect light having any other wavelength, whereby the servo laser light is reflected off the dichroic mirror 12, composited on the same axis as the recording/playing laser light, and is guided to the mirror 13 side.

After the mirror 13, the optical path of the servo laser light until irradiating onto the bulk-type recording medium 60 becomes the similar to the case of the recording/playing laser light.

Reflected light is obtained from the reference face Ref, according to the servo laser light having been irradiated on the bulk-type recording medium 60. The reflected light of the servo laser light thus obtained is reflected by the dichroic mirror 12 via the objective lens 15→¼ wavelength plate 14→mirror 13, and is irradiated into the polarization beam splitter 23.

Similar to the case of the recording/playing laser light above, the polarization direction of the reflected light (return path light) of the servo laser light thus irradiated from the bulk-type recording medium 60 side differs by 90 degrees from the outbound path light, from the action of the ¼ wavelength plate 14 and the action at time of reflection at the bulk-type recording medium 60 (reference face Ref), and the reflected light of the servo laser light serving as the return path light is accordingly reflected at the polarization beam splitter 23.

The reflected light of the servo laser light reflected at the polarization beam splitter is condensed on a light receiving face of the photodetector 26 via the condensing lens 24→cylindrical lens 25.

Now, although omitted from the diagram in FIG. 28 also, with the recording/playing device in this case also, a sliding driving unit to slide-drive the entire optical pickup OP 2 described above in the tracking direction is provided, and the irradiated position of the laser light can be displaced over a wide range by the driving of the optical pickup OP2 by the sliding driving unit.

Next, a configuration of the portions excluding the optical pickup OP2 of the recording/playing device according to the sixth embodiment will be described with FIG. 29.

First, data to be recorded as to the bulk-type recording medium 60 (recording data in the diagram) is input in the recording processing unit 77 in the diagram. The recording processing unit 77 performs appending of error correction code as to the input recording data and predetermined recording modulation encoding and so forth, and for example obtains a recording modulation data row which is a two-value data row of "0" "1", for example that is actually recorded on the bulk-type recording medium 60. Additionally, a recording pulse Rcp based on the recording modulation data row thus generated is generated, and the first laser 2 in the optical pickup OP2 is driven to emit light based on the recording pulse Rcp.

Also, the light receiving signal D-rp obtained from the photodetector 76 in the optical pickup OP2 is supplied to the signal generating circuit 78 in the diagram. The signal generating circuit 78 generates the playing signal RF according to the mark rows recorded on the bulk layer 62, based on the light receiving signal D-rp.

With regard to the playing signals RF obtained by the signal generating circuit 78, the playing processing unit 79 performs playing processing such as error correction processing and decoding processing of the recording modulation code, for example, and obtains playing data of the above recorded data being played.

Also, the light receiving signal D-pd obtained from the photodetector 26 in the optical pickup OP2 is input in an address detecting/error signal generating unit 80.

The address detecting/error signal generating unit 80 comprehensively shows a configuration of a detecting system for address information based on the selector signal described according to the various embodiments above, a generating system for the tracking error signal TE or Te-c1 or TE-c2, and a generating system for the focus error signals FE and FE-m. For example, in the case of applying the third embodiment which generates "TE-c1" as the tracking error signal and "FE-m" as the focus error signal, the address detecting/error signal generating unit 80 is made up of "a matrix circuit 45, sample hold circuit SH2, clock generating circuit 31, selector signal generating circuit 46, selector signal selecting circuit 47, address detecting circuit 33, sample hold circuit SH3, sample hold circuit SH4, and subtractor 48". Alternatively, in the case of applying the fifth embodiment which performs generation of the tracking error signal TE-c2 and tilting detecting based on the TE-c2, the address detecting/error signal generating unit 80 is made up of "a matrix circuit 30, clock generating circuit 31, selector signal generating/selecting circuit 32, address detecting circuit 33, sample hold circuit SH1, sample hold circuit SH2, sample hold circuit SH5, subtractor 49, lens shift amount reduction unit 51, and subtractor 52". Note that in this case, it goes without saying that the position sensor 50 is provided in the optical pickup OP2.

Thus, the configuration elements of the address detecting/ error signal generating unit 80 differ appropriately by which method is applied as a generating method for the tracking error signal and focus error signal of the various embodiments described above, as to the sixth embodiment.

The tracking error signal TE or TE-c1 or TE-c2 and the focus error signal FE or FE-m generated by the address detecting/error signal generating unit 80 are supplied to the servo circuit 34.

In this case, the servo circuit 34 drives each of the focus coil and tracking coil in the biaxial actuator 74 described with FIG. 28, based on the input focus, the focus drive signal FD generated from the various tracking error signals, and the tracking drive signal TD.

The control unit 81 is made up of a microcomputer, similar to the control unit 35 described with the various embodiments above. The control unit 81, in addition to the control/processing executed by the control unit 35 (selection instructions of the selector signal by the selection signal SLCT and phase adjustment instructions by the adjustment signal ADJ), performs driving control for the lens driving unit 73 in the optical pickup OP2. Specifically, based on the value of the offset of-L set beforehand to correspond to the information recording layer position L which is the target for recording or playing, by driving the lens driving unit 73, the focal position of the recording/playing laser light is caused to match the aforementioned relevant information recording layer position L. That is to say, the recording/playing position in the depth direction is selected.

7. Seventh Embodiment

Now, in the descriptions up to now, the adjustment spacing of the playing positions has been the pit row forming spacing, but further minute adjustments can be performed which exceed the pit row forming spacing.

Note that an applicable example as to the first embodiment above will be described below, but similar applications can be made as to the second through sixth embodiments also.

Figure 30:
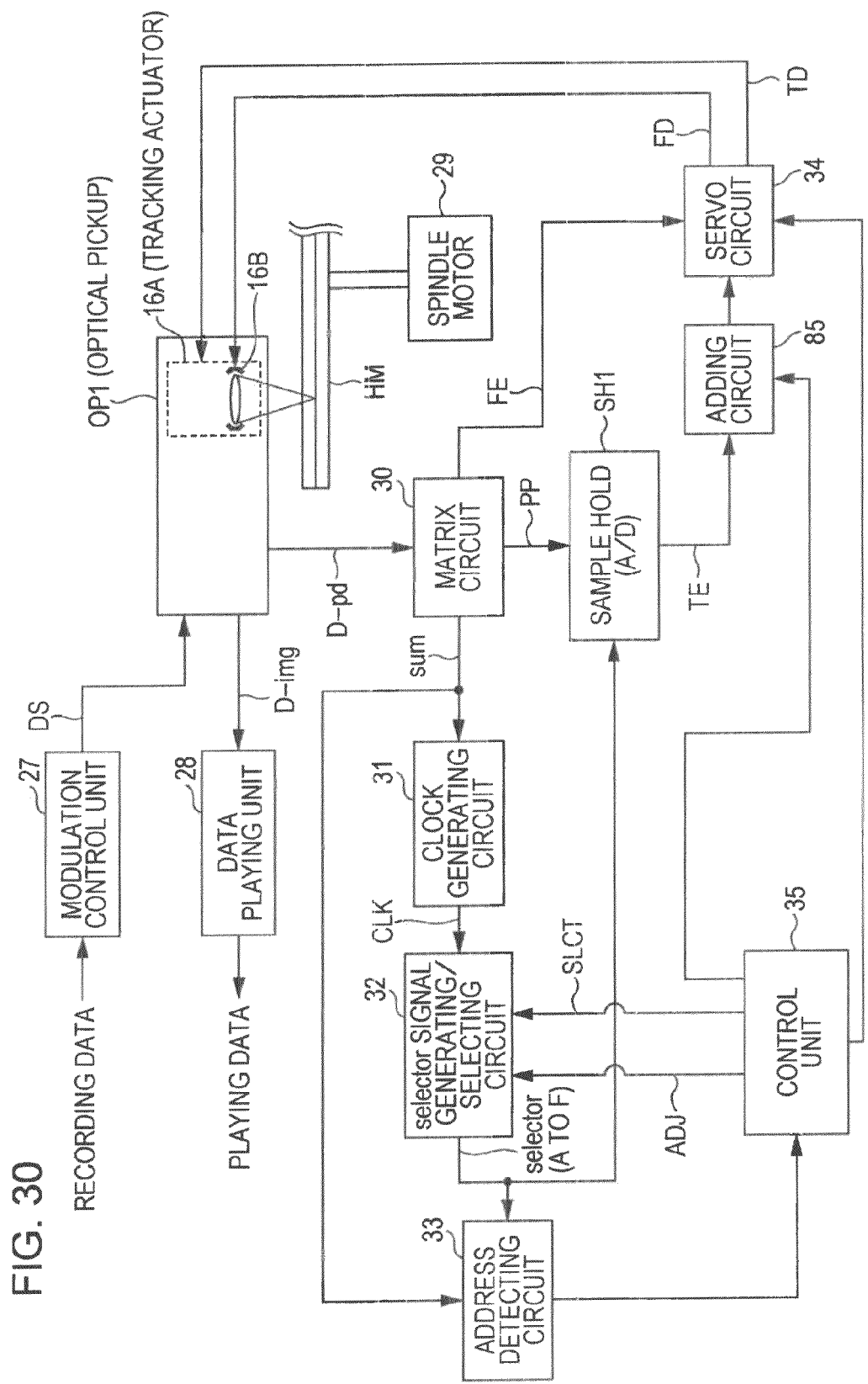
FIG. 30 is a block diagram illustrating an internal configuration of the recording/playing device according to a seventh embodiment.

FIG. 30 shows an internal configuration of a recording/ playing device according to the seventh embodiment corresponding to a case wherein adjustments of playing position is performed by pitches that are finer even than the pit row forming spacing.

As shown in FIG. 30, with the recording/playing device according to the seventh embodiment, the tracking error signal TE output from the sample hold circuit SH1 is output to an adding circuit 85. The tracking error signal TE via the adding circuit 85 is then supplied to the servo circuit 34.

The adding circuit 85 is provided to give an necessary offset as to the tracking error signal TE. In this case, the offset value that the adding circuit 85 gives to the tracking error signal TE becomes that which the control unit 35 specifies.

The control unit 35 in this case instructs a value defined such that the movement amount of the playing position does not exceed the pit row forming pitch, as a value instructed as to the adding circuit 85. Thus, fine adjustments exceeding the forming pitch can be made to the playing position.

Now, in the case of performing such minute adjustments that further exceed the pit forming pitches, a "target correction amount" obtained by calibration performed before playing can be found in increments that exceed the pit row forming pitch. Specifically, with the calibration in this case, the playing position is not simply appropriated to multiple pit rows, but detection is made of the hologram playing light amount (playing signal level in the sixth embodiment) at the appropriated position in the amount according to the offset value from the position appropriated to the pit rows above. That is to say, the "target correction amount" in this case becomes a value that is expressed as a combination of the number of pit rows shifted from the pit row playing target.

Accordingly, the control unit 35 obtains a "target address (target radius position)" expressed by a separate pit row and the offset value therefrom, from the above "target correction amount" obtained with the calibration, then performs selection instructions of the selector signal as to the selector signal generating/selecting circuit 32 and offset value instructions to the adding circuit 85, so that the spot of the position control laser light is positioned at the "target address".

Thus, fine playing position adjustments can be realized which exceed the pit row forming pitches, and consequently, corrections to the shifts between the actual recording positions and playing positions can be performed with high precision.

8. Modified Examples

Descriptions have been given above of embodiments according to the present inventions, but the present invention is not to be limited to the specific examples described herein to this point.

For example, in the description to this point, as multiple pit rows each having a different pit row phase, a total of six are set as A through F, and in the radius direction pit rows are repeatedly formed in these six patterns (pit row phases), but the number of multiple pit rows is not to be limited to six, and more rows or fewer rows may be used.

Also, in the description to this point, a case is exemplified which sets a segment length of the various pit formable positions in the pit rows to be a segment length of 3 T, and the spacing between the edges of the various pit formable positions in the pit row forming direction are also set to the same length of 3 T, but these are only shown as an example. The segment length of the various pit formable positions and the spacing between the edges of the various pit formable positions in the pit row forming direction can be set so that the conditions set forth in 1) and 2) above are satisfied.

Also, in the description to this point, regarding the multiple pit rows each having different pit row phases, the pit rows are arrayed so that the pit row phase is advanced more towards the outer side and the pit row phase is delayed more towards the inner side, but various patterns can be set, such as conversely arraying the pit row phase to be advanced more towards the inner side and the pit row phase to be delayed more towards the outer side, under the condition that the array pattern of the multiple pit rows does not exceed the optical limitations in the pit row forming direction.

Also, in the description to this point, a case is exemplified wherein the pit rows are formed in a spiral shape, but the pit rows can be formed concentrically.

Figure 31:
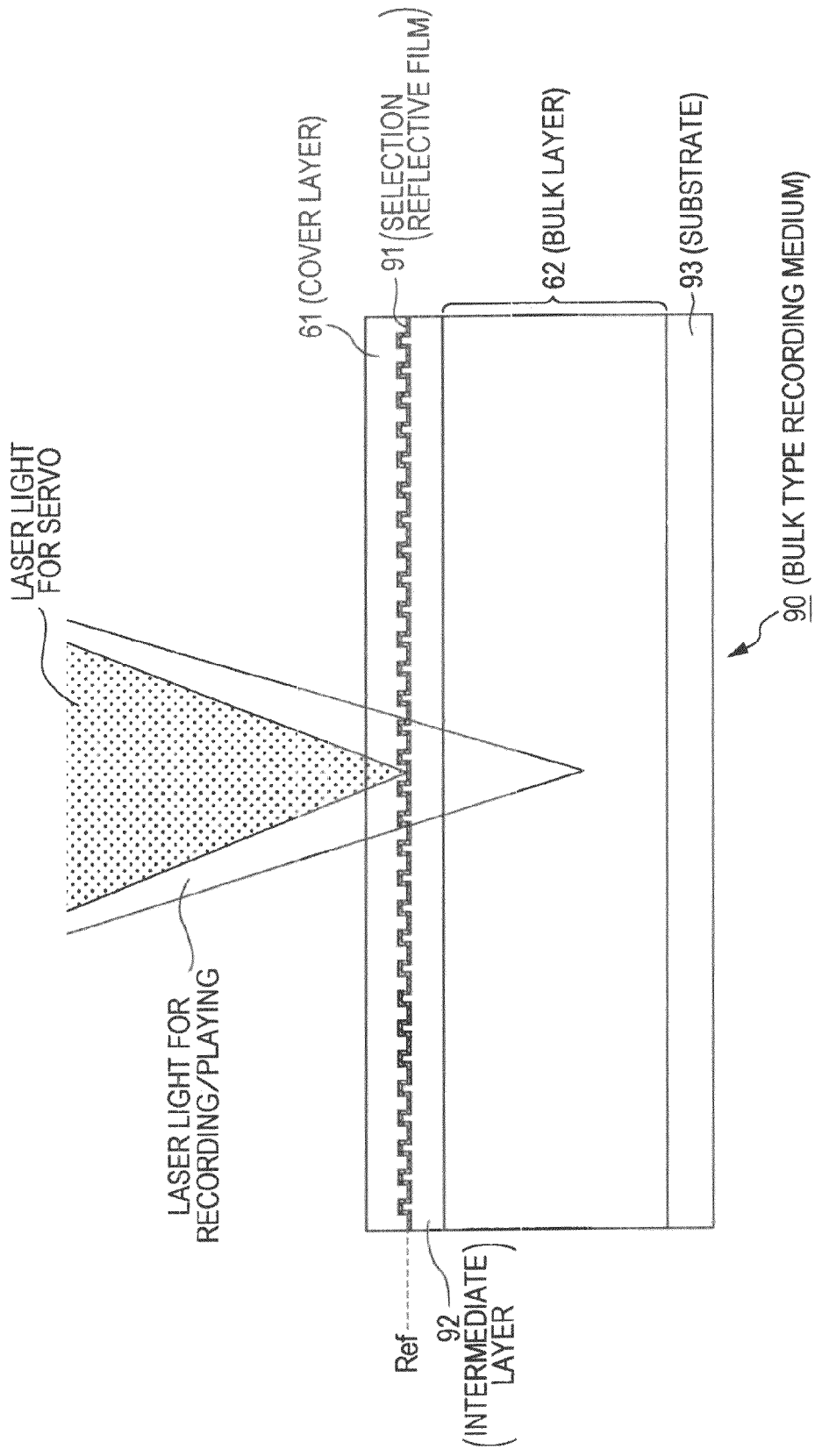
FIG. 31 is a diagram illustrating another configuration example of the bulk-type recording medium.
Figure 32:
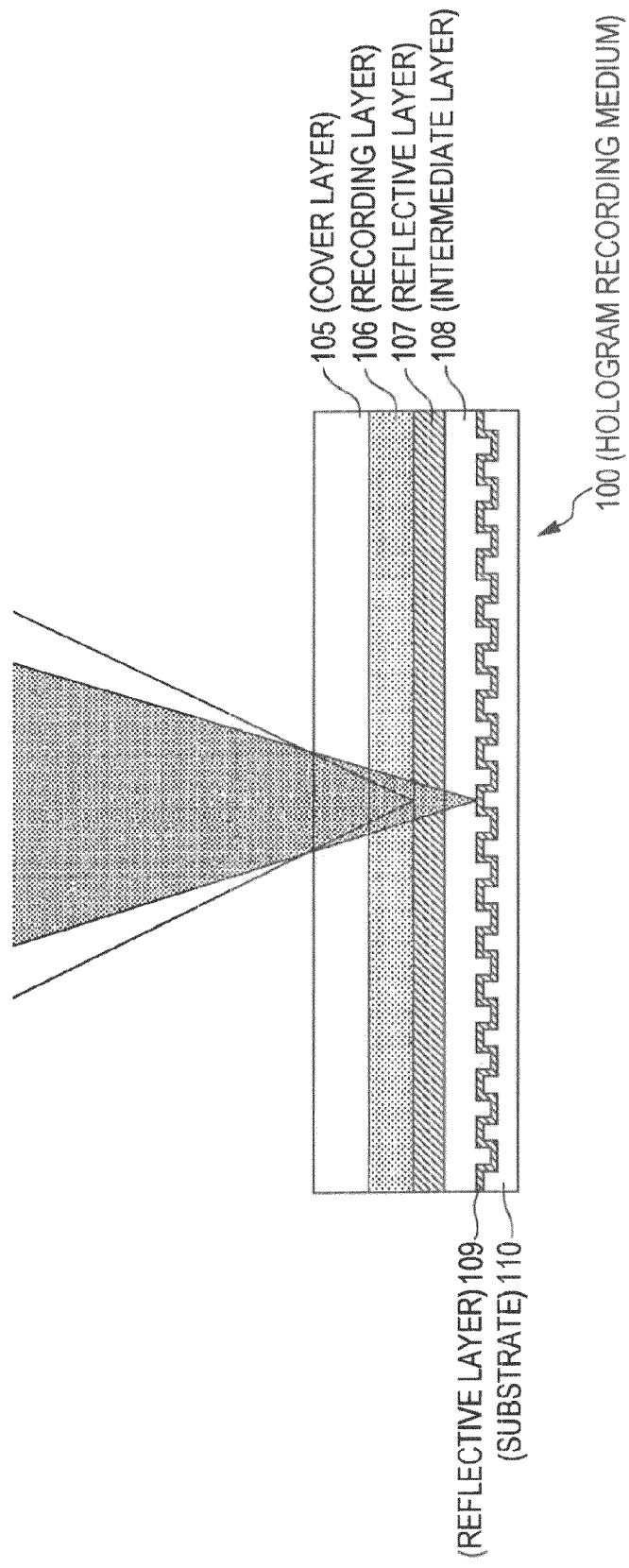
FIG. 32 is a diagram illustrating a cross-sectional configuration of a hologram recording medium as a conventional example.
Figure 33:
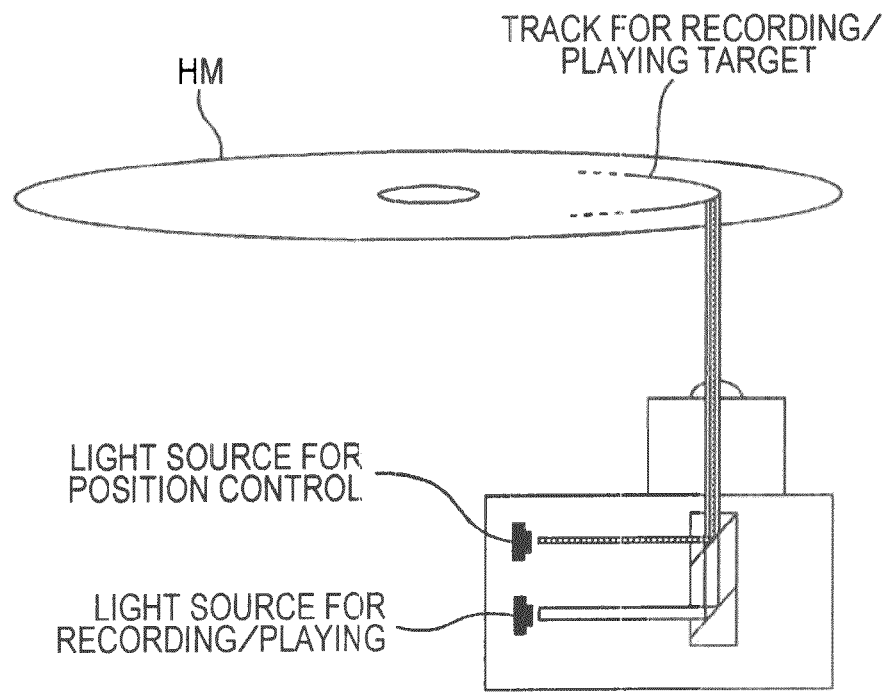
FIG. 33 is a diagram illustrating the relation between the recording/playing light and the position control light irradiated onto the hologram recording medium.

Also, relating to the sixth embodiment, in FIG. 24 above, a case is exemplified wherein the reference face Ref which the bulk-type recording medium should have (reflective face on which the pit rows are formed, as the present invention) is formed on a lower layer side from the bulk layer 62, but the present invention can be favorably applied as to a bulk-type recording medium 90 wherein the reference face Ref is formed on an upper layer side from the bulk layer 62 as shown in the following FIG. 31.

In the example shown in FIG. 31, a selection reflective film 91 is used, as shown in the diagram, as the reflective film equivalent to the reference face Ref. In this case, the recording/playing laser light needs to reach the bulk layer 62, so the selection reflective film 91 is configured to have wavelength selectivity so that the recording/playing laser light is passed through and the servo laser light is reflected.

The bulk-type recording medium 90 is formed by stacking the bulk layer 62 on top of a substrate 93 (in this case the face of the upper layer side is a flat face) made of a resin such as polycarbonate, for example, coating the upper layer of the bulk layer 62 with an ultraviolet cured resin with a spin coat method or the like, forming an intermediate layer 92 by performing ultraviolet irradiation in the state of having pressed a stamper on the upper face side of the coated ultraviolet cured resin to form a pit row, and forming the selection reflective film 91 on the intermediate layer 92 and stacking the cover layer 61 on the selection reflective film 91.

Also, particularly relating to the first embodiment, with the description above, a push pull signal is used as a tracking error signal to express the tracking method error, but other signals can be used, such as a DPD (Differential Phase Detection) tracking signal (phase difference tracking signal), as long as the signal expresses the error direction of the spot position as to the pit position.

Also, in the description to this point, a case is exemplified wherein disc-shaped recording medium according to the present invention is applied to a hologram recording medium or bulk-type recording medium, but the disc-shaped recording medium according to the present invention can be favorably applied to other recording media, as long as information recording/playing is performed by irradiation of a first light and control of the information recording/playing position from the first light is performed by position control by irradiation of a second light, as with these recording media herein.

Also, in the description to this point, a case is exemplified wherein the optical spot position control device of the present invention is applied to a hologram recording/playing method and a bulk recording/playing method, but the optical spot position control device of the present invention can be favorably applied to other devices also, as long as information playing (and recording) is performed by irradiation of the first light, and control of the information playing (and recording) position by the first light is performed based on the result of irradiating a second light.

REFERENCE SIGNS LIST

HM hologram recording medium
L1, 61 cover layer
L2 recording layer
L3, L5, 64 reflective film
L4, 63, 92 intermediate layer
L6, 65, 93 substrate
1 recording/playing device
2 first laser
3 isolator
4 IS (image stabilizing) function unit
4A AOM
4B AOD
4C IS control unit
5 expander
6, 7, 13 mirror 8 SLM (spatial light modulator)
9, 23 polarization beam splitter
10, 11, 17, 18 relay lens
12 dichroic mirror
14 ¼ wavelength plate
15 objective lens
16A tracking actuator
16B focus actuator
19 image sensor
20 second laser
21 lens
22, 70 collimation lens
24, 75 condensing lens
25 cylindrical lens
26, 76 photodetector
OP1, OP2 optical pickup
27 modulation control unit
28 data playing unit
29 spindle motor
30, 45 matrix circuit
31 clock generating circuit
32 selector signal generating/selecting circuit
33 address detecting circuit
34 servo circuit
35, 81 control unit
SH1 through SH5 sample hold circuit
40, 42 slicing circuit
41 sum differential circuit
43 AND gate circuit
44 PLL circuit
46 selector signal generating circuit
47 selector signal selecting circuit
48, 49, 52 subtractor
50 position sensor
51 lens shift amount reduction unit
60, 90 bulk-type recording medium
62 bulk layer
71 fixed lens
72 movable lens
73 lens driving unit
74 biaxial actuator
77 recording processing unit
78 signal generating circuit
79 playing processing unit
80 address detecting/error signal generating unit
85 adding circuit

The invention claimed is:

1. A disc-shaped recording medium, comprising: multiple pit row phases wherein, the pit rows, having a spacing between one round of pit formable positions that is a predetermined first spacing, are formed in a spiral shape or concentrically, and with pit rows arrayed in the radius direction, a spacing, in the pit row forming direction, of the pit formable positions is set to a predetermined second spacing such that the pit formable positions are shifted, wherein information is represented based on pit existence/non-existence at said pit formable positions, wherein each of said pit formable positions is positioned on a pit row, and wherein said predetermined designated locations on the disc-shaped recording medium correspond in size to a size of a pit.

2. The disc-shaped recording medium according to claim 1, wherein recording of address information is performed with a pattern of pit existence/non-existence at said pit formable positions.

3. The disc-shaped recording medium according to claim 1, wherein the pit row phase is shifted by said second spacing amount for each round in the pit row forming direction.

4. The disc-shaped recording medium according to claim 2, said disc-shaped recording medium being a hologram recording medium having a position control information recording layer on which recording of said address information by said pit row is performed, and a hologram recording layer at which hologram recording/playing is performed.

5. The disc-shaped recording medium according to claim 2, said disc-shaped recording medium being a bulk-type recording medium having a position control information recording layer on which recording of said address information by said pit row is performed, and a bulk layer on which mark recording is selectively performed at required layer positions in the depth direction according to irradiation of the laser light.

6. The disc-shaped recording medium according to claim 1, wherein said pit formable positions are predetermined designated locations on the disc-shaped recording medium at which pits may be formed, and information is represented by a pattern encoded by the existence and the non-existence of pits at said pit formable positions.

7. The disc-shaped recording medium according to claim 1, wherein the pits are formed only on the pit formable positions, and pit formation is not performed other than at the pit formable positions.

* * * * *